(12) United States Patent
Constantz et al.

(10) Patent No.: US 11,577,198 B2
(45) Date of Patent: *Feb. 14, 2023

(54) ALKALI ENRICHMENT MEDIATED CO$_2$ SEQUESTRATION METHODS, AND SYSTEMS FOR PRACTICING THE SAME

(71) Applicant: Blue Planet Systems Corporation, Los Gatos, CA (US)

(72) Inventors: Brent R. Constantz, Portola Valley, CA (US); Chris L. Camire, Morgan Hill, CA (US); Jacob Schneider, San Jose, CA (US); Mark Bewernitz, Los Gatos, CA (US)

(73) Assignee: Blue Planet Systems Corporation, Los Gatos, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/127,074

(22) Filed: Dec. 18, 2020

(65) Prior Publication Data

US 2021/0162340 A1 Jun. 3, 2021

Related U.S. Application Data

(60) Continuation of application No. 15/627,262, filed on Jun. 19, 2017, now Pat. No. 10,898,854, which is a
(Continued)

(51) Int. Cl.
*B01D 53/62* (2006.01)
*B01D 53/22* (2006.01)

(52) U.S. Cl.
CPC ............ *B01D 53/62* (2013.01); *B01D 53/229* (2013.01); *B01D 2053/224* (2013.01);
(Continued)

(58) Field of Classification Search
None
See application file for complete search history.

(56) References Cited

U.S. PATENT DOCUMENTS

| 2,698,251 A | 12/1954 | Shea, Jr. et al. |
| 3,785,802 A | 1/1974 | Roberti et al. |
(Continued)

FOREIGN PATENT DOCUMENTS

| CN | 102674424 A | 9/2012 |
| WO | WO2002060825 A2 | 8/2002 |
(Continued)

OTHER PUBLICATIONS

Blok et al. "Gas-Liquid Mass Transfer in Fixed-Bed Reactors with Cocurrent Downflow Operating in the Pulsing Flow Regime", AIChE Journal, May 1984, vol. 30, No. 3, pp. 393-401.
(Continued)

*Primary Examiner* — Philip Y Louie
(74) *Attorney, Agent, or Firm* — Michael J. Blessent; Bret E. Field; Bozicevic, Field & Francis LLP

(57) ABSTRACT

Methods of sequestering CO$_2$ from a gaseous source of CO$_2$ are provided. Aspects of the methods include employing an alkali enrichment protocol, such as a membrane mediated alkali enrichment protocol, in a CO$_2$ sequestration protocol. Also provided are systems for practicing the methods.

19 Claims, 28 Drawing Sheets

"First liquid" may flow co-currently or counter-currently to "Second Liquid"

Related U.S. Application Data division of application No. 14/636,043, filed on Mar. 2, 2015, now Pat. No. 9,707,513.

(60) Provisional application No. 62/096,340, filed on Dec. 23, 2014, provisional application No. 62/062,084, filed on Oct. 9, 2014, provisional application No. 62/056,377, filed on Sep. 26, 2014, provisional application No. 62/051,100, filed on Sep. 16, 2014, provisional application No. 62/041,568, filed on Aug. 25, 2014, provisional application No. 61/990,486, filed on May 8, 2014, provisional application No. 61/947,372, filed on Mar. 3, 2014.

(52) U.S. Cl.
CPC ............. *B01D 2251/304* (2013.01); *B01D 2251/402* (2013.01); *B01D 2251/404* (2013.01); *B01D 2251/604* (2013.01); *B01D 2251/606* (2013.01); *B01D 2252/1035* (2013.01); *B01D 2257/504* (2013.01); *B01D 2258/0283* (2013.01); *Y02A 50/20* (2018.01); *Y02C 20/40* (2020.08)

(56) References Cited

U.S. PATENT DOCUMENTS

| | | |
|---|---|---|
| 4,328,086 A | 5/1982 | Takenaka et al. |
| 4,350,567 A | 9/1982 | Moorehead et al. |
| 5,480,518 A | 1/1996 | Shane et al. |
| 5,665,319 A | 9/1997 | Hirama et al. |
| 5,695,545 A | 12/1997 | Cho et al. |
| 6,872,240 B2 | 3/2005 | Pellegrin |
| 7,176,017 B2 | 2/2007 | Parent et al. |
| 7,264,725 B2 | 9/2007 | Vido et al. |
| 7,579,185 B2 | 8/2009 | Parent et al. |
| 7,820,432 B2 | 10/2010 | Parent et al. |
| 7,931,809 B2 | 4/2011 | Constantz et al. |
| 8,329,458 B2 | 12/2012 | Parent et al. |
| 8,329,459 B2 | 12/2012 | Parent et al. |
| 8,329,460 B2 | 12/2012 | Parent et al. |
| 9,707,513 B2 | 7/2017 | Constantz et al. |
| 10,711,236 B2 | 7/2020 | Constantz et al. |
| 10,766,015 B2 | 9/2020 | Constantz et al. |
| 2004/0086632 A1 | 5/2004 | Vlajinic et al. |
| 2004/0234443 A1 | 11/2004 | Chen et al. |
| 2005/0180910 A1 | 8/2005 | Park et al. |
| 2007/0217981 A1 | 9/2007 | Van Essendelft |
| 2009/0214408 A1 | 8/2009 | Blake et al. |
| 2009/0301352 A1 | 12/2009 | Constantz et al. |
| 2010/0086983 A1 | 4/2010 | Gellett et al. |
| 2010/0135891 A1 | 6/2010 | Hansen et al. |
| 2010/0150802 A1* | 6/2010 | Gilliam ............ B01D 53/62 423/220 |
| 2010/0229725 A1 | 9/2010 | Farsad et al. |
| 2010/0230830 A1 | 9/2010 | Farsad et al. |
| 2010/0247410 A1 | 9/2010 | Constantz et al. |
| 2010/0313794 A1 | 12/2010 | Constantz et al. |
| 2011/0132840 A1 | 6/2011 | Choi et al. |
| 2011/0220574 A1 | 9/2011 | Bakajin et al. |
| 2011/0253630 A1 | 10/2011 | Bakajin et al. |
| 2011/0277474 A1 | 11/2011 | Constantz et al. |
| 2011/0297600 A1 | 12/2011 | Constantz et al. |
| 2011/0300043 A1 | 12/2011 | Sano et al. |
| 2012/0000175 A1 | 1/2012 | Wormser |
| 2012/0211421 A1 | 8/2012 | Self et al. |
| 2012/0220019 A1 | 8/2012 | Lackner |
| 2012/0244053 A1 | 9/2012 | Self et al. |
| 2012/0291675 A1 | 11/2012 | Camire et al. |
| 2013/0288887 A1 | 10/2013 | Wu et al. |
| 2013/0323143 A1 | 12/2013 | Olfi et al. |
| 2014/0050947 A1 | 2/2014 | Donnelly |
| 2014/0234946 A1 | 8/2014 | Constantz et al. |
| 2014/0271440 A1 | 9/2014 | Constantz et al. |
| 2014/0322803 A1 | 10/2014 | Constantz et al. |
| 2014/0370242 A1 | 12/2014 | Constantz et al. |
| 2015/0329385 A1 | 11/2015 | Uno et al. |
| 2016/0177344 A1 | 6/2016 | Subhas et al. |
| 2017/0080386 A1 | 3/2017 | Fradette et al. |

FOREIGN PATENT DOCUMENTS

| | | |
|---|---|---|
| WO | WO2007146094 A2 | 12/2007 |
| WO | WO2008060435 A2 | 5/2008 |
| WO | WO2008137082 A1 | 11/2008 |
| WO | WO2009151709 A2 | 12/2009 |
| WO | WO2009155596 A2 | 12/2009 |
| WO | WO2011069050 A1 | 6/2011 |
| WO | WO2012166701 A2 | 12/2012 |
| WO | WO2013016708 A1 | 1/2013 |
| WO | WO2014039578 A1 | 3/2014 |
| WO | WO2014144848 A1 | 9/2014 |

OTHER PUBLICATIONS

Boelhouwer, Jaco G. "Nonsteady operation of trickle-bed reactors: hydrodynamics, mass and heat transfer", Technische Universiteit Eindhoven, 2001, 213 pages.

Espacenet family list for CN103663529A. Viewed on Aug. 24, 2016 at https:/ /worldwide.espacenet.corn/publicationDetails/ inpadocPatentFamily?Cc~Cn&NF103663529A&Kc~a&Ft~D &Nd~3 &dat e~20140326&Db~Epodoc&locale~enEP.

Gu et al. "PYA-based hybrid membranes from cation exchange multisilicon copolymer for alkali recovery", Desalination, (2012), vol. 304, pp. 25-32.

Hao et al. "Cation exchange hybrid membranes prepared from PYA and multisilicon copolymer for application in alkali recovery", Journal of Membrane Science, (2013), pp. 156-162, vol. 425-426.

Hao et al. "Alkali recovery using PVA/Si02 cation exchange membranes with different COOH contents", Journal of Hazardous Materials, vol. 244-245, pp. 348-356 (2013).

Janecki et al. "Parameters characterising the pulsing flow for cocurrent flow of gas and foaming liquid in a pressurised trickle-bed reactor", Proceedings of European Congress of Chemical Engineering (ECCE-6), Sep. 16-20, 2007, pp. 1-11, Copenhagen.

Liu et al. "Diffusion dialysis membranes with semi-interpenetrating network for alkali recovery", Journal of Membrane Science, vol. 451, pp. 18-23 (2014).

Mackey et al. "C02 Injection Using Membrane Technology", Bev-Plants '95, Mar. 21-Mar. 23, 1995, 22 pages.

Membrana "Liqui-Cel Membrane Contactors: Liquid Degassing & Gasification Solutions", Product Brochure, 2012, 5 pages.

Statkraft "Statkraft to build world's first osmotic power plant", Mar. 10, 2007, 2 pages, Retrieved online: http://www.statkraft.com/pro/ press/Press _releases/2007.Statkraft_to _build_ worl d_s _first_ osmotic_power_plantasp.

Tanaka et al. "Ion-Exchange Membranes", International Journal of Chemical Engineering, 2012, 3 pages.

The Engineering Toolbox, "Solubility of Gases in Water." (c)2005. Viewed on Nov. 12, 2009 at http://www.engineeringtoolbox.com/ gases-solubility-water-d_1148.html.

Versteeg et al. "Absorption of C02 and H2S in Aqueous Alkanolamine Solutions using a Fixed-Bed Reactor with Cocurrent Downflow Operation in the Pulsing Flow Regime", Chem. Eng Process., vol. 24, pp. 163-176 (1988).

Weekman, Jr. et al. "Fluid-Flow Characteristics of Concurrent Gas-Liquid Flow in Packed Beds", AIChE Journal, Nov. 1964, vol. 10, No. 6, pp. 951-957.

Wiesler, F. "Membrane Contactors: An Introduction to the Technology", Ultrapure Water, May/Jun. 1996, pp. 27-31.

Zeinalipour-Yazdi et al. "Kinetic Rates and Linear Free Energy Relationships for Water Dissociation on Transition and Noble Metal Dimers", The Journal of Physical Chemistry A, 2009, vol. 113, pp. 6971-6978.

* cited by examiner

FIG. 5

Case 2

Monovalent Cation Selective Membrane

CO2 (aq) → NaHCO3

OH-
H+

Na+
Cl-

H+

Assume Equilibration
Osmotic Pressure Equalization

CO2 (aq) + NaCl + H2O --> NaOH + HCl
(-91.5) + (-92) + (-57) -->
(-202) + (-31.5) = 7 kcal/mol

FIG. 6

Case 3

Monovalent Cation Selective Membrane

NaHCO3 → Na2CO3

OH-
H+

Na+
Cl-

H+

Assume Equilibration
Osmotic Pressure Equalization

NaHCO3 + NaCl → Na2CO3 + HCl
(-202) + (-92) + (-57) →
(-251) + (-31.5) = 11.5 kcal/mol FIG. 9: Anion-Permeable Membrane; Direct $CO_2$ Capture by Bicarbonate Production CASE: Gas FRESH, use AE to make NaHCO$_3$ for precipitation of CaCO$_3$ in FBR CASE: Gas FRESH, use AE to make saleable NaHCO$_3$ (ca. $200/ton)

CASE: Starting w/ FRESH, use AE to make NaOH capture solution to make NaHCO$_3$ for precipitation of CaCO$_3$ in FBR CASE: Starting w/ FRESH + NaHCO$_3$, use AE to make Na$_2$CO$_3$ capture solution to make NaHCO$_3$ for precipitation of CaCO$_3$ in FBR CASE: Starting w/ BRINE, use NF to concentrate $Ca^{2+}$ for precipitation with FRESH + $NaHCO_3$ in other cases CASE: Starting w/ REJECT, use NF to make NaHCO₃ PERMEATE and dilute to make FRESH + NaHCO₃ for feed to other cases

ALKALI ENRICHMENT MEDIATED $CO_2$ SEQUESTRATION METHODS, AND SYSTEMS FOR PRACTICING THE SAME

CROSS-REFERENCE TO RELATED APPLICATIONS

This application is a continuation of U.S. patent application Ser. No. 15/627,262 filed on Jun. 19, 2017, which application is a divisional of U.S. patent application Ser. No. 14/636,043 filed on Mar. 2, 2015, now U.S. Pat. No. 9,707,513, which application, pursuant to 35 U.S.C. § 119 (e), claims priority to the filing dates of U.S. Provisional Patent Application Ser. No. 61/947,372 filed on Mar. 3, 2014; U.S. Provisional Patent Application Ser. No. 62/041, 568 filed on Aug. 25, 2014; U.S. Provisional Patent Application Ser. No. 62/051,100 filed on Sep. 16, 2014; U.S. Provisional Patent Application Ser. No. 61/990,486 filed on May 8, 2014; U.S. Provisional Patent Application Ser. No. 62/056,377 filed on Sep. 26, 2014; U.S. Provisional Patent Application Ser. No. 62/062,084 filed on Oct. 9, 2014; and U.S. Provisional Patent Application Ser. No. 62/096,340 filed on Dec. 23, 2014; the disclosures of which applications are herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. Because human activities since the industrial revolution have rapidly increased concentrations of atmospheric $CO_2$, anthropogenic $CO_2$ has been implicated in global warming and climate change, as well as ocean acidification.

Sequestration of anthropogenic $CO_2$ is of great global urgency and is important in efforts to slow or reverse global warming and ocean acidification.

SUMMARY

Methods of sequestering $CO_2$ from a gaseous source of $CO_2$ are provided. Aspects of the methods include employing an alkali enrichment protocol, such as a membrane mediated alkali enrichment protocol, in a $CO_2$ sequestration protocol. Also provided are systems for practicing the methods.

BRIEF DESCRIPTION OF THE FIGURES

FIG. 5 A monovalent cation selective membrane can convert an initial sodium chloride solution (left) in proximity with a low salinity $CO_2$ (aq)-containing solution (right) to a HCl solution in proximity with a NaHCO3 solution, respectively. This is done by allowing, sodium and hydrogen ions (H+) to pass freely through the membrane at a cost of 7 kcal/mol (based on Gibbs free energy of Formation). The driving force which fuels the non-spontaneous reaction is osmotic pressure due to the high salinity of the initial NaCl solution (left) compared to the low salinity of the fresh water solution (right). The process results in a conversion of $CO_2$ (aq) to bicarbonate ion, which can be used to precipitate minerals at a later point.

FIG. 6 A monovalent cation selective membrane can convert an initial sodium chloride solution (left) in proximity with a relatively lower salinity $NaHCO_3$ (solution (right) to a HCl solution in proximity with a $NaHCO_3$ solution, respectively. This is done by allowing, sodium and hydrogen ions (H+) to pass freely through the membrane at a cost of 11.5 kcal/mol (based on Gibbs free energy of formation). The driving force which fuels the non-spontaneous reaction is osmotic pressure due to the high salinity of the initial NaCl solution (left) compared to the low salinity of the initial sodium bicarbonate solution (right). The process results in a conversion of bicarbonate to carbonate and creates a high pH, high alkalinity solution which can be used for $CO_2$ sequestration at a later point.

DETAILED DESCRIPTION

Figure 1:
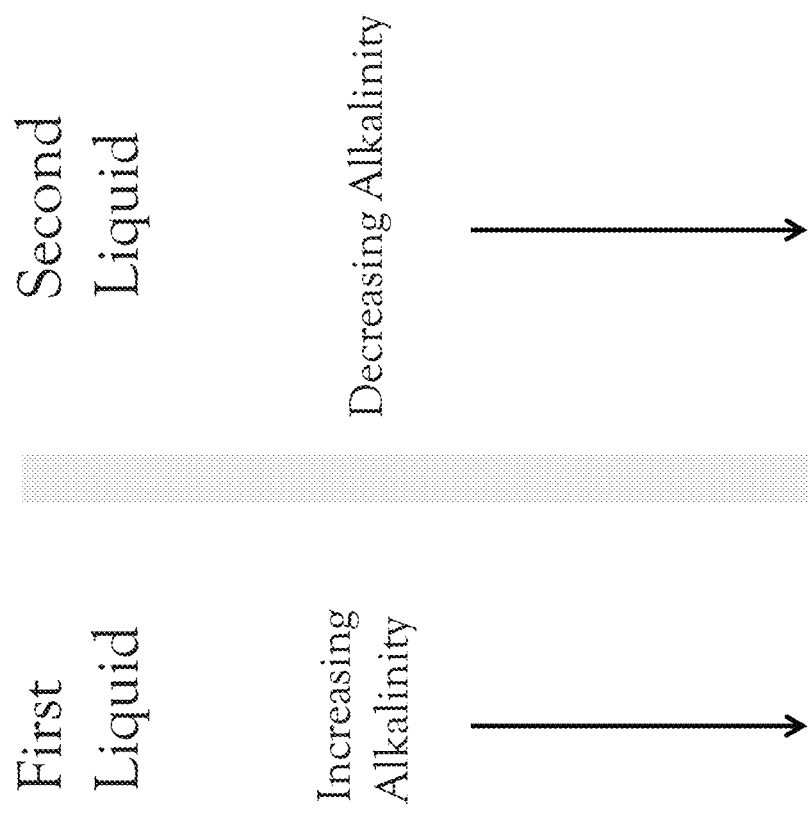
FIG. 1 illustrates a membrane mediated alkali enrichment protocol.

Methods of sequestering $CO_2$ from a gaseous source of $CO_2$ are provided. Aspects of the methods include employing an alkali enrichment protocol, such as a membrane mediated alkali enrichment protocol, in a $CO_2$ sequestration protocol. Also provided are systems for practicing the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise.

It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various aspects of the invention, methods will be reviewed first in greater detail, followed by a review of systems.

Alkali Enrichment Mediated $CO_2$ Sequestration Methods

As summarized above, aspects of the invention include methods of sequestering $CO_2$, i.e., $CO_2$ sequestration processes (i.e., methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ in a number of different ways, e.g., by producing a $CO_2$ sequestering product, e.g. a carbonate material, and/or by producing a substantially pure subsurface injectable $CO_2$ product gas from an amount of initial $CO_2$, such that the $CO_2$ is sequestered. The $CO_2$ sequestering product may be a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Alkali Enrichment Protocol

As summarized above, $CO_2$ sequestration methods of the invention are alkali enrichment protocol mediated methods. By alkali enrichment protocol mediated methods is meant that the methods employ an alkali enrichment protocol at some point during the method, e.g., to produce a $CO_2$ capture liquid, to enhance the alkalinity of a $CO_2$ charged liquid, etc. The alkali enrichment protocol may be employed once or two or more times during a given method, and at different stages of a given method. For example, an alkali enrichment protocol may be performed before and/or after a $CO_2$ capture liquid production step, e.g., as described in greater detail below.

By "alkali enrichment protocol" is meant a method or process of increasing the alkalinity of a liquid. The alkalinity increase of a given liquid may be manifested in a variety of different ways. In some instances, increasing the alkalinity of a liquid is manifested as an increase the pH of the liquid. For example, a liquid may be processed to remove hydrogen ions from the liquid to increase the alkalinity of the liquid. In such instances, the pH of the liquid may be increased by a desirable value, such as 0.10 or more, 0.20 or more, 0.25 or more, 0.50 or more, 0.75 or more, 1.0 or more, 2.0 or more, etc. In some instances, the magnitude of the increase in pH may vary, ranging in some instances from 0.1 to 10, such as 1 to 9, including 2.5 to 7.5, e.g., 3 to 7. As such, methods may increase the alkalinity of an initial liquid to produce a product liquid having a desired pH, where in some instances the pH of the product liquid ranges from 5 to 14, such as 6 to 13, including 7 to 12, e.g., 8 to 11, where the product liquid may be viewed as an enhanced alkalinity liquid. The increase in alkalinity of a liquid may also be manifested as an increase in the dissolved inorganic carbon (DIC) content of liquid. The DIC is the sum of the concentrations of inorganic carbon species in a solution, represented by the equation: DIC=[$CO_2$*]+[$HCO_3^-$]+[$CO_3^{2-}$], where [$CO_2$*] is the sum of carbon dioxide ([$CO_2$]) and carbonic acid ([$H_2CO_3$]) concentrations, [$HCO_3^-$] is the bicarbonate concentration and [$CO_3^{2-}$] is the carbonate concentration in the solution. The DIC of the alkali enriched liquid may vary, and in some instances may be 500 ppm or greater, such as 5,000 ppm or greater, including 15,000 ppm or greater. In some instances, the DIC of the alkali enriched liquid may range from 500 to 20,000 ppm, such as 7,500 to 15,000 ppm, including 8,000 to 12,000 ppm. In some instances, alkali enrichment is manifested as an increase in the concentration of bicarbonate species, e.g., $NaHCO_3$, e.g., to a concentration ranging from 5 to 500 mMolar, such as 10 to 200 mMolar.

In some instances, the alkali enrichment protocol is a membrane mediated protocol. By membrane mediated protocol is meant a process or method which employs a membrane at some time during the method. As such, membrane mediated alkali enrichment protocols are those alkali enrichment processes in which a membrane is employed at some time during the process. While a given membrane mediated alkali enrichment protocol may vary, in some instances the membrane mediated protocol includes contacting a first liquid, e.g., a feed liquid, and a second liquid, e.g., a draw liquid, to opposite sides of a membrane. An example of such a protocol is illustrated in FIG. 1. As can be seen in FIG. 1, first and second liquids are flowed past opposite sides of a membrane in a co- or counter-current fashion, resulting in increased alkalinity of the first liquid and decreased alkalinity of the second liquid.

Where desired, a thermodynamic force is employed that facilitates the alkalinity increase of the first (i.e., initial) liquid. Any convenient thermodynamic force or combination of forces may be employed, where thermodynamic driving forces that may be employed include, but are not limited to: osmotic force, ionic concentration, mechanical pressure, alkalinity, temperature, other chemical reactions, etc., and combinations thereof, e.g., combinations of osmotic force and mechanical pressure, e.g., as occurs in pressure assisted forward osmosis.

Figure 2:
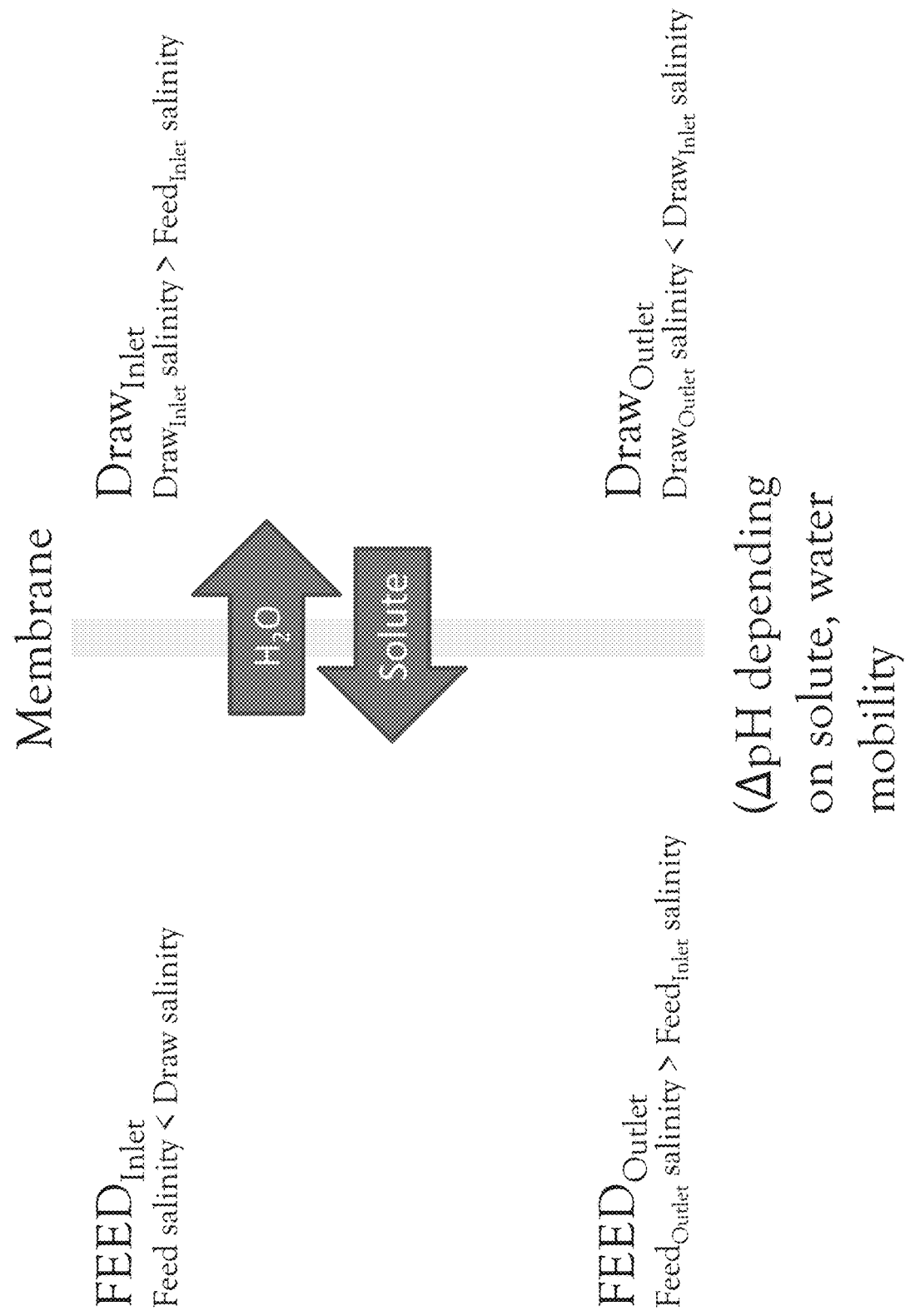
FIG. 2 illustrates an osmotic pressure mediated alkali enrichment protocol.

In some instances, the membrane mediated alkali enrichment protocol is one that employs an osmotic force to facilitate the alkalinity enhancement of the first liquid. Protocols of these embodiments may be referred to as osmotic pressure mediated protocols. The phrase "osmotic pressure mediated protocol" is employed herein to refer to a process characterized by the presence of an osmotic pressure driving force, e.g., in the form of an osmotic pressure gradient, such that a first liquid (e.g., a draw liquid) of high solute concentration relative to that of a second liquid (e.g., a feed liquid) is used to induce a net flow of water through a membrane into the first (draw) liquid from the second (feed) liquid, thus effectively separating at least a portion of the water component of the feed from its solutes. In some embodiments, the draw and feed liquids differ from each other in terms of osmotic potential, where the osmotic potential of a given draw liquid will be higher than the feed liquid with which it is employed. The magnitude of the difference in osmotic potential between a pair of given draw and feed liquids may vary, and in some instances ranges from 0.1 bar to 150 bar, such as 20 bar to 60 bar, including 25 bar to 35 bar. Where the membrane mediated alkali enrichment protocol is an osmotic pressure mediated protocol, the initial liquid from which the enhanced alkalinity liquid is produced may be the draw or feed liquid, as described above. This process is further illustrated in FIG. 2.

The osmotic pressure driving force for the production alkalinity in a given protocol can be estimated by using the Morse equation, shown below.

Osmotic Pressure Driving Force:
$\pi V = inRT$
$\pi$=osmotic pressure
V=volume/flowrate (assume 1 liter basis)
i=van't Hoff factor
n=concentration (molar/molal)
R=gas constant
T=absolute temp, K The driving force is the difference in osmotic pressure between the high salinity (e.g., NaCl) solution and the fresh water solution. The larger this difference (the larger $\Delta(i*n)$) the larger the driving force of reaction and larger the yield of alkalinity generation. The osmotic pressure can be used to do work such as driving the unfavorable reaction of NaCl (aq)+$H_2O$→NaOH (aq)+HCl (aq) by means of diffusion dialysis.

Figure 3:
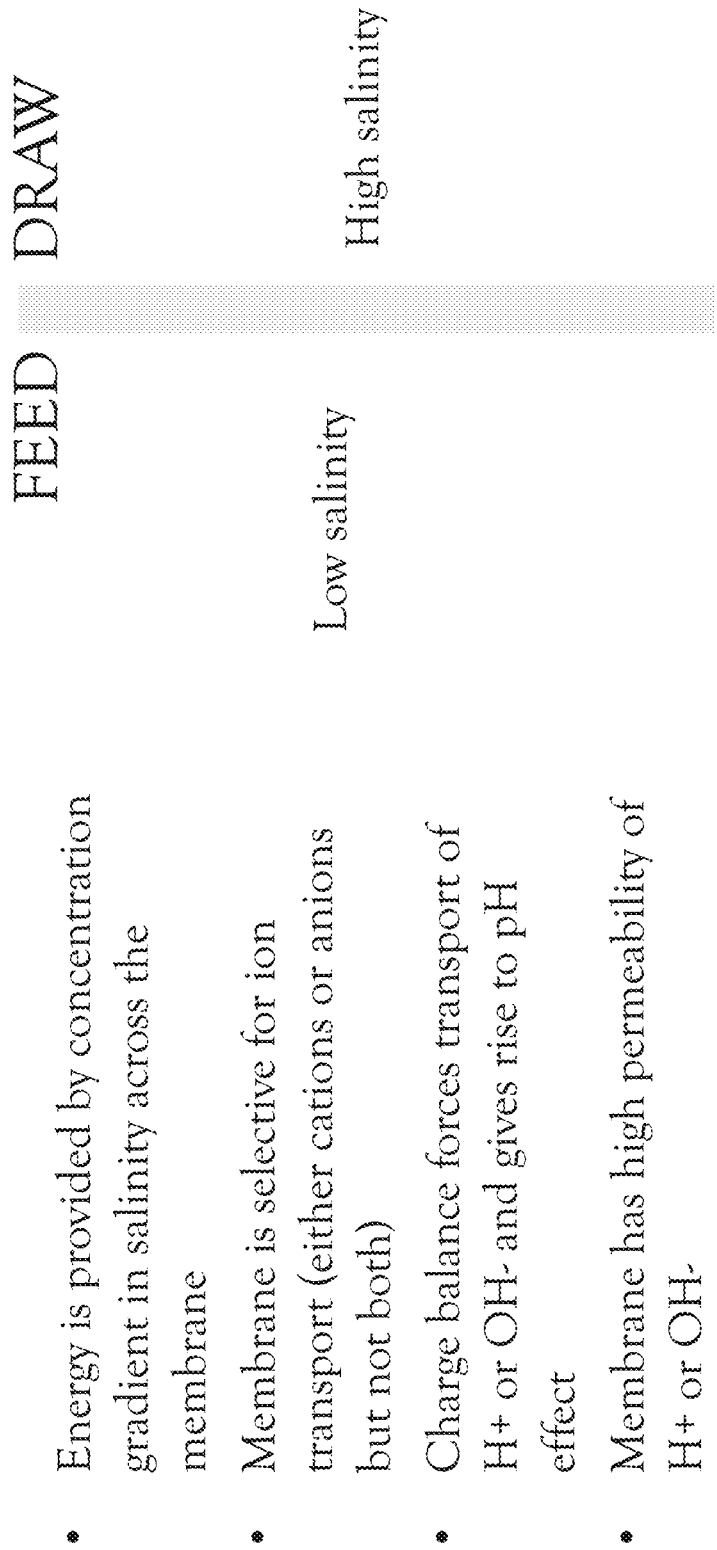
FIG. 3 illustrates an ionic concentration mediated alkali enrichment protocol.

In some instances, the membrane mediated alkali enrichment protocol is one that employs an ionic concentration force to facilitate the alkalinity enhancement of the first liquid. Protocols of these embodiments may be referred to as ionic concentration mediated protocols. The phrase "ionic concentration mediated protocol" is employed herein to refer to a process characterized by the presence of an ionic concentration driving force, e.g., in the form of an ionic concentration gradient, such that a first liquid of high ionic species concentration relative to that of a second liquid is used to induce a net flow of ions through a membrane from the first liquid into the second liquid. In some embodiments, a first liquid may include a high ionic strength medium. Such liquids of interest include aqueous media having a salinity of 2 ppt or more, such as 5 ppt or more, including 10 ppt or more. In some instances the high ionic strength liquid is an aqueous medium having a salinity that ranges from 3 to 200 ppt, such as 5 to 100 ppt. FIG. 3 provides an illustration of how an ionic concentration mediated protocol is implemented. As shown in FIG. 3, a first liquid of higher salinity and a second liquid having a salinity lower than that of the first liquid are flowed past opposite sides of a membrane, which may be ion selective, such as described in greater detail below. Charge balance forces transport of $H^+$ or $OH^-$, resulting in modulation of alkalinity of the two liquids, e.g., increased alkalinity of the feed.

Membrane mediated alkali enrichment protocols may vary, so long as they produce an enhanced alkalinity liquid from an initial liquid, as described above. As such, a variety of different types of membranes, membrane configurations, contact protocols, first and second liquid pairings, etc., may be employed, where selection of a particular set of protocol parameters may depend on a number of different factors, such as the nature of the first and second liquids that are available, for what purpose the alkali enrichment protocol is employed (e.g., to produce a $CO_2$ capture liquid, to increase the alkalinity of a $CO_2$ charged liquid, etc.).

In some embodiments of the methods, a species selective membrane is employed. For example, in some instances a selective membrane is configured or adapted to prevent the passage of $CO_2$ across the membrane. Accordingly, such selective membranes function as $CO_2$ barriers that block the passage of $CO_2$, while allowing other ions, e.g., hydrogen ions, to cross the membrane. In some instances, the membrane system includes a membrane component that is more permissive of $Na^+$ transport as compared to $Cl^-$ transport. As such, the membrane is configured to allow transfer, e.g., via diffusion, of $Na^+$ ions across the membrane at a faster rate relative to the rate at which the membrane allows transfer of $Cl^-$ ions across the membrane. While the magnitude of the difference in transfer rates of these two ions may vary, in some instances the magnitude of this rate difference ranges from 2 to 1000 fold difference, such as 10 to 100 fold difference. As such when a liquid that includes $Na^+$ and $Cl^-$ ions is placed on one side of the membrane and a liquid that includes relatively less of each of these ions is placed on the other side of the membrane, the transfer of $Na^+$ ions across the membrane from the liquid of higher concentration to the liquid of lower concentration occurs at a faster rate relative to the transfer of $Cl^-$ ions across the membrane from the liquid of higher concentration to the liquid of lower of concentration. In addition, the membrane system employed in methods of the invention may be one that is configured to catalyze the production of $H^+$ and $OH^-$ from $H_2O$, i.e., the membrane system is configured to catalyze, e.g., facilitate or enhance, the ionization water to produce hydrogen ions and hydroxide ions. As such, when the membrane is contacted with an aqueous liquid, it facilitates or enhances the ionization of water molecules in the aqueous liquid.

A variety of different types of membranes may be employed in a given alkali enrichment protocol. In some embodiments, a selective membrane may utilize dialysis diffusion through the membrane to selectively partition ions between the feed and the draw stream. Diffusion dialysis membranes are generally permeable to hydrogen ions and utilize differences in ion solubility and mobility within the membrane for selective ion separations between different liquids, e.g., feed and draw liquids. Examples of such membranes include, but are not limited to those described in: Liu et al., J. Membrane Science (2014) 451: 18-23; Hao et al., J. Membrane Science (2013) 425-426: 156-162; Gu et al., Desalination (2012) 304: 25-32; and Hao et al., J. Hazardous Materials (2013) 244-245: 348-356; as well as Nafion membranes, e.g., as described in Okada et al., Electrochimica Acta (1998) 43: 3741-3747. In some instances, the diffusion dialysis membrane employed is ion or charge selective membrane, i.e., a membrane that preferentially allows the passage of one type of charged species across the membrane relative to other species, e.g., other charged species and/or neutral species. For example, membranes of interest include cationic membranes, i.e., membranes that permit the passage of cations but not of anions. Also of interest are anionic membranes, i.e., membranes that permit the passage of cations but not of anions. Both cationic and anionic membranes find use in protocols where alkali enrichment is achieved by removing hydrogen ions from the initial liquid to produce the enhanced alkalinity liquid. In these embodiments, as hydrogen ions are removed from the initial liquid, the pH of the initial liquid is increased to produce a product liquid of enhanced alkalinity relative to the initial liquid. As reviewed above, the magnitude of the change in pH may vary, and in some instances ranges from 0.1 to 4 pH units, such as 0.5 to 2.0 pH units.

As reviewed above, in some instances the membrane is an ionically selective membrane, e.g., a cationic or anionic membrane. The choice of whether to use an anionic or cationic membrane may depend on a number of factors, such as whether the membrane mediated alkali enrichment protocol is an osmotic pressure or ionic concentration mediated protocol, the nature of the first and second liquids, etc. For example, cationic membrane mediated protocols may be employed where the first and second liquids are: (i) a high salinity solution, e.g., 75 ppt NaCl solution, and a fresh water solution, e.g., produced water, (ii) a high salinity solution and a fresh water solution charged with carbon dioxide ($CO_2$) gas, e.g., a saturated solution of carbonic acid ($H_2CO_3$), (iii) a high salinity solution and a fresh water solution containing sodium bicarbonate ($NaHCO_3$), e.g., 4,500 ppm $NaHCO_3$.

Figure 4:
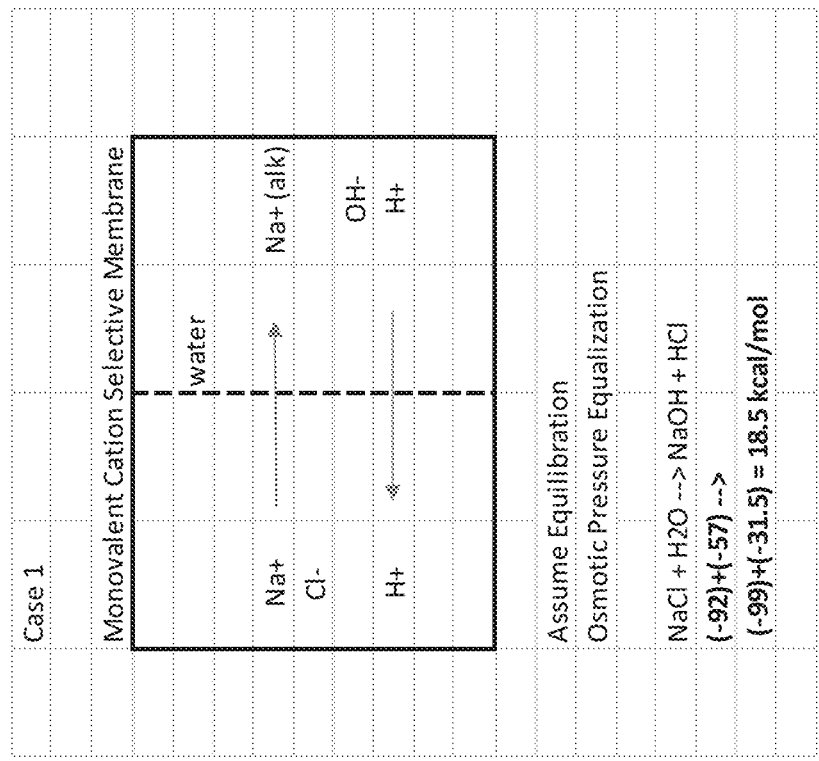
FIG. 4 A monovalent cation selective membrane can convert an initial sodium chloride solution (left) in proximity with a low salinity solution (right) to a HCl solution in proximity with a NaOH solution, respectively. This is done by allowing, sodium and hydrogen ions (H+) to pass freely through the membrane at a cost of 18.5 kcal/mol. The driving force which fuels the non-spontaneous reaction is osmotic pressure due to the high salinity of the initial NaCl solution (left) compared to the low salinity of the fresh water solution (right). The sodium hydroxide solution can be used at a later stage to sequester carbon dioxide.

An example of a cationic membrane mediated protocol is illustrated in FIG. 4. In the protocol illustrated in FIG. 4, diffusion dialysis principles powered by osmotic pressure are employed to drive the formation of sodium hydroxide (NaOH) and hydrochloric acid (HCl) energetically uphill from an initial solution of sodium chloride salt water (NaCl). As illustrated in FIG. 4, two solutions, a concentrated NaCl solution (left of membrane) and a less concentrated, "fresh" water solution (right of membrane) are brought into contact and separated by a cation selective membrane. A cation selective membrane is a diffusion dialysis membrane that is selectively permeable to cations ($Na^+$ and $H^+$ in this case) but is impermeable to negative ions ($Cl^-$ and $OH^-$ in this case). This property allows sodium ions and hydrogen ions to freely pass through the membrane which can produce sodium hydroxide in the fresh water side and hydrochloric acid in the concentrate side. This process is energetically unfavorable at 18.5 kcal/mol of monovalent charge-balanced exchange. However, the concentrate NaCl solution, having a larger salinity than the fresh solution, generates an osmotic pressure which makes sodium/hydrogen ion transfer energetically favorable. This allows the reaction to continue until the osmotic pressure is relieved by the removal of sodium ions and the concurrent generation of sodium hydroxide solution. This sodium hydroxide solution contains alkalinity which can then be used in a later stage, e.g., to sequester $CO_2$ from a flue gas in the form of bicarbonate ion, such as described in greater detail below.

FIG. 5 provides a view of a variation of the cationic membrane mediated protocol illustrated in FIG. 4. Alkalinity generation is limited both by the work stored as osmotic pressure dictated by the difference in ion concentration between the two contacted liquids and by the expensive production of $OH^-$ alkalinity. If carbon dioxide is dissolved in the fresh solution (right side), then the generated alkalinity can take the form of a $CO_2$ (aq)→$HCO_3^-$ transition. This approach requires significantly less energy at 7 kcal/mol of sodium/hydrogen ion exchange than the production of an $OH^-$ ion from water. This approach is illustrated in FIG. 5, where alkalinity is generated as $CO_2$ is being sequestered and the resulting product is not a solution for future $CO_2$ sequestering (i.e., is not a $CO_2$ capture liquid), as in protocol illustrated in FIG. 4, but rather is a solution with $CO_2$ already sequestered in the form of sodium bicarbonate ($NaHCO_3$). This solution can be combined at a later stage with other cations to form useful mineral products such as $CaCO_3$ or $MgCO_3$, e.g., as described in greater detail below.

The same diffusion dialysis technique can be further employed to generate alkalinity to convert bicarbonate ion ($HCO_3^-$) to carbonate ion ($CO_3^{2-}$). A schematic is shown in FIG. 6. As illustrated in FIG. 6, each sodium/hydrogen ion exchange is energetically unfavorable at 11.5 kcal/mol. This is more favorable than the production of raw NaOH but less favorable than the conversion of $CO_2$ (aq)→$HCO_3^-$. As long as the NaCl concentrate solution (left) has a high salinity, the reaction should partially proceed and convert bicarbonate ion to carbonate ion. The product in this case is a carbon dioxide capture solution and can be used at a later date to sequester $CO_2$ from flue gas. The energetics illustrated in the figure were determined by comparing the Gibbs free energy of formation of the products and reactants on a liter, molar basis.

Figure 7:
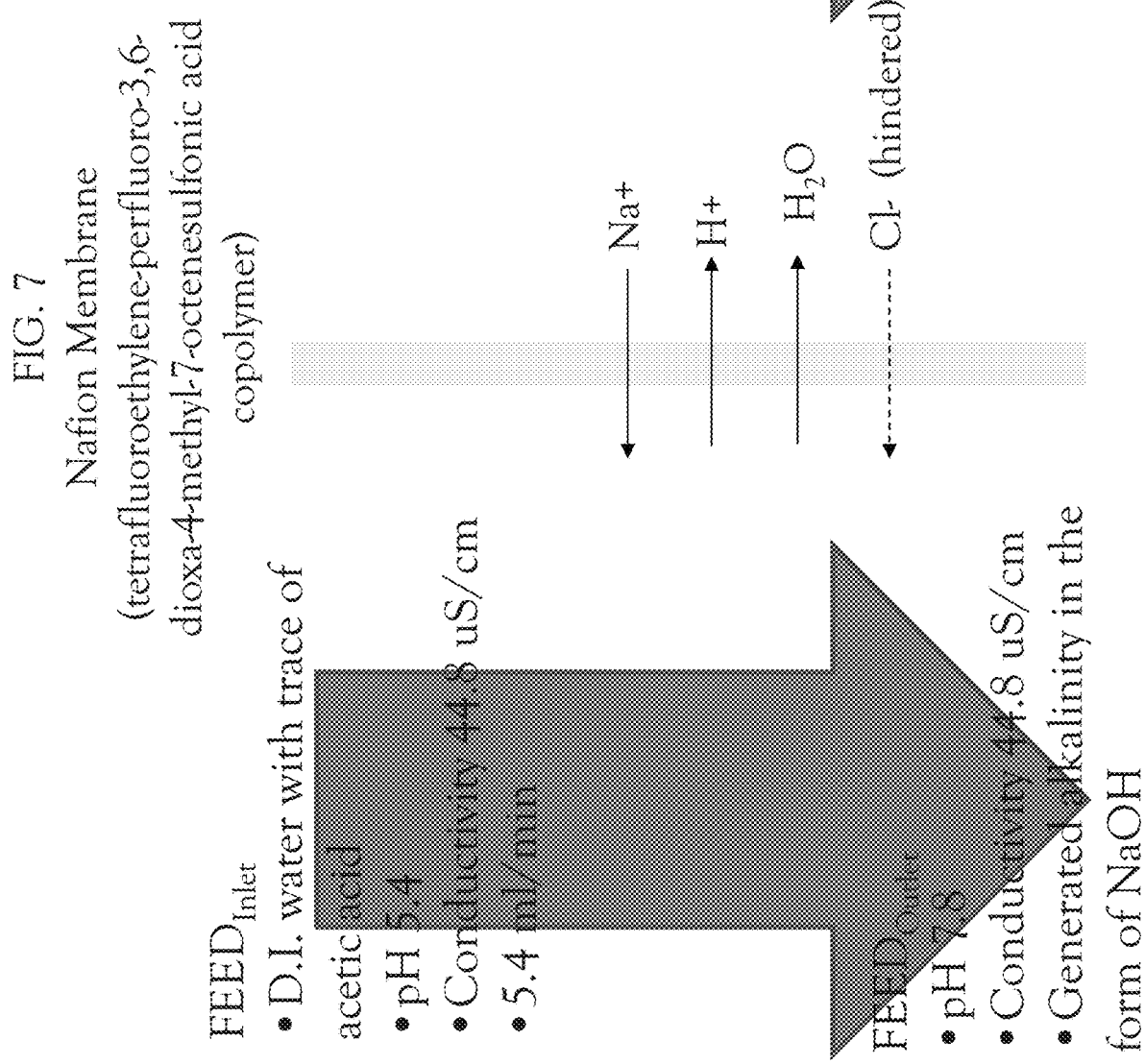
FIG. 7 illustrates a specific cation ion exchange membrane (i.e., cationic membrane) mediated alkali enrichment protocol.

Any cationic membrane may be employed in cationic membrane mediated alkali enrichment protocols. Cationic membranes of interest include, but are not limited to: Selemion™ cation exchange membranes CMV, CMD, HSF, CSO, CMF, and the like. A specific cationic membrane mediated protocol is illustrated in FIG. 7, wherein a Nafion™ Membrane (tetrafluoroethylene-perfluoro-3,6-dioxa-4-methyl-7-octenesulfonic acid copolymer) is employed as the cationic membrane. As shown in FIG. 7, the initial liquid is a feed liquid having a pH of 5.4 and a lower salinity than that of the draw liquid. The output is a product liquid of enhanced alkalinity, i.e., pH 7.8.

Figure 8:
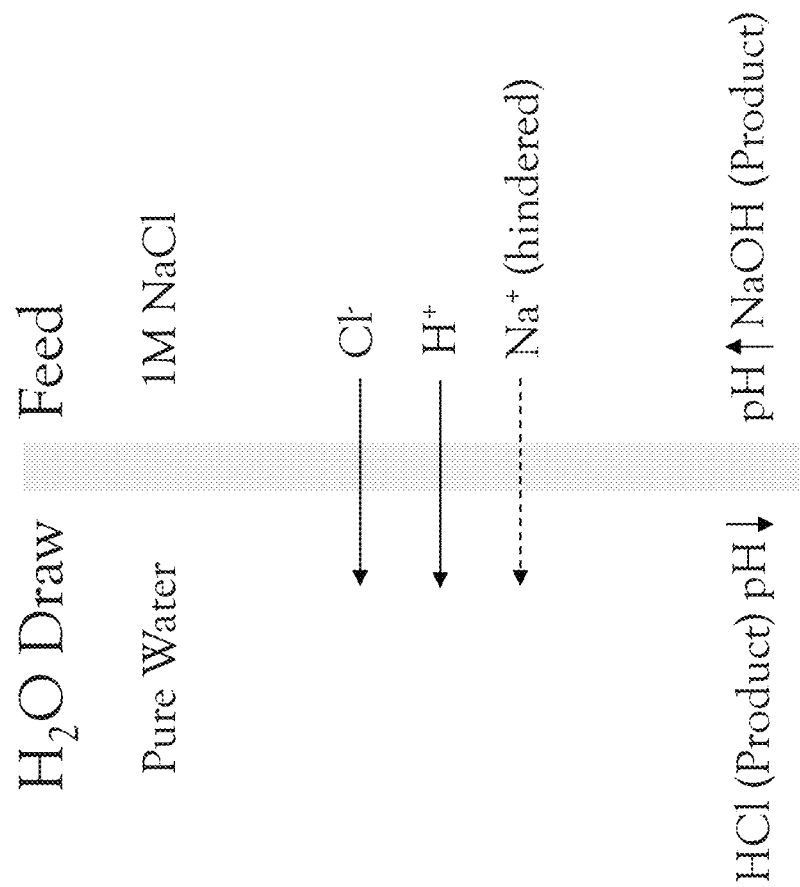
FIGS. 8 and 9 illustrate anionic ion exchange membrane (i.e., anionic membrane) mediated alkali enrichment protocols.
Figure 9:
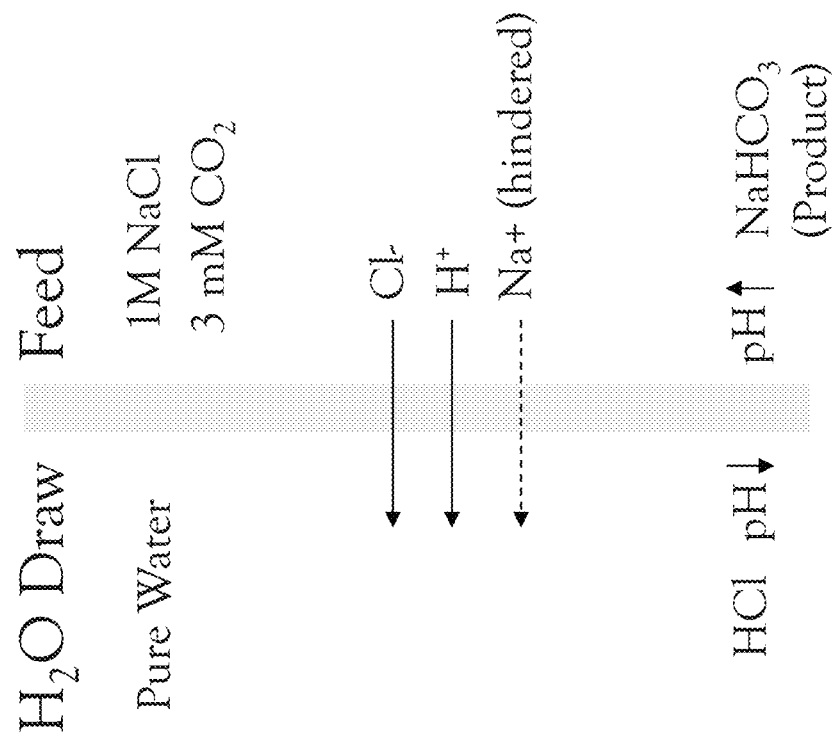

As described above, the choice of whether to use an anionic or cationic membrane may depend on a number of factors, such as whether the membrane mediated alkali enrichment protocol is an osmotic pressure or ionic concentration mediated protocol, the nature of the first and second liquids, etc. For example, anionic membrane mediated protocols may be employed where the first and second liquids are: (i) a high salinity solution, e.g., 60 ppt NaCl solution, and a fresh water solution, e.g., produced water, (ii) a high salinity solution charged with carbon dioxide ($CO_2$) gas, e.g., 60 ppt NaCl solution saturated with carbonic acid ($H_2CO_3$), and a fresh water solution, e.g. produced water. Anionic membranes of interest include, but are not limited to: Selemion™ anion exchange membranes AMV, AMT, DSV, AAV, ASV, AHO, APS4, and the like. Examples of anionic membrane mediated alkali enrichment protocols are illustrated in FIGS. 8 and 9.

Membranes employed in membrane mediated alkali enrichment protocols may vary with respect to porosity. In some embodiments, employed membranes may be size-based separators that allow molecules under a certain size to pass through, while preventing larger molecules from passing through. In this way, the membranes can be used to selectively retain molecules that are over a certain size while allowing other molecules that are below a certain size to pass through. In some embodiments, employed membranes include pores that range in size from 1 micron up to 2 microns, up to 3 microns, up to 4 microns, up to 5 microns, up to 6 microns, up to 7 microns, up to 8 microns, up to 9 microns, or up to 10 microns or more.

In some embodiments, the membrane may include pores ranging in size from 1 Angstrom up to 10 Angstroms, up to 20 Angstroms, up to 30 Angstroms, up to 40 Angstroms, up to 50 Angstroms, up to 60 Angstroms, up to 70 Angstroms, up to 80 Angstroms, up to 90 Angstroms, up to 100 Angstroms, up to 200 Angstroms, up to 300 Angstroms, up to 400 Angstroms, up to 00 Angstroms, up to 600 Angstroms, up to 700 Angstroms, up to 800 Angstroms, up to 900 Angstroms or more. In some embodiments, the membrane includes a reverse osmosis membrane having pores ranging in size from 5 Angstroms up to 6 Angstroms, up to 7 Angstroms, up to 8 Angstroms.

In some embodiments, the selective membrane may be a nanofiltration membrane, such as a membrane having pores ranging in size from 1 nanometer to 2 nanometers. In some embodiments, the selective membrane may include an ultrafiltration membrane, such as a membrane having pores ranging in size from 10 nanometers up to 20 nanometers, up to 30 nanometers, up to 40 nanometers, up to 50 nanometers, up to 60 nanometers, up to 70 nanometers, up to 80 nanometers, up to 90 nanometers, up to 100 nanometers, up to 125 nanometers, up to 150 nanometers, up to 175 nanometers, up to 200 nanometers, or more.

In some embodiments, the membrane may contain catalysts to aid in the solubility and mobility of waters and ions within the membrane. The catalysts may hasten chemical reactions which further aid in the selective partitioning of waters and ions between the feed and the draw solutions. For example, the membrane systems employed in methods of the invention may include a metal particle composite membrane system. As the membranes are metal particle composite membranes, they include a metal particle component and a membrane component, which components may be stably associated with each other to provide the composite membrane. Of interest as membrane components are membranes that are configured to provide for ion transport across the membrane using a dehydration/resolvation mechanism, as opposed to a size exclusion mechanism. In other words, membranes of interest are membranes that are configured to provide for dehydration/resolvation mediated ion transport, in contrast to size exclusion ion transport. With respect to ions that are transported by the membrane, as reviewed above, membranes of interest are those that provide for relatively fast $Na^+$ diffusion relative to $Cl^-$. Other ions that that may be transported across the membrane at a relatively faster rate than $Cl^-$ include potassium ion ($K^+$), hydrogen ions and hydroxide ions, etc. Other ions that may be transported across the membrane at a rate approximating or less than $Cl^-$ include sulfate ions ($SO_4^{2-}$), Nitrogen oxides (nitrates, nitrites), bicarbonates, carbonates and etc. In some instances, the membrane is one that provides for little, if any, transport of dissolved inorganic carbon (DIC), i.e., the membrane provides for little, if any, transport of $CO_2$, carbonic acid, bicarbonate ion and carbonate.

The metal particle component of such membranes is made up of a population of metal particles that are stably associated with the membrane component. By stably associated is meant that the metal particles do not dissociate from the membrane component under conditions of use in the methods of the invention, e.g., as described herein. The metal particles may be stably associated with the membrane component in any desired manner, such as being embedded in the membrane matrix, being present on the surface of the membrane matrix, etc., and combinations thereof. The metal particles may be covalently or non-covalently (e.g., ionic or electrostatically) bonded to the membrane component to provide for the desired stable association using any convenient protocol, where bonding protocols of interest include, but are not limited to, those described in published PCT Publication No. WO2012/166701, the disclosure of which is herein incorporated by reference.

The metal particles may range in size. The diameter of the particles may vary, ranging in some instances from a single nanometer to several microns. As such, in some instances the particles have a diameter ranging from 1 to 10,000 nm, such as 5 to 5,000 nm, including 10 to 1,000 nm. In some instances, the metal particles are metal nanoparticles, ranging in diameter from 1 to 1,000 nm, such as 5 to 750 nm, including 10 to 500 nm. A given metal particle component may be substantially homogeneous with respect to the diameter or size of the particles which make up the component, or may include a variety of different particle sizes, as desired. The metal particles may include a variety of different metals, or alloys or oxides thereof. Metal particles of interest are particles that catalyze the ionization of water into the hydrogen ions and hydroxide ions, e.g., as described above. Metals of interest include, but are not limited to: gold, platinum, palladium, nickel, cobalt, manganese, chromium, silver, copper, iron, ruthenium, rhodium, zinc, and alloys and oxides thereof. (See e.g., Chen et al., A first principles study of water dissociation on small copper clusters. Physical chemistry chemical physics: PCCP 12, 9845 (Sep. 7, 2010); Wang et al., A systematic theoretical study of water dissociation on clean and oxygen-preadsorbed transition metals. Journal of Catalysis 244, 10 (Nov. 15, 2006)). A given metal particle component may be substantially homogeneous with respect to the metal of the particles which make up the component, or may include a variety of different metal species, as desired. The mass ratio of metal component to membrane component in the composite membrane may vary so long as the amount of metal particles present in the membrane component is sufficient to catalyze the ionization of water to a desired extent (e.g., a measurable extent), ranging in some instances from 5:1 to 1:100, such as 2:1 to 1:2.

Figure 10:
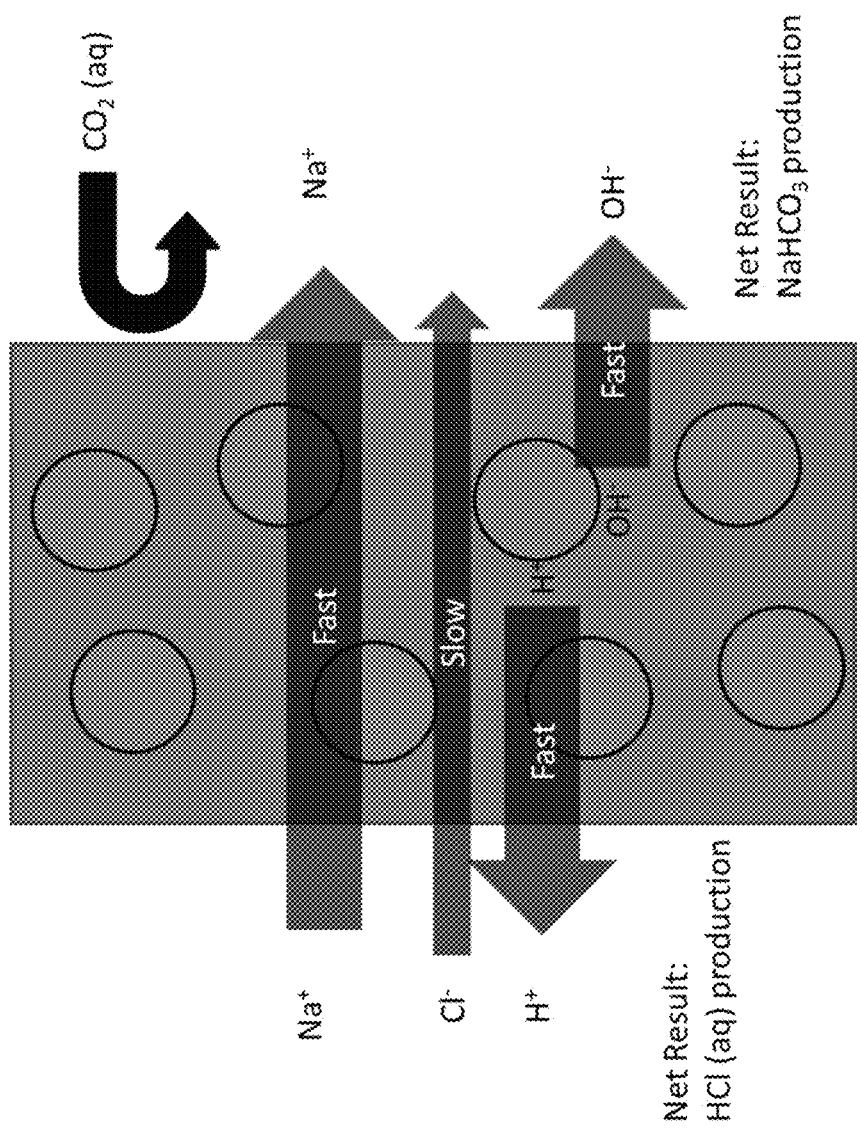
FIG. 10 provides an illustration of a composite metal particle membrane in accordance with an embodiment of the invention.

FIG. 10 provides an illustration of a composite metal particle membrane in accordance with an embodiment of the invention. The composite membrane shown in FIG. 10 includes a hydrated polymer, such as polyvinyl alcohol (PVA) or cellulose acetate (CA). Embedded within the membrane are metallic nanoparticles that catalyze the ionization of water, such as nickel or zinc. The membrane is relatively impervious to $CO_2$ (aq), quickly permeable to $Na^+$, very slowly permeable to $Cl^-$ and has very quick $OH^-$, and $H^+$ transport. The important products produced upon contact with a first aqueous liquid and a second aqueous liquid are $NaHCO_3$ on the base side and $HCl$ on the acid side. Metal particle composite membranes of interest, e.g., as described above, are further described in U.S. Patent Application Ser. No. 62/056,377 filed on Sep. 26, 2014, the disclosure of which is herein incorporated by reference.

A given membrane may have a variety of different physical dimensions. In some instances, membranes of interest having thicknesses ranging from 0.001 mm to 1 mm, such as 0.005 mm to 0.05 mm and including 0.03 mm to 0.3 mm. Membranes in accordance with embodiments of the invention can have a variety of configurations including thin films, hollow fiber membranes, spiral wound membranes, monofilaments and disk tubes. Membranes of interest can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$. The material selected for use as the membrane may be selected to be able to withstand various process conditions to which the membrane may be subjected. For example, it may be desirable that the membrane be able to withstand elevated temperatures, such as those associated with sterilization or other high temperature processes. In some embodiments, a membrane module may be operated at a temperature in the range of 0 to 100° C., such as 40 to 50° C. Likewise, the membrane may be selected to be able to maintain integrity under various pH conditions, such as a pH level ranging from 2 to 11, such as 7 to 10. The thickness of the membrane may vary, ranging in some instances from 0.01 mm to 0.1 mm, such as 0.02 mm to 0.06 mm and including 0.03 mm to 0.04 mm.

Membranes employed in methods of the invention may be present in distinct alkali enrichment units, which units are configured produce a desired amount of alkalinity per time. For example, alkali enrichment units may be configured to produce 0.1 to 10 moles of alkalinity per square meter of membrane per hour (mol alkalinity/$m^2$ h), such as 0.5 to 1.5 mol alkalinity/$m^2$ h. A given unit may include one or more square meter ($m^2$) of membrane, such as two or more $m^2$ membrane, e.g., 5 $m^2$ to 500,000 $m^2$ membrane, such as 40 $m^2$ to 400 $m^2$ membrane, including 50,000 $m^2$ to 250,000 $m^2$ membrane, which may be arranged so that the first and second fluids flow sequentially past each of the membranes, e.g., in a co- or counter-current fashion. In such units, the one or $m^2$ membrane may be positioned within a housing or casing, e.g., in a plate-and-frame structure or "stack". The housing may be sized and shaped to accommodate the membrane(s) positioned therein. For example, the housing may be substantially cylindrical if housing spirally wound forward osmosis membranes. Alternatively, the housing may have a box configuration, e.g., where multiple membranes are arranged therein in a stacked or plate-and-frame structure. The housing of the membrane module may contain inlets to provide first and second liquids to the membrane module as well as outlets for withdrawal of product streams from the membrane module. In some embodiments, the housing may provide at least one reservoir or chamber for holding or storing a fluid to be introduced to or withdrawn from the membrane module. In some embodiments, the housing may be insulated.

In accordance with one or more embodiments, the alkali enrichment protocol may be performed using a forward osmosis separation system, which may be constructed and arranged so as to bring a first liquid and a second liquid into contact with first and second sides of a membrane (such as described above), respectively. Although the first and second liquids can remain stagnant, in some instances both the first and second liquids are introduced by cross flow, i.e., flows parallel to the surface of the membrane. This configuration may increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

The conditions of the alkali enrichment step may vary as desired. The temperature of the liquids may vary, ranging in some instances from 0 to 100° C., such as 4 to 80° C. The temperatures of the liquids may be the same or different. When different, the magnitude of any temperature variation may vary, ranging in some instances from 0.1 to 95° C., such as 30 to 45° C. The pressure of the liquids may also vary, ranging in some instances from 1 to 30 bar, such as 1.5 to 2 bar. When different, the magnitude of any pressure variation may vary, ranging in some instances from 0.1 to 30 bar, such as 0.5 to 1 bar. The flow rates of the liquids may be the same or different, and in some instances range from 0.25 to 10 gallon/min, such as 0.5 to 1 gallon/min. When different, the magnitude of any flow rate variation between the draw and feed may vary, and in some instances ranges from 0.05 to 9.75 gallon/min, such as 1 to 3 gallon/min. Forward osmosis mediated alkali enrichment protocols (also referred to sometimes as alkali recovery protocols) are further described in U.S. Provisional Application Ser. No. 61/990,486 filed on May 8, 2014, the disclosure of which is herein incorporated by reference.

The nature of the first (i.e., initial) and second liquids that are processed in methods of the invention may vary. The initial liquid may be any liquid for which an increase in alkalinity is desired. The initial liquid may be an aqueous medium that may vary depending on the specific protocol being performed. Aqueous media of interest include pure water (e.g., fresh water) as well as water that includes one or more solutes, e.g., divalent cations, e.g., $Ca^{2+}$, $Mg^{2+}$, $Be^{2+}$, $Ba^{2+}$, $Sr^{2+}$, counterions, e.g., carbonate, hydroxide, etc. The aqueous medium may be a naturally occurring or man-made medium, as desired. Naturally occurring aqueous media include, but are not limited to, waters obtained from seas, oceans, lakes, swamps, estuaries, lagoons, brines, geological brines, alkaline lakes, inland seas, brackish waters, etc. Man-made sources of aqueous media may also vary, and may include brines produced by water desalination plants, waste waters, and the like. First and second liquid pairings of interest include, but are not limited to: fresh and salt water (e.g., river water and seawater), salt water and desalination waste water (e.g., RO retentate), fresh water charged with $CO_2$-containing gas, e.g., industrial flue gas, and salt water, fresh water and salt water charged with $CO_2$-containing gas, e.g., industrial flue gas, acidic salt water and fresh water and the like, or any combination of the waters disclosed herein.

In some embodiments, the first liquid is a carbonate buffered aqueous medium. Carbonate buffered aqueous media employed in methods of the invention include liquid media in which a carbonate buffer is present. As such, liquid aqueous media of interest include dissolved $CO_2$, water, carbonic acid ($H_2CO_3$), bicarbonate ions ($HCO_3^-$), hydrogen ions ($H^+$) and carbonate ions ($CO_3^{2-}$). The constituents of the carbonate buffer in the aqueous media are governed by the equation:

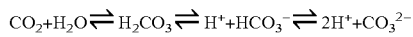

Where desired, the initial liquid may be one that has been contacted with a $CO_2$-containing gas. In words, the initial liquid is one to which a gaseous source of $CO_2$ has been contacted such that the initial liquid that is subjected to the alkali enrichment protocol is one that includes an amount of dissolved inorganic carbon (DIC), i.e., it is a $CO_2$ charged liquid. In such instances, the $CO_2$ charged liquid includes an amount of dissolved $CO_2$. The amount of $CO_2$ dissolved in the liquid may vary, and in some instances ranges from 0.05 to 40 mM, such as 1 to 35 mM, including 25 to 30 mM. In this case, a $CO_2$ capture solution can be generated based on carbonate ion alkalinity. In some instances, carbonate ion alkalinity will be 100 mM or greater, such as 250 mM, and including 500-1,000 mM, or more. Such instances are described in greater detail below.

The second liquid employed in methods of the invention may vary. In some instances, the second liquid differs from the first liquid in terms of osmotic potential, where the osmotic potential of a given second liquid may be higher or lower relative to the initial liquid with which it is employed, depending on the particular alkali recover protocol that is used (e.g., as described above). The magnitude of the difference in osmotic potential between any two given liquid pairs may vary, and in some instances ranges from 0.1 bar to 150 bar, such as 20 bar to 60 bar, including 25 bar to 35 bar.

Any convenient liquid may be employed as the second liquid. In some embodiments, a second liquid may include a high ionic strength medium. In some embodiments, the second liquid contains non-hydrogen monovalent cations that are capable of crossing the membrane system to provide for charge balance and thereby facility in the alkalinity increase of the first liquid. In certain embodiments, the non-hydrogen monovalent cations include, but are not limited to: Na+, K+, and $NH_4^+$. Second liquids of interest include aqueous media having a salinity of 2 ppt or more, such as 5 ppt or more, including 10 ppt or more. In some instances the second liquid is an aqueous medium having a salinity that ranges from 3 to 50 ppt, such as 5 to 35 ppt. The pH of the second liquid may vary, and in some instances ranges from 4 to 12, such as 5 to 10 and including 6 to 9. In some instances, the second liquid may be referred to as a brine draw liquid. The term "brine" refers to water saturated or nearly saturated with salt and has a salinity that is 50 ppt (parts per thousand) or greater, such as 60 ppt or greater, and including 95 ppt or greater. Brine draw liquids of interest include, but are not limited to: man-made brines, such as geothermal plant wastewaters, oil field produced brines, fracking operation produced waters, desalination waste waters, etc., as well as natural brines, such as surface brines found in bodies of water on the surface of the earth and deep brines, found underneath the earth, as well as other liquids having a salinity as described above. In some embodiments, a draw liquid includes a geological brine or a brine discharge from a desalination plant.

As reviewed above, the second or draw liquid employed in the alkali enrichment protocol may vary. One type of draw liquid that may be employed is concrete production wash water, where the phrase "concrete production wash water" refers to wash water from concrete plants, trucks, etc. Concrete production wash water may be obtained from a variety of sources, including but not limited to: rinsing a ready-mix concrete truck after it has returned from a site project. Such wash waters may have pH in the range of 8-13, such as pH 9-10 or pH 11-12. Concrete production wash waters may contain commercial chemical admixtures for concrete, such as, but not limited to, chemical admixtures that comply with ASTM designation C494 or ASTM designation C260, that contain organic alkalinity such as, but not limited to, primary, secondary and tertiary amines, etc. Concrete production wash waters may also contain, in addition to chemical admixtures for concrete, dissolved metal cations, for example, dissolved monovalent alkali metal cations such as Lithium ($Li^+$), sodium ($Na^+$) or potassium ($K^+$), dissolved alkaline earth metal cations such as calcium ($Ca^{2+}$), or other dissolved metal cations such as aluminum ($Al^{3+}$) or iron ($Fe^{2+}$, $Fe^{3+}$). The positively charged cations may be charged-balanced with negatively charged anions such as, but not limited to, monovalent bicarbonate ($HCO^{3+}$), chloride ($Cl^-$), hydroxide ($OH^-$) or nitrate ($NO_3^-$) ions, as well as divalent sulfate ($SO_4^{2-}$) ions. The pH of and the alkalinity available in the concrete production wash water may be reflected by the weight percent of calcium oxide (CaO) present in the cement used at the concrete plant. The cement may be 50-75 weight percent (wt %) CaO, such as but not limited to 51-59 wt % CaO or 61-67 wt % CaO. Based on the ready-mix concrete formulation mentioned above, a concrete plant that uses cement that is 65 wt % CaO has 390 lb CaO per cubic yard of concrete. Treating CaO with water produces calcium hydroxide ($Ca(OH)_2$), which has a solubility limit of 0.185 parts $Ca(OH)_2$ per 100 parts water (at 100° C.). If, for example, a ready-mix concrete truck returned to the concrete plant with two cubic yards of concrete left over from a project, and the truck were rinsed with, e.g., 500 gallons of water, the resulting wash water would have 954 lb $Ca(OH)_2$ alkalinity (Calculation: (390 lb $CaO/yd^3$)×(2 $yd^3$)/(56.08 g CaO/mol)×(74.10 g $Ca(OH)_2$/mol)×(0.185 parts/100 parts)×(500 parts)=954 lb $Ca(OH)_2$).

Introduction of the first liquid and the second liquid into a membrane system, e.g., as described above, results in the production of a product liquid (i.e., enhanced alkalinity liquid) from the first liquid, where the product liquid has an increased alkalinity as compared to the first liquid, i.e., the product liquid is an enhanced alkalinity liquid. As summarized above, while the increase in alkalinity may vary, in some instances the magnitude of the increase in pH ranges from 0.1 to 10, such as 1 to 9, including 2.5 to 7.5, e.g., 3 to 7. While the pH of the product liquid may vary, in some instances the pH of the product liquid ranges from 5 to 14, such as 6 to 13, including 7 to 12, e.g., 8 to 11.

In addition, methods of the invention may produce an acidic by-product liquid. The acidic by-product liquid may vary, and is one that is produced from the second. The pH of the acidic by-product liquid ranges in some instances from 0 to 8, such as 3 to 5. The nature of the acidic by-product liquid may vary, where in some instances the acidic by-product liquid includes HCl.

Alkali enrichment protocols and systems for practicing the same that may be adapted for use methods of the invention, e.g., as described above, include those described in U.S. Patent Application No. 61/990,486 filed on May 8, 2014 and U.S. Patent Application Ser. No. 62/051,100 filed on Sep. 16, 2014; the disclosures of which are herein incorporated by reference.

As indicated above, an alkali enrichment protocol (e.g., as described above) may be employed at one or more times during a $CO_2$ sequestration process, e.g., in producing a $CO_2$ capture liquid, to increase the alkalinity of a $CO_2$ contacted liquid (i.e., a liquid that includes dissolved inorganic carbon derived from $CO_2$), etc. Examples of different methods in which an alkali enrichment protocol is employed at different times are described in greater detail in the context of specific embodiments as illustrated by the accompanying figures.

$CO_2/CO_2$ Capture Liquid Contact

As indicated above, embodiments of methods as described herein include a step of contacting a gaseous source of $CO_2$ with a liquid under conditions sufficient for $CO_2$ molecules in the gas to dissolve into the liquid and thereby be separated from the gas, e.g., to produce a liquid condensed phase (LCP) containing liquid. As such, aspects of such embodiments include contacting a $CO_2$ containing gas with an aqueous medium to remove $CO_2$ from the $CO_2$ containing gas.

The $CO_2$-containing gas that is contacted with the $CO_2$ sequestration liquid to produce the high DIC containing liquid may be pure $CO_2$ or be combined with one or more other gasses and/or particulate components, depending upon the source, e.g., it may be a multi-component gas (i.e., a multi-component gaseous stream). While the amount of $CO_2$ in such gasses may vary, in some instances the $CO_2$-containing gases have a $pCO_2$ of $10^3$ or higher, such as $10^4$ Pa or higher, such as $10^5$ Pa or higher, including $10^6$ Pa or higher. The amount of $CO_2$ in the $CO_2$-containing gas, in some instances, may be 20,000 or greater, e.g., 50,000 ppm or greater, such as 100,000 ppm or greater, including 150,000 ppm or greater, e.g., 500,000 ppm or greater, 750,000 ppm or greater, 900,000 ppm or greater, up to and including 1,000,000 ppm or greater (in pure $CO_2$ exhaust the concentration is 1,000,000 ppm) and in some instances may range from 10,000 to 500,000 ppm, such as 50,000 to 250,000 ppm, including 100,000 to 150,000 ppm. The temperature of the $CO_2$-containing gas may also vary, ranging in some instances from 0 to 1800° C., such as 100 to 1200° C. and including 600 to 700° C.

In some instances, a $CO_2$-containing gas is not pure $CO_2$, in that it contains one or more additional gasses and/or trace elements. Additional gasses that may be present in the $CO_2$-containing gas include, but are not limited to water, nitrogen, mononitrogen oxides, e.g., NO, $NO_2$, and $NO_3$, oxygen, sulfur, monosulfur oxides, e.g., SO, $SO_2$ and $SO_3$), volatile organic compounds, e.g., benzo(a)pyrene $C_2OH_{12}$, benzo(g,h,l)perylene $C_{22}H_{12}$, dibenzo(a,h)anthracene $C_{22}H_{14}$, etc. Particulate components that may be present in the $CO_2$-containing gas include, but are not limited to particles of solids or liquids suspended in the gas, e.g., heavy metals such as strontium, barium, mercury, thallium, etc.

In certain embodiments, $CO_2$-containing gases are obtained from an industrial plant, e.g., where the $CO_2$-containing gas is a waste feed from an industrial plant. Industrial plants from which the $CO_2$-containing gas may be obtained, e.g., as a waste feed from the industrial plant, may vary. Industrial plants of interest include, but are not limited to, power plants and industrial product manufacturing plants, such as but not limited to chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

Where the $CO_2$ containing gas is a multi-component gaseous medium that includes $CO_2$ and other gases, e.g., as described above, the $CO_2$ containing gas may be processed to increase the partial pressure of $CO_2$ in the gas prior to contact with the $CO_2$ capture liquid. In such instances, the magnitude of increase of the $CO_2$ in the $CO_2$ containing gas may vary, where in some instances the increase may be 5% (v/v) or more, such as 10% (v/v) or more, 20% (v/v) or more, 25% (v/v) or more or more, 50% (v/v) or more, 75% (v/v) or more, including 80 to 90% (v/v) or more. For example, where the gaseous components of non-treated flue gas input stream contain <1-20% (v/v) $CO_2$, the gaseous stream may be processed to produce a treated flue gas output stream that contains 30-90% (v/v) $CO_2$. While separation of non-$CO_2$ components from a gaseous stream may be accomplished using any convenient protocol, in some instances a membrane mediated gas separation protocol is employed. While such protocols may vary, a number of $CO_2$ selective membrane mediated gas separation protocols may be used, including but not limited to: those described in Ramasubramian et al., "Membrane processes for carbon capture from coal-fired power plant flue gas: A modeling and cost study," J. Membrane Science (2012) 421-422: 299-310; Published PCT Application Serial No. WO/2006/050531 titled "Membranes, Methods Of Making Membranes, And Methods Of Separating Gases Using Membranes" and plastic-based, nano-engineered membranes (e.g., from Membrane Research Group (MEMFO) at the Chemical Engineering Department of the Norwegian University of Science and Technology (NTNU)) as described in Biopact at "http://news.mongabay.com/bioenergy/2007/09/new-plastic-based-nano-engineered-co2.html"; the disclosures of which are herein incorporated by reference.

The aqueous medium that is contacted with the gaseous source of $CO_2$ (i.e., the $CO_2$ containing gas) may vary, ranging from fresh water to bicarbonate buffered aqueous media. Bicarbonate buffered aqueous media employed in embodiments of the invention include liquid media in which a bicarbonate buffer is present. As such, liquid aqueous media of interest include dissolved $CO_2$, water, carbonic acid ($H_2CO_3$), bicarbonate ions ($HCO_3^-$), protons ($H^+$) and carbonate ions ($CO_3^{2-}$). The constituents of the bicarbonate buffer in the aqueous media are governed by the equation:

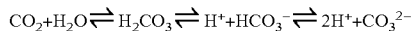
$$CO_2 + H_2O \rightleftharpoons H_2CO_3 \rightleftharpoons H^+ + HCO_3^- \rightleftharpoons 2H^+ + CO_3^{2-}$$

The pH of the bicarbonate buffered aqueous media may vary, ranging in some instances from 7 to 11, such as 8 to 11, e.g., 8 to 10, including 8 to 9. In some instances, the pH ranges from 8.2 to 8.7, such as from 8.4 to 8.55. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Of interest in some instances are waters that provide for excess alkalinity, which is defined as alkalinity that is provided by sources other than bicarbonate ion. In these instances, the amount of excess alkalinity may vary, so long as it is sufficient to provide 1.0 or slightly less, e.g., 0.9, equivalents of alkalinity. Waters of interest include those that provide excess alkalinity (meq/liter) of 30 or higher, such as 40 or higher, 50 or higher, 60 or higher, 70 or higher, 80 or higher, 90 or higher, 100 or higher, etc. Where such waters are employed, no other source of alkalinity, e.g., NaOH, is required.

In some instances, the aqueous medium that is contacted with the $CO_2$ containing gas is one which, in addition to the bicarbonate buffering system (e.g., as described above), further includes an amount of divalent cations. Inclusion of divalent cations in the aqueous medium can allow the concentration of bicarbonate ion in the bicarbonate rich product to be increased, thereby allowing a much larger amount of $CO_2$ to become sequestered as bicarbonate ion in the bicarbonate rich product. In such instances, bicarbonate ion concentrations that exceed 5,000 ppm or greater, such as 10,000 ppm or greater, including 15,000 ppm or greater may be achieved. For instance, calcium and magnesium occur in seawater at concentrations of 400 and 1200 ppm respectively. Through the formation of a bicarbonate rich product using seawater (or an analogous water as the aqueous medium), bicarbonate ion concentrations that exceed 10,000 ppm or greater may be achieved.

In such embodiments, the total amount of divalent cation source in the medium, which divalent cation source may be made up of a single divalent cation species (such as $Ca^{2+}$) or two or more distinct divalent cation species (e.g., $Ca^{2+}$, $Mg^{2+}$, etc.), may vary, and in some instances is 100 ppm or greater, such as 200 ppm or greater, including 300 ppm or greater, such as 500 ppm or greater, including 750 ppm or greater, such as 1,000 ppm or greater, e.g., 1,500 ppm or greater, including 2,000 ppm or greater. Divalent cations of interest that may be employed, either alone or in combination, as the divalent cation source include, but are not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$ and the like. Other cations of interest that may or may not be divalent include, but are not limited to: $Na^+$, $K^+$, $NH^{4+}$, and $Li^+$, as well as cationic species of Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Naturally occurring aqueous media which include a cation source, divalent or otherwise, and therefore may be employed in such embodiments include, but are not limited to: aqueous media obtained from seas, oceans, estuaries, lagoons, brines, alkaline lakes, inland seas, etc.

In some instances, the aqueous medium is one that has been subjected to an alkali enrichment process, such as a membrane mediated alkali enrichment process, e.g., as described above. Alkali enrichment processes of interest include, but are not limited to, those described in U.S. Patent Application Ser. Nos. 61/990,486 filed on May 8, 2014; 62/051,100 filed on Sep. 16, 2014 and 62/056,377 filed on Sep. 26, 2014; the disclosures of which are herein incorporated by reference.

In some instances, the divalent cations are not present in any substantial amount in the liquid that is contacted with the $CO^2$ gas. In these embodiments, the amount of divalent cations, if any, that is present, is such as to not give rise to measureable scaling in the $CO_2$/liquid contactor. In some embodiments of these methods, the aqueous medium may be softened prior to hydrogen ion removal. In other words, an initial aqueous medium may be subject to a hardness reduction protocol prior to being subjected to a hydrogen ion removal protocol, e.g., as described above. Hardness reduction protocols of interest include removing divalent cations, e.g., alkaline earth metal divalent cations, from an initial aqueous medium.

While any convenient hardness reduction protocol may be employed, in some instances the hardness reduction protocol includes contacting an initial aqueous medium with a divalent cation selective membrane under conditions sufficient to remove at least a portion of the divalent cations from the initial aqueous medium. Divalent cation selective membranes that may be used in embodiments of the invention are configured or adapted to prevent the passage of divalent cations from one side of the membrane to the other, while allowing liquid and smaller molecules (e.g., molecules having a diameter that is smaller than the diameter of a hydrated divalent cation) to pass from one side of the membrane to the other. Divalent cation selective membranes in accordance with embodiments of the invention have pores or passages of a size that allows liquid and smaller molecules to pass through, but prevents or blocks the passage of particles having a size equal to or greater than the diameter of a hydrated divalent cation, including but not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$.

In some embodiments, an aqueous medium membrane feed is contacted with a divalent cation selective membrane under conditions that are sufficient to separate the liquid component of the feed and smaller molecules having a diameter that is less than that of a hydrated divalent cation from the retentate. Processing conditions may include a range of positive or negative pressures applied to the membrane. Where desired, positive or negative pressure may be applied to the membrane such that a pressure differential is established across the membrane. For example, in some embodiments, a membrane feed is contacted with a divalent cation selective membrane such that a pressure differential across the membrane ranges from 1 atmosphere (ATM) up to 50 ATM, such as 20-30 ATM is established.

In some embodiments, processing conditions may include a range of suitable temperatures. For example, in some embodiments, a membrane feed is contacted with a divalent cation selective membrane at a temperature ranging from 0° C. up to 100° C., such as 40-50° C. Likewise, a membrane may be selected to be able to maintain integrity under various pH conditions, such as a pH ranging from 2 to 11, such as 7 to 10.

Contacting the aqueous medium with the divalent cation selective membrane results in the formation of a permeate having a reduced concentration of divalent cations relative to the feed, and a retentate having an increased concentration of divalent cations relative to the feed. Aspects of the methods involve subjecting the reduced divalent cation concentration permeate to the hydrogen ion removal process described above. Aspects of the methods also involve subjecting the increased divalent cation concentration retentate to further processing, as described below.

In some embodiments, the divalent cation selective membrane is a nanofiltration membrane. By "nanofiltration membrane" is meant a membrane whose pores range in diameter from 1 to 10 Angstroms, such as 5 to 8 Angstroms, and are configured to retain divalent cations, such as $Mg^{2+}$ and $Ca^{2+}$ cations, in the retentate, while allowing smaller species to pass through the membrane with the permeate. For example, in certain embodiments, a nanofiltration membrane is adapted to retain hydrated divalent cations (e.g., $Ca^{2+}$, $Mg^{2+}$) on a first side of the membrane, while allowing smaller hydrated monovalent ions to pass to the other side of the membrane. In some embodiments, a nanofiltration membrane is configured such that in use, the nanofiltration membrane can retain divalent cations in the retentate without adding additional ions, such as sodium ions, to the feed. In some embodiments, a nanofiltration membrane is configured such that in use, the nanofiltration membrane can retain divalent cations in the retentate without the need to continuously heat or cool the solution.

Nanofiltration membranes in accordance with embodiments of the invention may have varying pore density, and in some instances have a pore density ranging from 1 to 150 pores per square centimeter, such as 50 to 100 pores per square centimeter. The pore dimensions and pore density may be controlled using suitable process conditions, such as controlled pH, temperature and process timing employed during a nanofiltration membrane fabrication process.

The material from which a nanofiltration membrane is made may be selected to be able to withstand various process conditions to which the membrane may be subjected during processing. For example, it may be desirable that the membrane be able to withstand elevated temperatures, such as those associated with sterilization or other high temperature processes, as well as elevated pressures.

In some embodiments, a nanofiltration membrane has a standardized design, such as, e.g., a spiral wound module design or a tubular module design, having a range of standard diameters to fit standard pressure vessel sizes and/or components thereof. In certain embodiments, a standardized nanofiltration membrane module is configured to facilitate the connection of multiple membrane modules in series and/or in parallel within a standardized pressure vessel.

In some embodiments, a nanofiltration membrane may be in the form of a cartridge that is positioned within a housing or casing. The housing may be sized and shaped to accommodate the membrane(s) positioned therein. For example, the housing may be substantially cylindrical if housing a spirally wound membrane. The housing of the module may contain inlets or channels to facilitate the introduction of a membrane feed into the module, as well as outlets for withdrawal of product streams from the module. In some embodiments, the housing may provide at least one reservoir or chamber for holding or storing a fluid to be introduced into or withdrawn from the module. In some embodiments, the housing may be insulated.

Protocols for softening an aqueous medium are further described in U.S. Provisional Application Ser. No. 62/051, 100 filed on Sep. 16, 2014; the disclosure of which is herein incorporated by reference.

Contact of the $CO_2$ containing gas and bicarbonate buffered aqueous medium is done under conditions sufficient to remove $CO_2$ from the $CO_2$ containing gas (i.e., the $CO_2$ containing gaseous stream), and increase the dissolved inorganic carbon (including bicarbonate ion) concentration of the aqueous medium. The $CO_2$ containing gas may be contacted with the aqueous medium using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, packed column reactors, aqueous froth filters (e.g., as described in U.S. Pat. Nos. 7,854,791; 6,872,240; 6,616,733, as well as Published U.S. Patent Application Nos. 20140245887 and WO2005/014144; the disclosures of which are herein incorporated by reference); and the like, as may be convenient. The process may be a batch or continuous process.

In some instances, the gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725; 6,872,240 and 5,695,545; the disclosures of which are herein incorporated by reference. In some instances, the microporous hollow fiber membrane contactor that is employed is a Liqui-Cel® hollow fiber membrane contactor (available from Membrana, Charlotte N.C.), which membrane contactors include polypropylene membrane contactors and polyolefin membrane contactors.

Contact between the capture liquid and the $CO_2$-containing gas occurs under conditions such that a substantial portion of the $CO_2$ present in the $CO_2$-containing gas goes into solution, e.g., to produce bicarbonate ions. By substantial portion is meant 10% or more, such as 50% or more, including 80% or more.

The temperature of the capture liquid that is contacted with the $CO_2$-containing gas may vary. In some instances, the temperature ranges from −1.4 to 100° C., such as 20 to 80° C. and including 40 to 70° C. In some instances, the temperature may range from −1.4 to 50° C. or higher, such as from −1.1 to 45° C. or higher. In some instances, cooler temperatures are employed, where such temperatures may range from −1.4 to 4° C., such as −1.1 to 0° C. In some instances, warmer temperatures are employed. For example, the temperature of the capture liquid in some instances may be 25° C. or higher, such as 30° C. or higher, and may in some embodiments range from 25 to 50° C., such as 30 to 40° C.

The $CO_2$-containing gas and the capture liquid are contacted at a pressure suitable for production of a desired $CO_2$ charged liquid. In some instances, the pressure of the contact conditions is selected to provide for optimal $CO_2$ absorption, where such pressures may range from 1 ATM to 100 ATM, such as 1 to 50 ATM, e.g., 20-30 ATM or 1 ATM to 10 ATM. Where contact occurs at a location that is naturally at 1 ATM, the pressure may be increased to the desired pressure using any convenient protocol. In some instances, contact occurs where the optimal pressure is present, e.g., at a location under the surface of a body of water, such as an ocean or sea. In some instances, contact of the $CO_2$-containing gas and the alkaline aqueous medium occurs a depth below the surface of the water (e.g., the surface of the ocean), where the depth may range in some instances from 10 to 1000 meters, such as 10 to 100 meters. In some instances, the $CO_2$ containing gas and $CO_2$ capture liquid are contacted at a pressure that provides for selective absorption of $CO_2$ from the gas, relative to other gases in the $CO_2$ containing gas, such as $N_2$, etc. In these instances, the pressure at which the $CO_2$ containing gas and capture liquid are contacted may vary, ranging from 1 to 100 atmospheres (atm), such as 1 to 10 atm and including 20 to 50 atm.

Contact between the alkaline aqueous medium and the $CO_2$-containing gas results in the production of a DIC containing liquid. As such, in charging the $CO_2$ capture liquid with $CO_2$, a $CO_2$ containing gas may be contacted with $CO_2$ capture liquid under conditions sufficient to produce dissolved inorganic carbon (DIC) in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2+}]$, where $[CO_2^*]$ is the sum of carbon dioxide ($[CO_2]$) and carbonic acid ($[H_2CO_3]$) concentrations, $[HCO_3^-]$ is the bicarbonate concentration and $[CO_3^{2+}]$ is the carbonate concentration in the solution. The DIC of the aqueous media may vary, and in some instances may be 5,000 ppm or greater, such as 10,000 ppm or greater, including 15,000 ppm or greater. In some instances, the DIC of the aqueous media may range from 5,000 to 20,000 ppm, such as 7,500 to 15,000 ppm, including 8,000 to 12,000 ppm. The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 10, e.g., 8 to 8.5.

In some instances where the gaseous source of $CO_2$ is a multi-component gaseous stream, contact occurs in a manner such that such that $CO_2$ is selectively absorbed by the $CO_2$ absorbing aqueous medium. By selectively absorbed is meant that the $CO_2$ molecules preferentially go into solution relative to other molecules in the multi-component gaseous stream, such as $N_2$, $O_2$, Ar, CO, $H_2$, $CH_4$ and the like.

Where desired, the $CO_2$ containing gas is contacted with the capture liquid in the presence of a catalyst (i.e., an absorption catalyst, either hetero- or homogeneous in nature) that mediates the conversion of $CO_2$ to bicarbonate. Of interest as absorption catalysts are catalysts that, at pH levels ranging from 8 to 10, increase the rate of production of bicarbonate ions from dissolved $CO_2$. The magnitude of the rate increase (e.g., as compared to control in which the catalyst is not present) may vary, and in some instances is 2-fold or greater, such as 5-fold or greater, e.g., 10-fold or greater, as compared to a suitable control. In some instances, the catalyst is a carbon dioxide-specific catalyst. Examples of carbon dioxide-specific catalysts of interest include enzymes, such as carbonic anhydrases, synthetic catalysts, such as those transition metal catalysts described in Koziol et al., "Toward a Small Molecule, Biomimetic Carbonic Anhydrase Model: Theoretical and Experimental Investigations of a Panel of Zinc(II) Aza-Macrocyclic Catalysts," Inorganic Chemistry (2012) 51: 6803-6812, colloidal metal particles, such as those described in Bhaduri and Siller, "Nickel nanoparticles catalyse reversible hydration of carbon dioxide for mineralization carbon capture and storage," Catalysis Science & Technology (2013) DOI: 10.1039/c3cy20791a, and the like, e.g., colloidal metal oxide particles. Carbonic anhydrases of interest include both naturally occurring (i.e., wild-type) carbonic anhydrase, as well as mutants thereof. Specific carbonic anhydrases of interest include, but are not limited to: α-CAs, which include mammalian carbonic anhydrases, e.g., the cytosolic CAs (CA-I, CA-II, CA-III, CA-VII and CA XII) (CA1, CA2, CA3, CA7, CA13), mitochondrial CAs (CA-VA and CA-VB) (CASA, CA5B), secreted CAs (CA-VI) (CA6), and membrane-associated CAs (CA-IV, CA-IX, CA-XII, CA-XIV and CA-XV) (CA4, CA9, CA12, CA14); β-CAs, which include prokaryotic and plant chloroplast CAs; γ-CAs, e.g., such as found in methane-producing bacteria; and the like. Carbonic anhydrases of interest further include those described in U.S. Pat. No. 7,132,090, the disclosure of which is herein incorporated by reference. Carbonic anhydrases of interest include those having a specific activity of $10^3$ s$^{-1}$ or more, such as $10^4$ s$^{-1}$ to or more, including $10^5$ s$^{-1}$ or more. When employed, the catalyst is present in amount effective to provide for the desired rate increase of bicarbonate production, e.g., as described above. In some instances where the catalyst is an enzyme, the activity of the enzyme in the aqueous media may range from $10^3$ to $10^6$ s$^{-1}$, such as $10^3$ to $10^4$ s$^{-1}$ and including $10^5$ to $10^6$ s$^{-1}$. When employed, a catalyst, e.g., enzyme such as a carbonic anhydrase, can be made available in the reaction using any convenient approach, such as through a solid support (such as a permeable membrane) to which the catalyst is attached or otherwise with which the catalyst is stably associated, through porous media and the like having the catalyst stably associated therewith, large surfaces with the catalyst immobilized therein (i.e., attached thereto), or with the catalyst in solution, e.g., which may be recovered following use. Examples of catalyst formats that may be employed include, but are not limited to, those described in U.S. Pat. No. 7,132,090; the disclosure of which is herein incorporated by reference. Synthetic catalysts of interest include synthetically prepared transition metal containing complexes, prepared as biomimetic models of carbonic anhydrase enzymes, e.g., as described above. Specific synthetic catalysts include, but are not limited to: transition metal aza-macrocyclic catalysts, e.g., the zinc(II) aza-macrocyclic catalysts having macrocyclic rings of 9, 12, 13, or 14, as described in Koziol et al., "Toward a Small Molecule, Biomimetic Carbonic Anhydrase Model: Theoretical and Experimental Investigations of a Panel of zinc(II) Aza-Macrocyclic Catalysts," Inorganic Chemistry (2012) 51: 6803-6812, imidazole- and indole-based metal catalysts, e.g., the zinc(II) catalysts described in United States Published Application No. US20110293496, United States Published Application No. US20120199535 and United States Published Application No. US20110151537, aminopyridyl-based catalysts, e.g., as described in Feng et al., "A Highly Reactive Mononuclear Zn(II) Complex for Phosphodiester Cleavage," Journal of the American Chemical Society (2005) 127: 13470-13471, pyrazolylhydroborato- and pyridylthiomethyl-based compounds, e.g., as described in Sattler and Parkin, "Structural characterization of zinc bicarbonate compounds relevant to the mechanism of action of carbonic anhydrase," Chemical Science (2012) 3: 2105-2109. Synthetic catalysts of interest include those having a specific activity of $10^2$ $s^{-1}$ or more, such as $10^3$ $s^{-1}$ or more, including $10^4$ $s^{-1}$ or more. When employed, the synthetic catalyst is present in amount effective to provide for the desired rate increase of bicarbonate production, e.g., as described above for carbonic anhydrase. When employed, a synthetic catalyst, e.g., aza-macrocyclic transition metal catalyst, can be made available in the reaction using any convenient approach, e.g., as described above for carbonic anhydrase. Metal nanoparticles of interest include commercially available as well as synthetically prepared colloidal particles of transition metals. Specific colloidal metal particles include, but are not limited to: metal nanoparticles, e.g., the nickel nanoparticles (NiNPs) described in Bhaduri and Siller, "Nickel nanoparticles catalyse reversible hydration of carbon dioxide for mineralization carbon capture and storage," Catalysis Science & Technology (2013) DOI: 10.1039/c3cy20791a. Colloidal metal particles of interest include those having a specific activity of $10^2$ $s^{-1}$ or more, such as $10^3$ $S^{-1}$ or more, including $10^4$ $s^{-1}$ or more. When employed, the colloidal metal particles are present in amount effective to provide for the desired rate increase of bicarbonate production, e.g., as described above for carbonic anhydrase. When employed, the colloidal metal particles, e.g., transition metal nanoparticles, can be made available in the reaction using any convenient approach, e.g., as described above for carbonic anhydrase. Metal nanoparticle catalysts finding use in embodiments described herein are further described in U.S. Provisional Application Ser. No. 61/793,585 filed on Mar. 15, 2013; the disclosure of which is herein incorporated by reference. Catalysts of interest are further described in U.S. patent application Ser. No. 14/112,495; the disclosure of which is herein incorporated by reference.

In some embodiments, the resultant $CO_2$ charged liquid is a bicarbonate-containing liquid, where in in some instances, the bicarbonate-containing liquid is a two phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid.

LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution.

The bulk phase and LCP are characterized by having different $K_{eq}$, different viscosities, and different solubilities between phases. Bicarbonate, carbonate, and divalent ion constituents of the LCP droplets are those that, under appropriate conditions, may aggregate into a post-critical nucleus, leading to nucleation of a solid phase and continued growth. While the association of bicarbonate ions with divalent cations, e.g., $Ca^{2+}$, in the LCP droplets may vary, in some instances bidentate bicarbonate ion/divalent cation species may be present. For example, in LCPs of interest, $Ca^{2+}$/bicarbonate ion bidentate species may be present. While the diameter of the LCP droplets in the bulk phase of the LCP may vary, in some instances the droplets have a diameter ranging from 1 to 500 nm, such as 10 to 100 nm. In the LCP, the bicarbonate to carbonate ion ratio, (i.e., the $HCO_3^-/CO_3^{2-}$ ratio) may vary, and in some instances is 10 or greater to 1, such as 20 or greater to 1, including 25 or greater to 1, e.g., 50 or greater to 1. Additional aspects of LCPs of interest are found in Bewernitz et al., "A metastable liquid precursor phase of calcium carbonate and its interactions with polyaspartate," Faraday Discussions. 7 Jun. 2012. DOI: 10.1039/c2fd20080e (2012) 159: 291-312. The presence of LCPs may be determined using any convenient protocol, e.g., the protocols described in Faatz et al., Advanced Materials, 2004, 16, 996-1000; Wolf et al., Nanoscale, 2011, 3, 1158-1165; Rieger et al., Faraday Discussions, 2007, 136, 265-277; and Bewernitz et al., Faraday Discussions, 2012, 159, 291-312.

Where the bicarbonate-containing solution has two phases, e.g., as described above, the first phase may have a higher concentration of bicarbonate ion than a second phase, where the magnitude of the difference in bicarbonate ion concentration may vary, ranging in some instances from 0.1 to 4, such as 1 to 2. For example, in some embodiments, a bicarbonate rich product may include a first phase in which the bicarbonate ion concentration ranges from 1000 ppm to 5000 ppm, and a second phase where the bicarbonate ion concentration is higher, e.g., where the concentration ranges from 5000 ppm to 6000 ppm or greater, e.g., 7000 ppm or greater, 8000 ppm or greater, 9000 ppm or greater, 10,000 ppm or greater, 25,000 ppm or greater, 50,000 ppm or greater, 75,000 ppm or greater, 100,000 ppm, 500,000 or greater.

Where desired, following production of the LCP containing liquid, the resultant LCP containing liquid may be manipulated to increase the amount or concentration of LCP droplets in the liquid. As such, following production of the bicarbonate containing liquid, the bicarbonate containing liquid may be further manipulated to increase the concentration of bicarbonate species and produce a concentrated bicarbonate liquid. In some instances, the bicarbonate containing liquid is manipulated in a manner sufficient to increase the pH. In such instances, the pH may be increased by an amount ranging from 0.1 to 6 pH units, such as 1 to 3 pH units. The pH of the concentrated bicarbonate liquid of such as step may vary, ranging in some instances from 5.0 to 13.0, such as 6.5 to 8.5. The concentration of bicarbonate species in the concentrated bicarbonate liquid may vary, ranging in some instances from 1 to 1000 mM, such as 20 to 200 mM and including 50 to 100 mM. In some instances, the concentrated bicarbonate liquid may further include an amount of carbonate species. While the amount of carbonate species may vary, in some instances the carbonate species is present in an amount ranging from 0.01 to 800 mM, such as 10 to 100 mM. The pH of the bicarbonate liquid may be increased using any convenient protocol. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875,163; and 7,790,012; the disclosures of which are herein incorporated by reference. Alkalinity of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydrogen ion, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Another type of further manipulation following production that may be employed is a dewatering of the initial barcarbonate containing liquid to produce a concentrated bicarbonate containing liquid, e.g., a concentrated LCP liquid. Dewatering may be accomplished using any convenient protocol, such as via contacting the LCP composition with a suitable membrane, such as an ultrafiltration membrane, to remove water and certain species, e.g., NaCl, HCl, $H_2CO_3$ but retain LCP droplets, e.g., as described in greater detail in U.S. application Ser. No. 14/112,495; the disclosure of which is herein incorporated by reference.

As described above, catalysts may be employed in some embodiments, e.g., where a carbonic anhydrase (CA) is employed to increase the rate of reaction whereby gaseous carbon dioxide ($CO_2$) and water convert to bicarbonate ($HCO_3^-$) ion and a proton ($H^+$), or vice versa. When dissolved in aqueous solution, for example, in a solution used as a carbon capture solution and having an alkalinity concentration in the range of, for example, 1-2,000 millimolar (mM) equivalents, such as but not limited to 5-50, 75-800 or 900-2,200 mM alkalinity equivalents, CA significantly increases the rate of formation of $HCO_3^-$ upon contacting the solution with, for example, flue gas from an industrial emitter where the partial pressure of $CO_2$ in the flue gas is, for example, 0.1-99.9% by weight, such as but not limited to 0.5-1.5%, 4.0-17% or 45-98% CO2 by weight. Because the molecular mass of CA enzymes is on the order of kilodaltons (kDa), for example, 1-70 kDa, such as but not limited to 4-8, 15-30 or 45-65 kDa, soluble CA may be recovered by passing the solution through a membrane filtration system, for example, loose reverse osmosis membrane systems, nanofiltration membrane systems or tight ultrafiltration systems, that reject CA but pass solutions rich in $HCO_3^-$ ion, such as bicarbonate-rich liquid condensed phase (LCP) solutions as described above. The reject solution from the membrane system, one that contains the rejected CA, may be recirculated as desired in the process so as to continuously increase the rate of $CO_2$ conversion to $HCO_3^-$ from contacting the capture liquid with a $CO_2$ containing gas. The permeate solution from the membrane system, e.g., one that contains the passed LCP, may be further concentrated as desired, e.g., through a membrane filtration system (such as described above), for example, a nanofiltration membrane system, then used in a mineralization process, e.g., as described below.

Where desired, the bicarbonate containing liquid (which may or may not be concentrated such as described above) may be stored for an extended period of time, if not indefinitely, thereby sequestering $CO_2$ obtained from the initial $CO_2$ source used to produce charge the feedwater. For example, in cold climates the bicarbonate containing liquid may be allowed to freeze until weather conditions allow the product to thaw, at which time further manipulation of the product (e.g., as described below) may be performed. Product bicarbonate liquid compositions may be stored in geologic reservoirs until needed, or even allowed to mix with geologic brine solutions and allowed to mineralize in situ. As such, following the production of a bicarbonate containing liquid, further manipulation (if it occurs at all), may be delayed for a period of time, such as 6 hours or longer, 12 hours or longer, 1 day or longer, 1 week or longer, 1 month or longer, 3 months or longer, 6 months or longer, 1 year or longer, etc. In instances where storage of the bicarbonate containing liquid is desired, the product may be stored in a sealed container, e.g., a drum or larger container, and may or may not be stored in an environment that includes an atmosphere which prevents off-gassing, e.g., a pure $CO_2$ atmosphere, etc.

In some instances, the product BRP compositions are employed as bicarbonate additives for cements. The term "bicarbonate additive" as used herein means any composition, which may be liquid or solid, that includes bicarbonate ($HCO_3^-$) ions, or a solid derivative thereof (e.g., as described in greater detail below). Where the bicarbonate additive is a liquid composition, the liquid composition may be employed as the sole setting liquid component in production of the settable cementitious composition, or it may be employed in conjunction with one or more additional setting liquids, e.g., as described in greater detail below. The pH of a liquid bicarbonate additive may vary, and in certain instances ranges from 4 to 12, such as 5 to 9, e.g., 6 to 8. The amount of bicarbonate ions in the bicarbonate additive may vary, as desired. For liquid compositions, the overall amount of bicarbonate may range in some instances from 0.1 wt. % to 30 wt. %, such as 3 to 20 wt. %, including from 10 to 15 wt. %.

As mentioned above, the bicarbonate additive employed to produce a given settable cementitious composition may be a liquid or solid. When present as a solid, the solid is a dehydrated version of a liquid bicarbonate additive. The solid may be one that is produced from a liquid bicarbonate additive using any convenient protocol for removed water from the liquid, e.g., evaporation, freeze drying, etc. Upon combination with a suitable volume of water, the resultant solid dissolves in the water to produce a liquid bicarbonate additive, e.g., as described above. In some instances, reconstitution is achieved by combining the dry bicarbonate additive with a sufficient amount of liquid, e.g., aqueous medium, such as water, where the liquids to solids ratio employed may vary, and in some instances ranges from 1,000,000 to 1, such as 100,000 to 10. Solid bicarbonate additives may include a variety of different particle sizes and particle size distributions. For example, in some embodiments a solid bicarbonate additive may include particulates having a size ranging from 1 to 10,000 μm, such as 10 to 1,000 μm and including 50 to 500 μm.

Further details regarding BRP bicarbonate additives are provided in U.S. application Ser. No. 14/112,495 filed on Oct. 17, 2013; the disclosure of which is herein incorporated by reference.

$CO_2$ Sequestering Carbonate Production

Following preparation of the bicarbonate-containing solution (as well as any storage thereof, as desired, e.g., as described above), the bicarbonate-containing solution or component thereof (e.g., LCP) may be manipulated to produce solid phase carbonate compositions, and therefore sequester $CO_2$ from the initial $CO_2$-containing gas into a solid form and produce a $CO_2$ sequestering carbonate material. By $CO_2$ sequestering carbonate material is meant a material that stores a significant amount of $CO_2$ in a storage-stable format, such that $CO_2$ gas is not readily produced from the material and released into the atmosphere. In certain embodiments, the $CO_2$-sequestering material includes 5% or more, such as 10% or more, including 25% or more, for instance 50% or more, such as 75% or more, including 90% or more of $CO_2$, e.g., present as one or more carbonate compounds. The $CO_2$-sequestering materials produced in accordance with methods of the invention may include one or more carbonate compounds, e.g., as described in greater detail below. The amount of carbonate in the $CO_2$-sequestering material, e.g., as determined by coulometry, may be 40% or higher, such as 70% or higher, including 80% or higher.

$CO_2$ sequestering materials, e.g., as described herein, provide for long-term storage of $CO_2$ in a manner such that $CO_2$ is sequestered (i.e., fixed) in the material, where the sequestered $CO_2$ does not become part of the atmosphere. When the material is maintained under conditions conventional for its intended use, the material keeps sequestered $CO_2$ fixed for extended periods of time (e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer) without significant, if any, release of the $CO_2$ from the material. With respect to the $CO_2$-sequestering materials, when they are employed in a manner consistent with their intended use and over their lifetime, the amount of degradation, if any, as measured in terms of $CO_2$ gas release from the product will not exceed 10% per year, such as 5% per year, and in certain embodiments, 1% per year. In some instances, $CO_2$-sequestering materials provided by the invention do not release more than 1%, 5%, or 10% of their total $CO_2$ when exposed to normal conditions of temperature and moisture, including rainfall of normal pH, for there intended use, for at least 1, 2, 5, 10, or 20 years, or for more than 20 years, for example, for more than 100 years. Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of materials of the invention for a given period (e.g., 1, 10, 100, 1000, or more than 1000 years).

In certain instances of such embodiments, the bicarbonate-containing liquid or component thereof (e.g., LCP) is combined with a divalent cation source. Any convenient divalent cation source may be employed. Divalent cations, such as alkaline earth metal cations, e.g., calcium and magnesium cations, are of interest. Cation sources of interest include, but are not limited to, the brine from water processing facilities, such as sea water desalination plants, brackish water desalination plants, groundwater recovery facilities, wastewater facilities, and the like, which produce a concentrated stream of solution high in cation contents. Also of interest as cation sources are naturally occurring sources, such as, but not limited to, native seawater and geological brines, which may have varying cation concentrations and may also provide a ready source of cations to trigger the production of carbonate solids from a bicarbonate rich product or component thereof (e.g., LCP), such as described in greater detail below. The cation source employed in such solid carbonate production steps may be the same as or different from the aqueous media employed in the bicarbonate rich product production step, e.g., as described below.

In some instances, the divalent cation source is a concentrated hard water source, where the concentrated hard water is one that has been produced by contacting an initial hard water with a divalent cation selective membrane to produce a concentrated hard water that has an increased concentration of divalent cations as compared to the initial hard water. Divalent cation selective membranes that may be used in such embodiments are configured or adapted to prevent the passage of divalent cations from one side of the membrane to the other, while allowing liquid and smaller molecules (e.g., molecules having a diameter that is smaller than the diameter of a hydrated divalent cation) to pass from one side of the membrane to the other. Divalent cation selective membranes in accordance with embodiments of the invention have pores or passages of a size that allows liquid and smaller molecules to pass through, but prevents or blocks the passage of particles having a size equal to or greater than the diameter of a hydrated divalent cation, such as $Ca^{2+}$ or $Mg^{2+}$. A membrane "feed" refers to an initial liquid mixture that is applied to a membrane filter. A membrane "retentate" or "concentrate" refers to the components of the feed that cannot pass through the pores or passages of the membrane and are thus retained on the first side of the membrane. A membrane "permeate" refers to the components of the feed that are able to pass through the pores or passages of the membrane to reach the other side of the membrane. In some embodiments of the methods, a membrane feed is contacted with a divalent cation selective membrane under conditions that are sufficient to separate the liquid component of the feed and smaller molecules having a diameter that is less than that of a hydrated divalent cation from the retentate. Processing conditions may include a range of positive or negative pressures applied to the membrane. Where desired, positive or negative pressure may be applied to the membrane such that a pressure differential is established across the membrane. For example, in some embodiments, a membrane feed is contacted with a divalent cation selective membrane such that a pressure differential across the membrane ranges from 1 atmosphere (atm) up to 40 atm, such as 20-30 atm is established. In some embodiments, processing conditions may include a range of suitable temperatures. For example, in some embodiments, a membrane feed is contacted with a divalent cation selective membrane at a temperature ranging from 0° C. up to 100° C., such as 40-50° C. Likewise, a membrane may be selected to be able to maintain integrity under various pH conditions, such as a pH ranging from 2 to 11, such as 7 to 10. In some embodiments, the selective membrane is a nanofiltration membrane. By "nanofiltration membrane" is meant a membrane whose pores range in diameter from 1 to 10 Angstroms and are configured to retain divalent cations, such as $Mg^{2+}$ and $Ca^{2+}$ cations, in the membrane retentate, while allowing smaller ions to pass through the membrane with the membrane permeate. For example, in certain embodiments, nanofiltration membranes are adapted to retain hydrated divalent cations (e.g., $Ca^{2+}$, $Mg^{2+}$) on a first side of the membrane, while allowing smaller hydrated monovalent ions to pass to the other side of the membrane. In some embodiments, a nanofiltration membrane is configured such that in use, the nanofiltration membrane can facilitate the formation of a concentrated hard water without adding additional ions, such as sodium ions, to the solution. In some embodiments, a nanofiltration membrane is configured such that in use, the nanofiltration membrane can facilitate the formation of a concentrated hard water without the need to continuously heat or cool the solution. Nanofiltration membranes in accordance with embodiments of the invention may have varying pore density, and in some instances have a pore density ranging from 1 to 150 pores per square centimeter. The pore dimensions and pore density may be controlled using suitable process conditions, such as controlled pH, temperature and process timing employed during a nanofiltration membrane fabrication process. The material from which a nanofiltration membrane is made may be selected to be able to withstand various process conditions to which the membrane may be subjected during processing. For example, it may be desirable that the membrane be able to withstand elevated temperatures, such as those associated with sterilization or other high temperature processes, as well as elevated pressures. In some embodiments, a nanofiltration membrane has a standardized design, such as, e.g., a spiral wound module design or a tubular module design, having a range of standard diameters to fit standard pressure vessel sizes and/or components thereof. In certain embodiments, a standardized nanofiltration membrane module is configured to facilitate the connection of multiple membrane modules in series and/or in parallel within a standardized pressure vessel. In some embodiments, a nanofiltration membrane may be in the form of a cartridge that is positioned within a housing or casing. The housing may be sized and shaped to accommodate the membrane(s) positioned therein. For example, the housing may be substantially cylindrical if housing a spirally wound membrane. The housing of the module may contain inlets or channels to facilitate the introduction of a membrane feed into the module, as well as outlets for withdrawal of product streams from the module. In some embodiments, the housing may provide at least one reservoir or chamber for holding or storing a fluid to be introduced into or withdrawn from the module. In some embodiments, the housing may be insulated. Examples of commercially-available nanofiltration membranes include, but are not limited to, those available from a variety of commercial vendors, e.g., Nitto (Hydranautics), Dow (Dow FilmTec); General Electric (GE Osmonics), etc. As used herein, the term "concentrated hard water" means a solution of aqueous media having a divalent cation concentration of 500 ppm or greater, such as 600 ppm or greater, including 750 ppm or greater. In some instances, a concentrated hard water has a divalent cation concentration of 2,500 ppm or greater, e.g., 5,000 ppm or greater, 10,000 ppm or greater, 15,000 ppm or greater, 20,000 ppm or greater, 25,000 ppm or greater, 30,000 ppm or greater, 40,000 ppm or greater, including 50,000 ppm or greater. In some embodiments, a concentrated hard water may have a divalent cation concentration ranging from 500 to 200,000 ppm, such as 1,000 to 200,000 ppm, where in some instances the concentration ranges from 50,000 to 200,000 ppm, such as 50,000 to 175,000 ppm, an including 50,000 to 150,000 ppm. While the concentrated hard water may vary depending on the particular application, concentrated hard waters of interest include one or more solutes, e.g., divalent cations, such as alkaline earth metal cations, including but not limited to $Mg^{2+}$, $Ca^{2+}$, $Be^{2+}$, $Ba^{2+}$, $Sr^{2+}$, $Pb^{2+}$, $Fe^{2+}$, and $Hg^{2+}$. The pH of concentrated hard waters in accordance with embodiments of the invention may vary, and in some instances ranges from 2 to 12, such as 4 to 10. In such embodiments, an initial hard water may be naturally occurring or man-made, as desired. Naturally occurring hard waters include, but are not limited to, waters obtained from seas, oceans, lakes, swamps, estuaries, lagoons, brines, alkaline lakes, inland seas, etc. In certain embodiments, a naturally occurring hard water source is co-located with a location where a $CO_2$ sequestration protocol or process is conducted. Man-made sources of hard waters may also vary, and may include brines produced by water desalination plants, mining operations, such as fracking operations, oil field operations, industrial waste waters, and the like. Of interest in some instances are waters that provide for excess alkalinity, which is defined as alkalinity which is provided by sources other than bicarbonate ion. In these instances, the amount of excess alkalinity may vary, so long as it is sufficient to provide 1.0 or slightly less, e.g., 0.9, equivalents of alkalinity. Hard waters of interest include those that provide excess alkalinity (meq/liter) of 30 or higher, such as 40 or higher, 50 or higher, 60 or higher, 70 or higher, 80 or higher, 90 or higher, 100 or higher, etc. In certain embodiments, where such hard waters are employed, no other source of alkalinity, e.g., NaOH, is required. Where desired, methods of such embodiments may include combining a scaling-retarding amount of an acidic solution with the concentrated hard water. Acidic solutions in accordance with embodiments of the invention may be, e.g., aqueous solutions having a pH ranging from 1 to 7, such as from 3 to 5. In certain embodiments, an acidic solution may be an acidic by-product of alkali enrichment protocol, e.g., as described above. In some instances, the cation source is a concentrated hard water that has been produced using a membrane mediated protocol, e.g., as described in U.S. Patent Application Ser. No. 62/041,568 filed on Aug. 25, 2014; the disclosure of which is herein incorporated by reference).

A given divalent cation source may be a solid or liquid, as desired. For example, a liquid divalent cation source may be employed. Alternatively, a solid divalent cation source, such as a particulate source (e.g., a powder) may be employed.

During the production of solid carbonate compositions from the bicarbonate-containing solution or component thereof (e.g., LCP), one mol of $CO_2$ may be produced for every 2 mols of bicarbonate ion from the bicarbonate-containing solution or component thereof (e.g., LCP). For example, where solid carbonate compositions are produced by adding calcium cation to the bicarbonate-containing solution or component thereof (e.g., LCP), the production of solid carbonate compositions, e.g., the form of amorphous calcium carbonate minerals, may proceed according to the following reaction:

$$2HCO_3^- + Ca^{++} \leftrightarrow CaCO_3 \cdot H_2O + CO_2$$

$$Ca^{++}(aq) + 2HCO_3^-(aq) \leftrightarrow CaCO_{3(s)} + H_2O_{(l)} + CO_{2(g)}$$

While the above reaction shows the production of 1 mol of $CO_2$, 2 moles of $CO_2$ from the $CO_2$-containing gas were initially converted to bicarbonate. As such, the overall process sequesters a net 1 mol of $CO_2$ and therefore is an effective $CO_2$ sequestration process, with a downhill thermodynamic energy profile of −34 kJ mol$^{-1}$ for the above reaction.

Where carbonate compositions are produced, e.g., as described above, from the $CO_2$ sequestration protocol, the product carbonate compositions may vary greatly. The carbonate product may include one or more different carbonate compounds, such as two or more different carbonate compounds, e.g., three or more different carbonate compounds, five or more different carbonate compounds, etc., including non-distinct, amorphous carbonate compounds. Carbonate compounds may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnesite, and amorphous magnesium calcium carbonate ($MgCO_3$). Calcium magnesium carbonate minerals of interest include, but are not limited to dolomite ($CaMg(CO_3)_2$), huntite ($Mg_3Ca(CO_3)_4$) and sergeevite ($Ca_2Mg_{11}(CO_3)_{13} \cdot H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the product ranges from 1.5-5 to 1, such as 2-4 to 1 including 2-3 to 1. In some instances, the product may include hydroxides, such as divalent metal ion hydroxides, e.g., calcium and/or magnesium hydroxides.

Carbonate Precipitation

In some instances, solid carbonate products are produced using a precipitation protocol, e.g., a protocol which results in the production of a slurry that includes precipitated carbonate products. Precipitation of solid carbonate compositions from a dissolved inorganic carbon (DIC) composition (e.g., an LCP composition as employed in a bicarbonate-mediated sequestration protocol), such as described above, results in the production of a composition that includes both precipitated solid carbonate compositions, as well as the remaining liquid from which the precipitated product was produced (i.e., the mother liquor). This composition may be present as a slurry of the precipitate and mother liquor.

The carbonate precipitation conditions may vary, as desired. For example, the carbonate precipitation conditions may be transient amorphous calcium carbonate precipitation conditions. In some instances, the carbonate precipitation conditions produce a first precipitated carbonate composition and second precipitated carbonate composition. In such instances, the first precipitated carbonate composition may be an amorphous calcium carbonate (ACC) and the second precipitated carbonate composition is vaterite precursor ACC. In such embodiments, the method further comprises separating the first and second precipitated carbonate compositions from each other. Conveniently, the first and second precipitated carbonate compositions are separated from each other with a membrane. In some instances, the method further includes combining the separated first and second precipitated carbonate compositions.

This product slurry may be disposed of in some manner following its production. The phrase "disposed of" means that the slurry or a portion thereof, e.g., the solid carbonate composition portion thereof, is either placed at a storage site or employed for a further use in another product, i.e., a manufactured or man-made item, where it is "stored" in that other product at least for the expected lifetime of that other product.

In some instances, this disposal step includes forwarding the slurry composition described above to a long-term storage site. The storage site could be an above ground site, a below ground site or an underwater site. In these embodiments, following placement of the slurry at the storage site, the mother liquor component of the slurry may naturally separate from the precipitate, e.g., via evaporation, dispersal, etc.

Where desired, the resultant precipitated product (i.e., solid carbonate composition) may be separated from the resultant mother liquor. Separation of the solid carbonate composition can be achieved using any convenient approach. For example, separation may be achieved by drying the solid carbonate composition to produce a dried solid carbonate composition. Drying protocols of interest include filtering the precipitate from the mother liquor to produce a filtrate and then air-drying the filtrate. Where the filtrate is air dried, air-drying may be at a temperature ranging from −70 to 120° C., as desired. In some instances, drying may include placing the slurry at a drying site, such as a tailings pond, and allowing the liquid component of the precipitate to evaporate and leave behind the desired dried product. Also of interest are freeze-drying (i.e., lyophilization) protocols, where the solid carbonate composition is frozen, the surrounding pressure is reduced and enough heat is added to allow the frozen water in the material to sublime directly from the frozen precipitate phase to gas. Yet another drying protocol of interest is spray drying, where the liquid containing the precipitate is dried by feeding it through a hot gas, e.g., where the liquid feed is pumped through an atomizer into a main drying chamber and a hot gas is passed as a co-current or counter-current to the atomizer direction.

Precipitation of solid carbonate compositions, e.g., as described above, results in the production of a composition that includes both precipitated solid carbonate compositions, as well as the remaining liquid from which the precipitated product was produced (i.e., the mother liquor). This composition may be present as a slurry of the precipitate and mother liquor.

The carbonate precipitation conditions may vary, as desired. For example, the carbonate precipitation conditions may be transient amorphous calcium carbonate precipitation conditions. In some instances, the carbonate precipitation conditions produce a first precipitated carbonate composition and second precipitated carbonate composition. In such instances, the first precipitated carbonate composition may be an amorphous calcium carbonate (ACC) and the second precipitated carbonate composition is vaterite precursor ACC. In such embodiments, the method further comprises separating the first and second precipitated carbonate compositions from each other. Conveniently, the first and second precipitated carbonate compositions are separated from each other with a membrane. In some instances, the method further includes combining the separated first and second precipitated carbonate compositions.

Where desired, the method may further include introducing a setting fluid, e.g., a silicate setting solution, into the precipitated carbonate composition.

As summarized above, the continuous processes may further includes dewatering the precipitated carbonate composition to produce a solid carbonate material. The term solid carbonate material refers to a variety of non-liquid formulations, such as paste like, putty like and dry compositions. In some instances, the dewatering includes contacting the precipitated carbonate composition with a membrane, e.g., an ultrafiltration membrane, to produce the solid carbonate material.

In some instances, the method further includes producing unit sized objects from the paste, which unit sized objects may be cured, as desired, e.g., by contacting the objections with a setting solution.

In some instances, the dewatering includes extruding the precipitated carbonate composition. In some instances, the extruding includes applying pressure to remove liquid from the paste. In some instances, the extruding includes applying negative pressure to remove air from the paste. In some instances, the method further includes introducing one or more property modulators into the process so that the solid carbonate material comprises the property modulator. Property modulators of interest may vary, and include but are not limited to reflectance modulators, pigments, biocides etc.

Where the precipitated product is separated from the mother liquor, the resultant precipitate may be disposed of in a variety of different ways, as further elaborated below. For example, the precipitate may be employed as a component of a building material, as reviewed in greater detail below. Alternatively, the precipitate may be placed at a long-term storage site (sometimes referred to in the art as a carbon bank), where the site may be above ground site, a below ground site or an underwater, e.g., deepwater, site.

In certain embodiments, the product carbonate composition is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as a sand, a gravel, as an aggregate, etc. In certain embodiments, one or more components may be added to the precipitate, e.g., where the precipitate is to be employed as a cement, e.g., one or more additives, sands, aggregates, supplemental cementitious materials, etc. to produce final product, e.g., concrete or mortar.

In certain embodiments, the carbonate compound is utilized to produce aggregates, e.g., as described in U.S. Pat. No. 7,914,685, the disclosure of which is herein incorporated by reference. In certain embodiments, the carbonate compound precipitate is employed as a component of hydraulic cement. The term "hydraulic cement" is employed in its conventional sense to refer to a composition that sets and hardens after combining with water. Setting and hardening of the product produced by combination of the cements of the invention with an aqueous fluid result from the production of hydrates that are formed from the cement upon reaction with water, where the hydrates are essentially insoluble in water. Such carbonate compound component hydraulic cements, methods for their manufacture and use include, but are not limited to, those described in U.S. Pat. No. 7,735,274; the disclosure of which is herein incorporated by reference.

Also of interest are dissolution precipitation cements like orthopedic calcium phosphate cements that undergo dissolution into solution and precipitate out an alternate material. Dissolution precipitation cements are that are not hydrating however will employ solution as an ion sink which mediates the recrystallization of the lower energy state material which is likened to concrete and can contain volume fillers such as aggregates and finer aggregates.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product.

Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

The resultant mother liquor may also be processed as desired. For example, the mother liquor may be returned to the source of the bicarbonated buffer aqueous medium, e.g., ocean, or to another location.

Aspects of the methods optionally include returning the acidic by-product liquid to the place of origin of the aqueous medium that was used in the first selective membrane processing step. For example, in some embodiments of the methods, the acidic by-product solution is returned to a naturally occurring or man-made source of aqueous media. Naturally occurring sources of aqueous media include, but are not limited to, seas, oceans, lakes, swamps, estuaries, lagoons, brines, geological brines, alkaline lakes, inland seas, etc. Man-made sources of aqueous media include but are not limited to brines produced by water desalination plants, waste waters, and the like.

Aspects of the methods optionally include utilizing the acidic by-product solution as a feedwater for various protocols, e.g., for desalination to produce potable fresh water. Desalination processes that utilize feedwaters such as the acidic by-product solution include those described in U.S. Provisional Patent Application No. 61/990,486 and in U.S. Pat. No. 7,744,761, the disclosure of which is herein incorporated by reference in its entirety.

Non-Slurry Continuous Production Protocols

Instead of precipitation protocols, e.g., as described above, also of interest are non-slurry continuous protocols for production of $CO_2$ sequestering materials. As the processes are continuous, they are not batch processes. In practicing continuous processes of the invention, a divalent cation source, e.g., as described above, is introduced into a flowing aqueous bicarbonate and/or carbonate containing liquid (e.g., a bicarbonate rich product containing liquid as described above) under conditions sufficient such that a non-slurry solid phase $CO_2$ sequestering carbonate material is produced in the flowing aqueous bicarbonate rich product.

By "flowing" aqueous liquid is meant a liquid (such as described above) that is moving in or as in a stream, such that it is not stationary. The flow rate of the liquid, e.g., as determined relative to the site or location at which the divalent cations are introduced into the liquid, may vary. In some instances, the flow rate of the liquid ranges from 0.1 to 10 m/second, such as 0.2 to 2.0 m/s. In some instances, the flow rate of the liquid ranges from 10 LPD to 40B LPD (liters per day), such as 400,000 LPD to 12M LPD. In some instances, the liquid is flowing through a housing or containment structure, where the length of the flow path of the liquid may vary. In some instances, the flow path ranges in length from 0.10 m to 100 m, such as 1 m to 10 m and including 1 m to 5.0 m. Along a given flow path, the flow rate of the liquid may be constant or varied, as desired. For example, the flow rate may be faster at the site of divalent cation introduction relative to the site of $CO_2$ sequestering carbonate material production. The magnitude of any change in flow rate may vary, where the magnitude of such change, if present, ranges in some instances from 2 to 100 times, such as 5 to 20 times. The flow rate may be varied using any convenient protocol, e.g., by placing barriers in the flow path, adjusting the elevation of the flow path, etc.

The amount of divalent cation source that is introduced into the liquid is sufficient to provide for the desired solid phase $CO_2$ sequestering carbonate material. While the amount may vary, in some instances the amount that is introduced into the liquid is sufficient to provide a concentration of divalent cation in the liquid at a location in the flow path just before material production that ranges from 10 ppm to 10,000 ppm, such as 200 ppm to 2,000 ppm. Where the divalent cation source is a liquid source having a divalent cation concentration ranging from 500 ppm to 20,000 ppm, such as 1000 ppm to 5000 ppm, the liquid divalent cation source may be introduced into the flowing liquid at a rate ranging from 0.1 m/s to 10 m/s, such as 0.2 m/s to 4 m/s. Alternatively, where the divalent cation source is a dry powder having a divalent cation concentration of 10 to 80% wt/wt., the power divalent cation source may be introduced into the flowing liquid at a rate ranging from 0.2 m/s to 10 m/s, such as 0.2 m/s to 4 m/s.

As the process is a continuous process, upon initiation of the process no solid carbonate material product, apart from any seed structure (e.g., as described below), will be present in the production zone of the flow path before introduction of the divalent cations into the flowing liquid. In some embodiments, at a time following the initial introduction of the divalent cations, a precursor composition forms at a location downstream from the divalent cation introduction site. While the time between initial introduction and the formation of the non-solid precursor structure may vary, in some instances the time ranges from 0.001 sec to 10 min, such as 0.1 sec to 1 min. In these embodiments, the precursor composition forms at a distance from the divalent cation introduction site, where the location may be downstream from the divalent cation introduction site by a varying distance, where this distance may range in some instances from 1 cm to 10 m, such as 2 cm to 2 m. The precursor composition may be characterized as a transient zone where the initial clusters of carbonate mineral have not yet formed a polytype of the carbonate mineral and are highly unstable, making them more likely to accrete on to a solid surface than to homogeneously crystallize in solution to become part of a slurry.

The zone of accretion (carbonate growth) is defined by saturation index where $$SI=\log(IAP/Ksp)$$

(IAP is the ion activity product over Ksp solubility product) in relation to the activation energy (Stumm & Morgan 1981) where:

$$\Delta G=16\pi\sigma^3 v^2/[3(kT \ln S)^2]$$

where $\sigma$ is the interfacial energy, v is the molecular volume, k is Boltzmann's constant, T is the absolute temperature, Ln is the natural logarithm operator, S is the relative supersatruation.

The zone of accretion can furthermore be modified by pressure, temperature and flow rate. Supersaturated solutions between 1× and 1000× supersaturation are of interest, such as 10× and 500× super saturation and including 11× and 300× supersaturation. The zone of accretion may be of a transient nature such that periodic dosing of various divalent cations results in periodicity of saturation index flows through the system. Also periodic alkaline component solutions can be introduced to brine solutions or solutions containing divalent cations creating similar response. Periodicity similar to diurnal cyclic variance seen in geologic settings where beach rock forms (Ref. Sedimentary Geology, 33 (1982) 157-172.

The system may be catalyzed by pH modification in the acidic or basic direction or using any convenient protocol. Introduction of $CO_2$ or carbonic acid into the reactor vessel isone modality of acidifying the system and modifying the zone of accretion. Another modality is the introduction of acid, e.g., hydrochloric acid (HCl). In such instances, HCl concentrations between 0.01 and 20%, such as between 0.5 and 10%, including between 1 and 3% may be employed. In some instances, an electrochemical protocol may be employed to increase the pH of the bicarbonate liquid to produce the concentrated bicarbonate liquid. Electrochemical protocols may vary, and in some instances include those employing an ion exchange membrane and electrodes, e.g., as described in U.S. Pat. Nos. 8,357,270; 7,993,511; 7,875, 163; and 7,790,012; the disclosures of which are herein incorporated by reference. Alkalinity modulation, e.g., increase or decrease, of the bicarbonate containing liquid may also be accomplished by adding a suitable amount of a chemical agent to the bicarbonate containing liquid. Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydrogen ion, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl) amide. Oxides including, for example, calcium oxide (CaO), magnesium oxide (MgO), strontium oxide (SrO), beryllium oxide (BeO), and barium oxide (BaO) are also suitable proton-removing agents that may be used.

Various condition parameters may be modulated during a given method to achieve a desired production of $CO_2$ sequestering carbonate material. For example, pressure may be maintained at a constant level along the flow path, or pressure may be modulated (i.e., varied) along the flow path, as desired. While the pressure may vary in a given method, in some instances the pressure ranges from 0.1 atm to 100 atm, such as 1 atm to 10 atm. In some embodiments, the pressure is varied, e.g., decreased, along the flow path. The magnitude of any change in pressure may vary, where the magnitude of such change, if present, ranges in some instances from 2 to 100 times, such as 5 to 10 times. The pressure may be varied using any convenient protocol, e.g., by reducing or increasing the volume of the flow path at a given location, fluid regime, etc. In some instances, the pressure is reduced at the location of $CO_2$ sequestering carbonate material relative to the divalent cation introduction site, e.g., where the magnitude of reduction may range from 0% to 100 or more %, such as 10% to 100%.

Alternatively or in addition, the temperature may be maintained at a constant level along the flow path, or modulated (i.e., varied) along the flow path, as desired. While the temperature may vary in a given method, in some instances the temperature ranges from −4° C. to +99° C., such as 0° C. to 80° C. In some embodiments, the temperature is varied, e.g., decreased or increased, along the flow path. The magnitude of any change in temperature may vary, where the magnitude of such change, if present, ranges in some instances from 1 to 50° C., such as 2 to 25° C. The temperature may be varied using any convenient protocol, e.g., by heating or cooling the liquid at various location(s) of the flow path.

In some instances, the solid phase $CO_2$ sequestering carbonate material is produced at a location that is downstream from the divalent cation source introduction site. By downstream is meant a location along the flow path in the direction of fluid flow that is separated from the divalent cation introduction site. The distance between the divalent cation introduction site and the material production site may vary, ranging in some instances from 1 cm to 2.5 km, such as 5 cm to 100 m.

Introduction of the divalent cation source into the flowing aqueous bicarbonate rich product containing liquid as described above results in the production of a non-slurry solid phase $CO_2$ sequestering carbonate material. By non-slurry solid phase is meant a solid phase that is not a slurry, i.e., if maintained under static conditions it would not be a suspension of small particles in a liquid. As such, upon cessation of flowing liquid through the material production zone, the solid phase material produced according to embodiments of the methods settles (i.e., falls) out of suspension in 10 min or less, such as 5 min or less, and in some instances 1 min or less. As the material is a non-slurry solid phase, in some instances the longest dimension of a given amount of the produced material is 30 μm or greater, such as 100 μm or greater, including 1000 μm or greater. In some instances the product material is a particulate composition that is made up of a plurality of distinct particles. In such instances, the plurality of distinct particles may vary in size, ranging in some instances from 10 to 1,000,000 μm, such as 1,000 to 100,000 μm and including 5,000 to 50,000 μm. In such compositions, the mean diameter of the particles may vary, and in some instances ranges from 20 to 20,000 μm, such as 200 to 8,000 μm. The particles of such compositions may be regular or irregular, where in some instances the particles are ooids. In these embodiments, the carbonate material may be produced by successive coating of carbonate compounds onto growing particles, resulting in production of particulates as described above. In some instances, the non-slurry solid phase $CO_2$ sequestering carbonate material is a lithified unitary object. While the dimensions of such an object may vary, in some instances the object has a longest dimension ranging from 1,000 to 100,000, such as 5,000 to 50,000 μm. In these instances, the lithified object(s) produced in the production zone may be produced by carbonate materials forming in pores or interstices of pre-existing structures, uniting and agglomerating such structures into lithified masses.

The $CO_2$ sequestering carbonate material produced as described above is a freshwater stable carbonate. By freshwater stable is meant that the carbonate material is a meta-stable carbonate compound(s) that, upon combination with fresh water, dissolves and produces a different mineral that is more stable in fresh water. The solubility of the product material in freshwater may vary, but in some instances has a Ksp of $10^{-7}$ or less, such as $10^{-6}$ or less, including $10^{-5}$ or less.

In some instances, the method includes producing the solid phase $CO_2$ sequestering carbonate material in association with a seed structure. By seed structure is meant a solid structure or material that is present flowing liquid, e.g., in the material production zone, prior to divalent cation introduction into the liquid. By "in association with" is meant that the material is produced on at least one of a surface of or in a depression, e.g., a pore, crevice, etc., of the seed structure. In such instances, a composite structure of the carbonate material and the seed structure is produced. In some instances, the product carbonate material coats a portion, if not all of, the surface of a seed structure. In some instances, the product carbonate materials fills in a depression of the seed structure, e.g., a pore, a crevice, fissure, etc.

Seed structures may vary widely as desired. The term "seed structure" is used to describe any object upon and/or in which the product carbonate material forms. Seed structures may range from singular objects or particulate compositions, as desired. Where the seed structure is a singular object, it may have a variety of different shapes, which may be regular or irregular, and a variety of different dimensions. Shapes of interest include, but are not limited to, rods, meshes, blocks, etc. Also of interest are particulate compositions, e.g., granular compositions, made up of a plurality of particles. Where the seed structure is a particulate composition, the dimensions of particles may vary, ranging in some instances from 0.01 to 1,000,000 μm, such as 0.1 to 100,000 μm.

The seed structure may be made up of any convenient material or materials. Materials of interest include both carbonate materials, such as described above, as well as non-carbonate materials. The seed structures may be naturally occurring, e.g., naturally occurring sands, shell fragments from oyster shells or other carbonate skeletal allochems, gravels, etc., or man-made, such as pulverized rocks, ground blast furnace slag, fly ash, cement kiln dust, red mud, and the like. For example, the seed structure may be a granular composition, such as sand, which is coated with the carbonate material during the process, e.g., a white carbonate material or colored carbonate material, e.g., as described above.

In some instances, seed structure may be coarse aggregates, such as friable Pleistocene coral rock, e.g., as may be obtained from tropical areas (e.g., Florida) that are too weak to serve as aggregate for concrete. In this case the friable coral rock can be used as a seed, and the solid $CO_2$ sequestering carbonate mineral may be deposited in the internal pores, making the coarse aggregate suitable for use in concrete, allowing it to pass the LA Rattler abrasion test. In some instances, where alight weight aggregate is desired, the outer surface will only be penetrated by the solution of deposition, leaving the inner core relatively 'hollow' making a light weight aggregate for use in light weight concrete.

Methods as described herein may be carried out in a variety of different continuous reactors. Examples of continuous reactors of interest are further described below and in the Experimental section. Where a continuous reactor is employed, the location at which the $CO_2$ sequestering material is produced may be a fluidized bed subunit of the continuous reactor. Fluidized bed reactors of interest are configured to maintain a region of fluidized solids in a continuously flowing medium, and may have a fluid inlet, a fluid outlet, and a region of material production positioned there-between. A given fluidized bed reactor may have a single change or multiple chambers, as desired. Where desired, the fluidized bed may include structures, e.g., filters, meshes, frits, etc., or other retaining structures which serve to keep the product material in the fluidize bed.

Methods as described herein may further include separating the non-slurry solid phase $CO_2$ sequestering carbonate material from the aqueous bicarbonate rich product containing liquid. Any convenient separation protocol may be employed to remove the product material from the liquid. As such, the product material may be pulled out of the liquid, the liquid may be drained from the product material, etc., as desired. In some instances, the material is removed from the liquid while the liquid is still moving. In yet other instances the material is removed from the liquid after movement of the liquid has been stopped. Compared with protocols that produce slurry products, the energy associated with drying the product materials produced according to the methods described herein is much lower. While the magnitude of difference in energy usage may vary, in some instances the difference ranges from 2 to 100 times, such as 10 to 50 times per ton of material produced. One specific challenge inherent to the field of $CO_2$ sequestering material production is reducing the amount of energy consumed during the carbonation of $CO_2$. Common extraneous sources of energy use in production methods that produce a $CO_2$ sequestering precipitate material include the removal of water from the precipitated materials after formation. Reducing energy needs normally required to separate and potentially dry precipitated material form the bulk solution is important. As compared to process in which $CO_2$ sequestering precipitate materials are produced, embodiments of the present methods produce dried tons of $CO_2$ sequestering material using 2 to 100 times less energy, such as 10 to 50 times less energy, in the water separation/drying step.

Continuous processes for producing $CO_2$ sequestering non-slurry compositions are further described in U.S. Provisional Application Ser. No. 62/062,084 filed on Oct. 9, 2014, the disclosure of which is herein incorporated by reference.

Production of Materials from the $CO_2$ Sequestering Carbonate Products

The product carbonate materials produced, e.g., as described above, may be further manipulated and/or combined with other compositions to produce a variety of end-use materials. In certain embodiments, the product carbonate composition is refined (i.e., processed) in some manner. Refinement may include a variety of different protocols. In certain embodiments, the product is subjected to mechanical refinement, e.g., grinding, in order to obtain a product with desired physical properties, e.g., particle size, etc. In certain embodiments, the product is combined with a hydraulic cement, e.g., as a sand, a gravel, as an aggregate, etc., e.g., to produce final product, e.g., concrete or mortar.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles, roofing granules, etc.) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

Production of Pure $CO_2$ Gas

As described above, during the production of solid carbonate compositions from the bicarbonate rich product or component thereof (e.g., LCP), one mol of $CO_2$ may be produced for every 2 mols of bicarbonate ion from the bicarbonate rich product or component thereof (e.g., LCP). For example, where solid carbonate compositions are produced by adding calcium cation to the bicarbonate rich product or component thereof (e.g., LCP), the production of solid carbonate compositions, e.g., the form of amorphous calcium carbonate minerals, may proceed according to the following reaction:

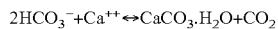

$$2HCO_3^- + Ca^{++} \leftrightarrow CaCO_3 \cdot H_2O + CO_2$$

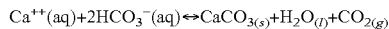

$$Ca^{++}(aq) + 2HCO_3^-(aq) \leftrightarrow CaCO_{3(s)} + H_2O_{(l)} + CO_{2(g)}$$

While the above reaction shows the production of 1 mol of $CO_2$, 2 moles of $CO_2$ from the $CO_2$ containing gas were initially converted to bicarbonate. As such, the overall process sequesters a net 1 mol of $CO_2$ in a carbonate compound and produces 1 mol of substantially pure CO2 product gas, which may be sequestered by injection into a subsurface geological location, as described in greater detail below. Therefore, the process is an effective $CO_2$ sequestration process. Contact of the bicarbonate rich product with the cation source results in production of a substantially pure $CO_2$ product gas. The phrase "substantially pure" means that the product gas is pure $CO_2$ or is a $CO_2$ containing gas that has a limited amount of other, non-$CO_2$ components.

Following production of the $CO_2$ product gas, aspects of the invention may include injecting the product $CO_2$ gas into a subsurface geological location to sequester $CO_2$. By injecting is meant introducing or placing the $CO_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

$CO_2$ gas production and sequestration thereof is further described in U.S. Provisional Application 62/054,322 filed on Sep. 23, 2014, the disclosure of which is herein incorporated by reference.

Recycling

In some instances, the methods may include recirculating one or more of the by-products produced at one or more stages through one or more reactors/stages of the process. Reaction by products that may be recycled into one or more reactors/stages of a given process may vary, and include but are not limited to: saline liquids, pure $CO_2$, acidic saline byproducts, bicarbonate rich liquids, etc. Specific examples of where one or more by-products are recycled are reviewed in greater detail in the following section.

Specific Embodiments

Figure 11:
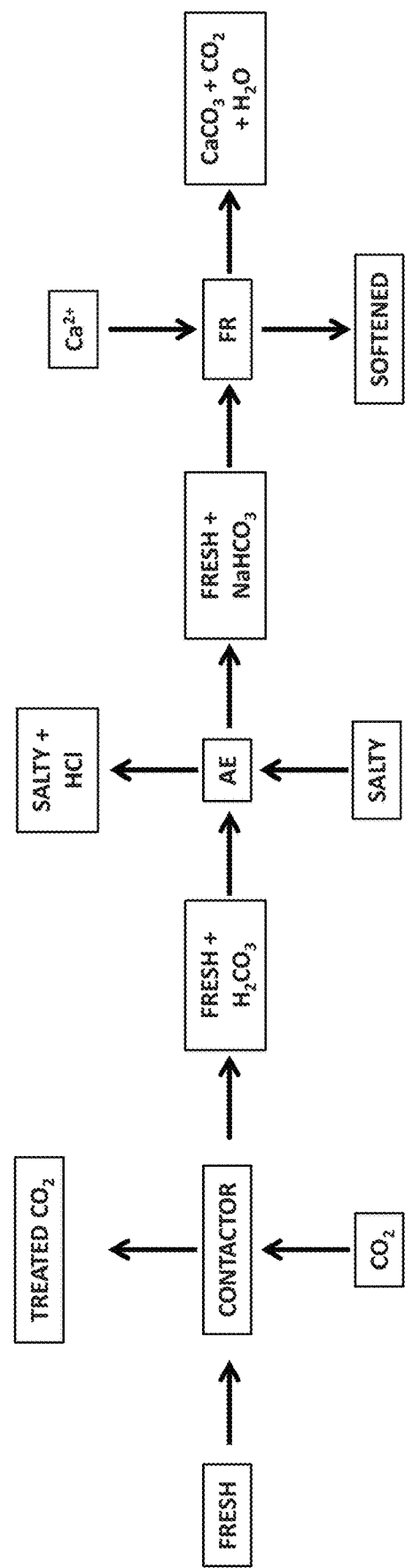
FIGS. 11 to 27 illustrate embodiments of specific alkali enrichment protocol mediated $CO_2$ sequestration processes.
Figure 12:
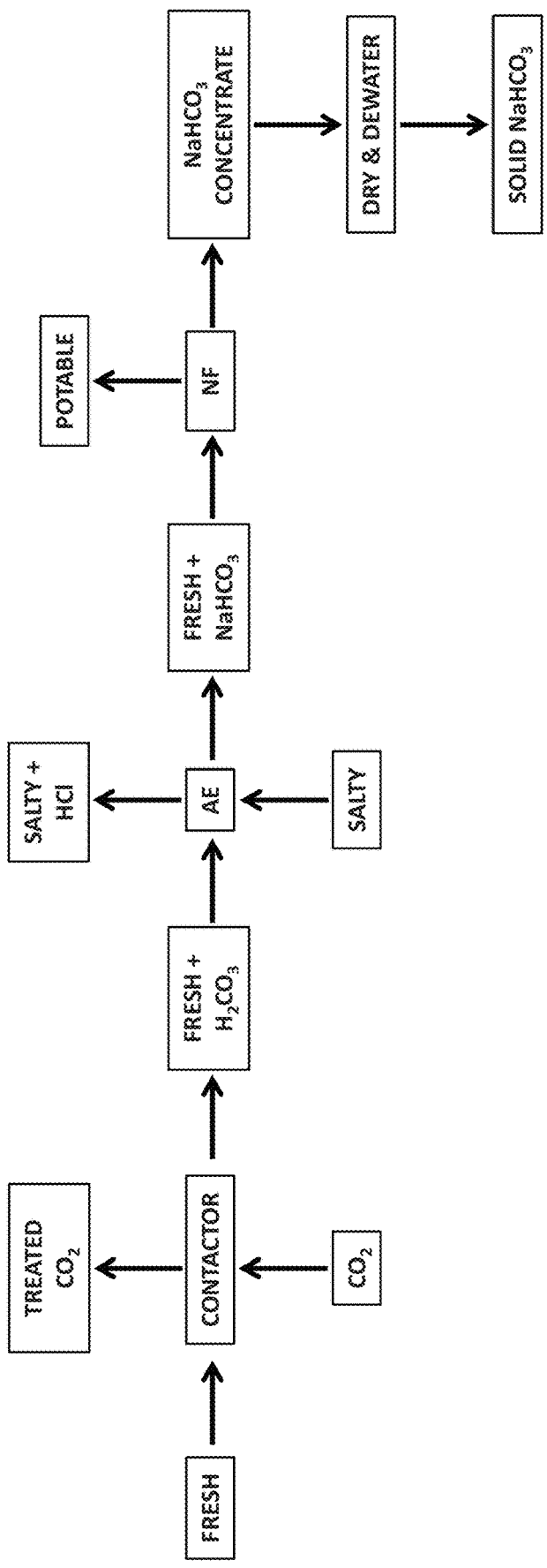

As described above, methods of the invention may employ an alkali enrichment protocol at one or more different stages of a given $CO_2$ sequestration process. For example, an alkali enrichment protocol may be performed after and/or before charging a liquid with a gaseous source of $CO_2$. FIGS. 11 and 12 illustrate embodiments of methods where a $CO_2$ charged liquid is subjected to an alkali enrichment protocol. In the method illustrated schematically in FIG. 11, fresh water (i.e., water having a salinity that is at least 2 times lower than the salinity of salty water employed in the method) is first contacted with a gaseous source of $CO_2$, e.g., as described above, such as flue gas. Contact may be achieved using any convenient gas/liquid contactor, e.g., a hollow fiber membrane contactor or aqueous froth absorber, such as described above. Contact of the fresh water with the gaseous source of $CO_2$ produced a treated $CO_2$ gas which has been depleted of $CO_2$ and a $CO_2$ charged product water having DIC, e.g., in the form of carbonate anion ($H_2CO$). In the embodiment illustrated in FIG. 11, the resultant $CO_2$ charged liquid, designated FRESH+$H_2CO_3$, is that subjected to an alkali enrichment protocol, e.g., as described above, where salty water, e.g., water having a salinity that is at least 2 times greater than the fresh water employed in the process, is employed as a draw liquid. The alkali enrichment process produces a salty acidic byproduct (e.g., salty waste water having a low concentration of HCl and a pH ranging from 2 to 3) and an enhanced alkalinity product liquid designated FRESH+NaHCO$_3$, which may be a bicarbonate rich liquid, such as an LCP containing liquid, e.g., as described above. The product liquid is then combined with a divalent cation source (designated Ca$^{2+}$) in a fluidized bed reactor (designed FR) to produce a sequestering carbonate material, CO$_2$ gas and H$_2$O. A byproduct of the FR reactor is softened water, which is salty water with the hardness, e.g., divalent ions (Ca$^{2+}$, Mg$^{2+}$, SO$_4^{2-}$, etc.), removed.

As with FIG. 11, FIG. 12 illustrates an embodiment of methods where a CO$_2$ charged liquid is subjected to an alkali enrichment (i.e., AE) protocol. In the method illustrated schematically in FIG. 12, fresh water (i.e., water having a salinity that is at least 2 times lower than the salinity of salty water employed in the method) is first contacted with a gaseous source of CO$_2$, e.g., as described above, such as flue gas. Contact may be achieved using any convenient gas/liquid contactor, e.g., a hollow fiber membrane contactor or aqueous froth absorber, such as described above. Contact of the fresh water with the gaseous source of CO$_2$ produces a treated CO$_2$ gas which has been depleted of CO$_2$ and a CO$_2$ charged product water having DIC, e.g., in the form of carbonate anion (H$_2$CO$_3$). In the embodiment illustrated in FIG. 12, the resultant CO$_2$ charged liquid, designated FRESH+H$_2$CO$_3$, is that subjected to an alkali enrichment protocol, e.g., as described above, where salty water, e.g., water having a salinity that is at least 2 times greater than the fresh water employed in the process, is employed as a draw liquid. The alkali enrichment process produces a salty acidic byproduct (e.g., salty waste water having a low concentration of HCl and a pH ranging from 2 to 3) and an enhanced alkalinity product liquid designated FRESH+NaHCO$_3$, which may be a bicarbonate rich liquid, such as an LCP containing liquid, e.g., as described above. The product liquid is then subjected to nanofiltration to dewater the liquid, producing potable water and concentrated bicarbonate rich, e.g., LCP containing, liquid. In the embodiment illustrated in FIG. 12, the resultant concentrated bicarbonate rich liquid is further dried and dewatered to produce solid NaHCO$_3$.

Figure 13:
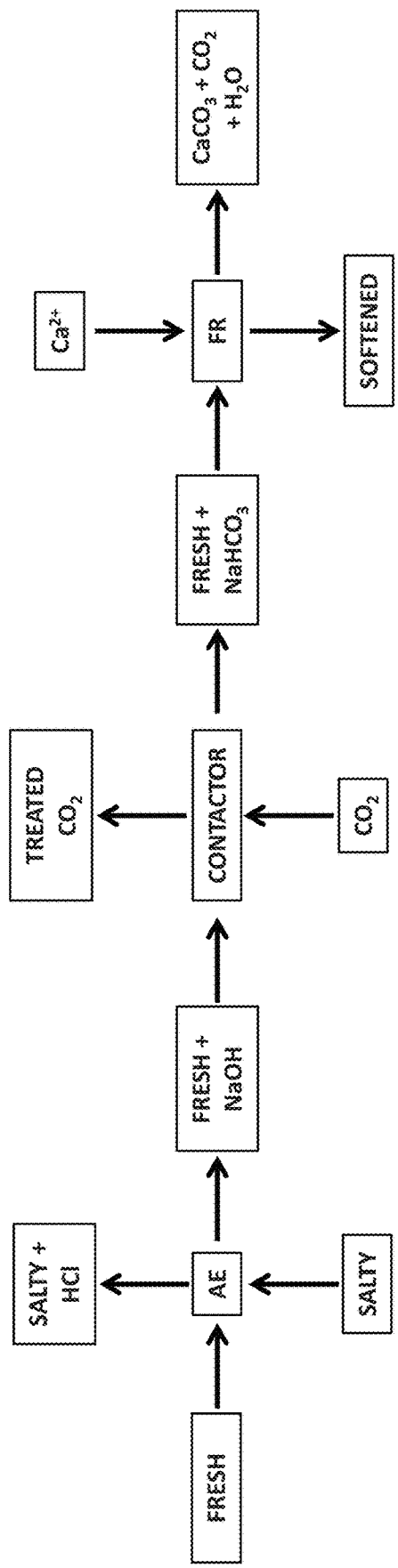

FIG. 13 illustrates an embodiment of methods where an alkali enrichment protocol is employed to produce a CO$_2$ capture liquid, which liquid is then contacted with a gaseous source of CO$_2$ to produce a CO$_2$ charged liquid. In the method illustrated schematically in FIG. 13, fresh water (i.e., water having a salinity that is at least 2 times lower than the salinity of salty water employed in the method) is subjected to an alkali enrichment protocol, e.g., as described above, where salty water, e.g., water having a salinity that is at least 2 times greater than the fresh water employed in the process, is employed as a draw liquid. The alkali enrichment process produces a salty acidic byproduct (e.g., salty waste water having a low concentration of HCl and a pH ranging from 2 to 3) and an enhanced alkalinity product liquid designated FRESH+NaOH, which is then employed as a CO$_2$ capture liquid. Next, the CO$_2$ capture liquid is contacted with a gaseous source of CO$_2$, e.g., as described above, such as flue gas. Contact may be achieved using any convenient gas/liquid contactor, e.g., a hollow fiber membrane contactor or aqueous froth absorber, such as described above. Contact of the CO$_2$ capture liquid with the gaseous source of CO$_2$ produces a treated CO$_2$ gas which has been depleted of CO$_2$ and a CO$_2$ charged liquid designated FRESH+NaHCO$_3$, which may be a bicarbonate rich liquid, such as an LCP containing liquid, e.g., as described above. The product liquid is then combined with a divalent cation source (designated Ca$^{2+}$) in a fluidized bed reactor (designed FR) to produce a sequestering carbonate material, CO$_2$ gas and H$_2$O. A byproduct of the FR reactor is softened water, which is salty water with the hardness, e.g., divalent ions (Ca$^{2+}$, Mg$^{2+}$, SO$_4^{2-}$, etc.), removed.

Figure 14:
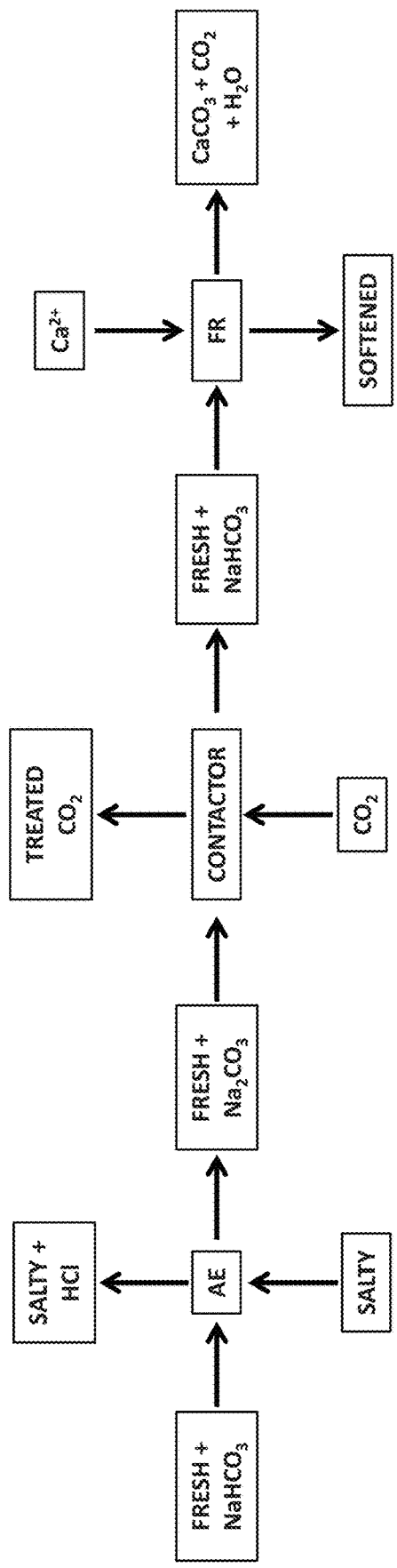

As with FIG. 13, FIG. 14 illustrates an embodiment of methods where an alkali enrichment protocol is employed to produce a CO$_2$ capture liquid, which liquid is then contacted with a gaseous source of CO$_2$ to produce a CO$_2$ charged liquid. In the method illustrated schematically in FIG. 14, fresh water that includes an amount of sodium bicarbonate, e.g., as produced by the method illustrated in FIG. 16 (designated FRESH+NaHCO$_3$), is subjected to an alkali enrichment protocol, e.g., as described above, where salty water, e.g., water having a salinity that is at least 2 times greater than the fresh water employed in the process, is employed as a draw liquid. The alkali enrichment process produces a salty acidic byproduct (e.g., salty waste water having a low concentration of HCl and a pH ranging from 2 to 3) and an enhanced alkalinity product liquid designated FRESH+Na$_2$CO$_3$, which is then employed as a CO$_2$ capture liquid. Next, the CO$_2$ capture liquid is contacted with a gaseous source of CO$_2$, e.g., as described above, such as flue gas. Contact may be achieved using any convenient gas/liquid contactor, e.g., a hollow fiber membrane contactor or aqueous froth absorber, such as described above. Contact of the CO$_2$ capture liquid with the gaseous source of CO$_2$ produces a treated CO$_2$ gas which has been depleted of CO$_2$ and a CO$_2$ charged liquid designated FRESH+NaHCO$_3$, which may be a bicarbonate rich liquid, such as an LCP containing liquid, e.g., as described above. The product liquid is then combined with a divalent cation source (designated Ca$^{2+}$) in a fluidized bed reactor (designed FR) to produce a sequestering carbonate material, CO$_2$ gas and H$_2$O. A byproduct of the FR reactor is softened water, which is salty water with the hardness, e.g., divalent ions (Ca$^{2+}$, Mg$^{2+}$, SO$_4^{2-}$, etc.), removed.

Figure 15:
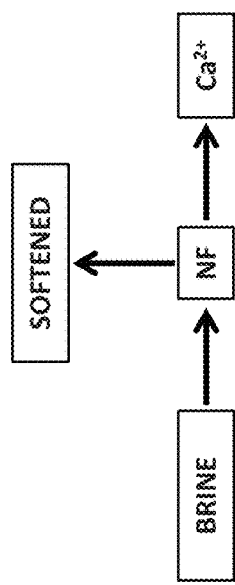
Figure 16:
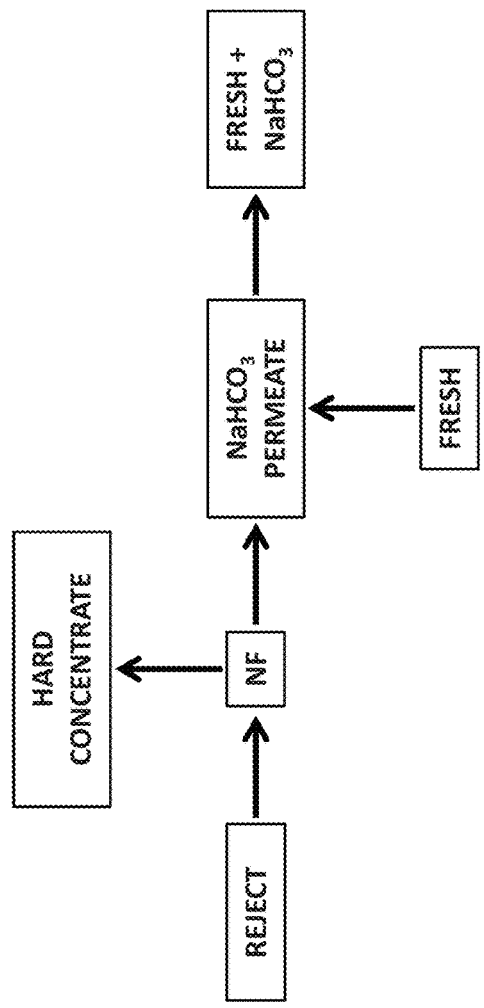

FIG. 15 illustrates a method of producing a concentrated divalent cation source from an initial brine which can be used the methods illustrated in FIGS. 11 to 14. As shown in FIG. 15, an initial brine, e.g., such as described above, is contacted with a nanofiltration membrane (designed NF) to produce a concentrated hard water (designed Ca2+) and softened water. FIG. 16 illustrates a method of converted an industrial waste water (designated reject) into a feed water that may be employed in the method illustrated in FIG. 14. In FIG. 16, an industrial waste water (designated REJECT, which may be industrial water w/ NaHCO$_3$ present in solution, e.g., seawater RO concentrate) is first contacted with a nanofiltration system (designated NF) to produce a hard concentrate by product (e.g., concentrate from treatment of REJECT water w/ NF, contains, e.g., Ca$^{2+}$, Mg$^{2+}$, SO$_4^{2-}$, etc.) and a permeate that contains NaHCO$_3$. The resultant permeate may be combined with freshwater to produce a desired feedwater, designated FRESH+NaHCO$_3$, which feedwater may then be employed in a process as illustrated in FIG. 14.

Figure 17:
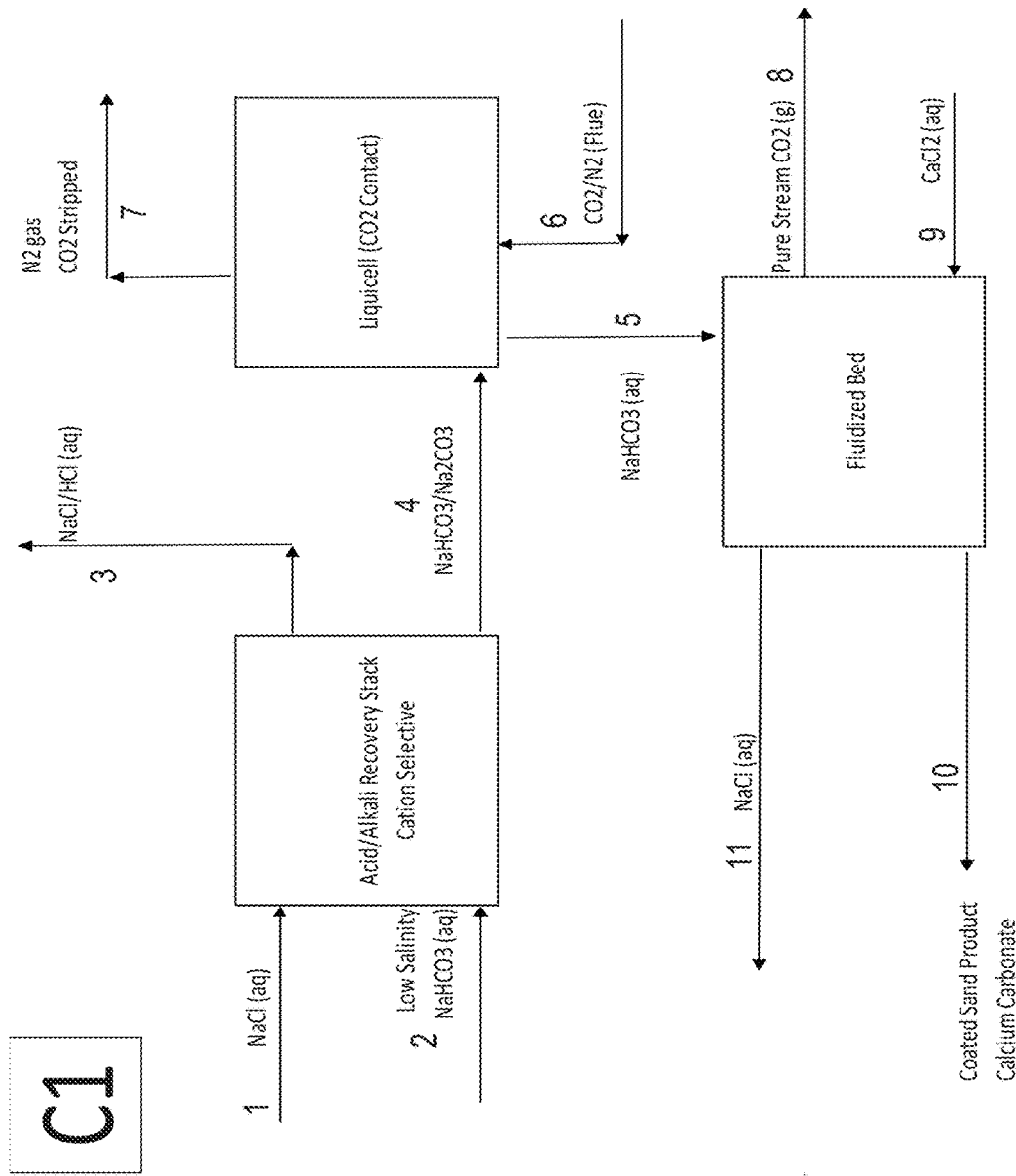

FIG. 17 provides a schematic of an embodiment of an alkali enrichment mediated CO$_2$ sequestration process which generates alkalinity for CO$_2$ sequestration by converting a bicarbonate solution to a carbonate-containing capture solution which can be further used to capture CO$_2$ from flue gas. The resultant, captured CO$_2$ is then converted to a CO$_2$ sequestering calcium carbonate product in the form of coated sand. This process uses a cation selective membrane and therefore has been given the designation C1 (first cation-selective method). In the process illustrated in FIG. 17, the feed stream 1 is a high salinity solution, containing NaCl, which provides the osmotic pressure to drive alkalinity formation. The stream enters into an Acid/Alkali Recovery (i.e., AR) stack (where the term "alkali recovery" is equated to "alkali enrichment" as described above) which is loaded with cation selective membranes. The draw stream 2 is a low salinity solution containing bicarbonate ion (sodium bicarbonate). The stream enters the AR stack and is put into contact with a cation-selective membrane which is also in contact with the feed solution 1. The waste stream derived from the feed solution includes sodium ions that have left the solution to enter into the draw resulting in a conversion of some NaCl to HCl. The product stream derived from the draw solution has drawn sodium ions from the feed, increasing the solution alkalinity, resulting in the conversion of some bicarbonate to carbonate ion. The generated alkalinity is used to capture $CO_2$ (g) when it is brought into contact with a flue stream (6) in a hollow fiber membrane (e.g., Liqui-cel) $CO_2$ gas contactor. The product stream 5 of stream 4 after it has captured $CO_2$ (g) from the flue stream includes generated carbonate ions that sequester a $CO_2$ (g) from the flue gas and convert to form 2 bicarbonate ions. This bicarbonate-rich solution 5 enters into the fluidized bed to convert the newly capture $CO_2$ (g) (now in the form of bicarbonate) to a calcium carbonate product. As shown in FIG. 17, stream 6 is a $CO_2$-containing gas (flue) from which $CO_2$ must be captured and sequestered, and stream 7 is the waste of stream (6) which has now been stripped of $CO_2$ gas. As illustrated, feed stream 6 is selectively stripped of $CO_2$, since $N_2$ gas is still present in the waste stream 7. Product stream 8 is pure $CO_2$ which results from the reaction of $CaCl_2 + 2NaHCO_3 \rightarrow CaCO_3$ (s)$+CO_2$ (g)$+2NaCl$ (aq). The amount of $CO_2$ released as pure stream is half of the amount that was sequestered in stream (5). The divalent ion containing stream which induces $CaCO_3$ formation within the fluidized bed with the bicarbonate-rich solution of stream (5) is shown as stream 9. The $CaCO_3$ formed in the Fluidized bed is of the form of a coating on seed sand particles shown as product stream 10 and stream 11 is the waste stream leaving the fluidized bed contains NaCl.

Figure 18:
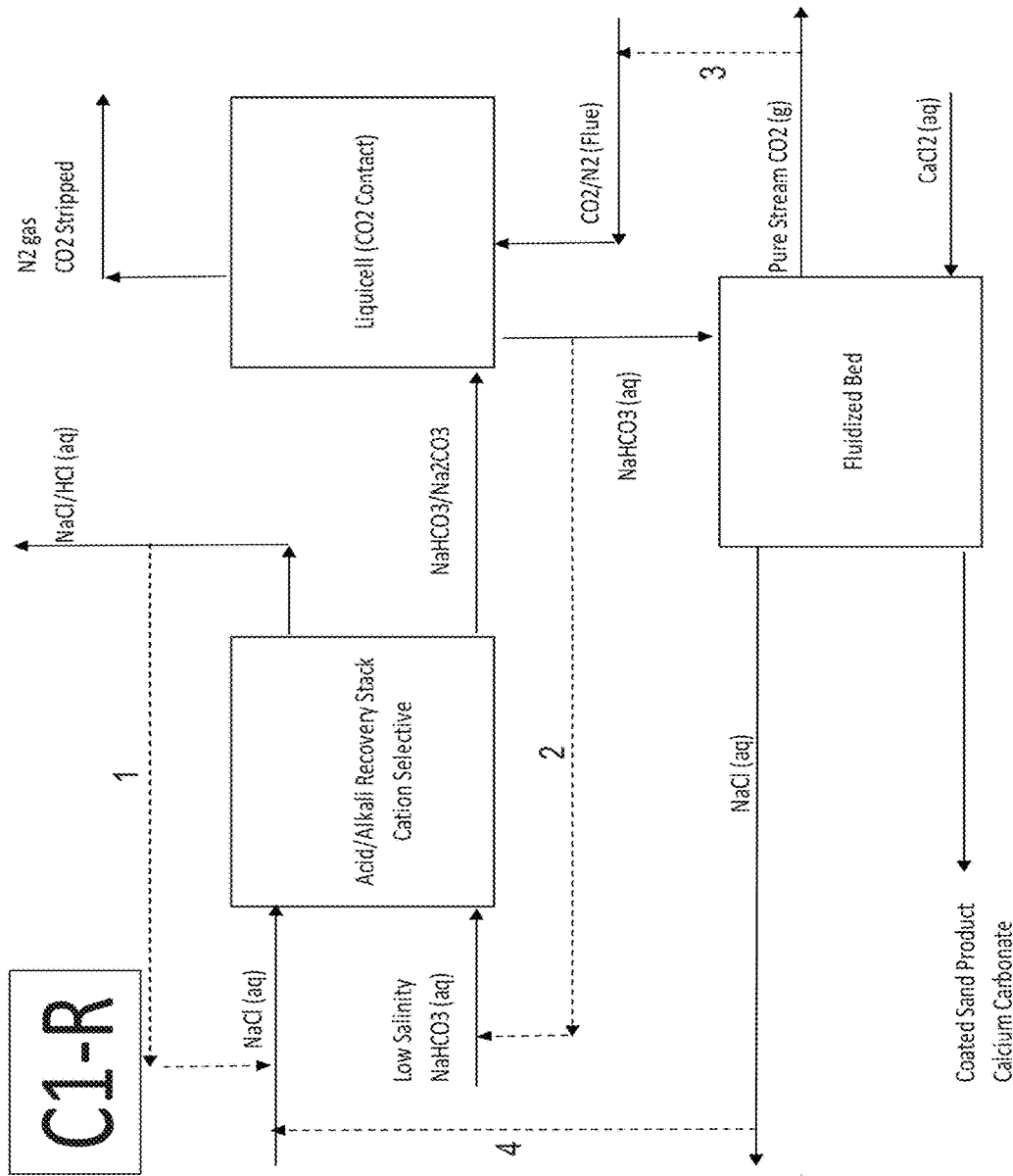

FIG. 18 is a schematic illustration of a variation of the process shown in FIG. 8 that incorporates stream recycling and therefore has been designated C1-R (Recycling). The recycling of streams allows for the reduction of material demand and/or a reduction in capital equipment requirements. In FIG. 18, as a portion of the NaCl/HCl waste stream (1) exiting the AR stack is recycled back into the Feed NaCl stream, the necessary input of new NaCl Feed water and salts may be reduced. Furthermore, since a portion of the product $NaHCO_3$ stream exiting the Liqui-cel $CO_2$ contact is recycled back into the Low Salinity $NaHCO_3$ draw stream entering the AR stack (2), the new $NaHCO_3$ requirement for the draw stream is reduced. In fact, if enough is recycled in this fashion, the need for any additional, new $NaHCO_3$ draw into the AR stack can be eliminated. In this steady state scenario, new $NaHCO_3$ draw may be required to initiate the process, but can be regenerated entirely in a sustainable fashion. A portion of the product (4), pure $CO_2$ (g), stream exiting the Fluidized Bed is recycled into the incoming flue gas prior to entering the Liqui-cel $CO_2$ contactor, which results in a $CO_2$-enriched flue gas entering the Liqui-cel $CO_2$ Contactor, increasing $CO_2$ uptake. This configuration provides an increase in efficiency of $CO_2$ sequestration until a steady-state situation develops. The NaCl waste stream (5) exiting the Fluidized is partially/totally recycled into the NaCl Feed stream, further reducing salt and water requirements.

Figure 19:
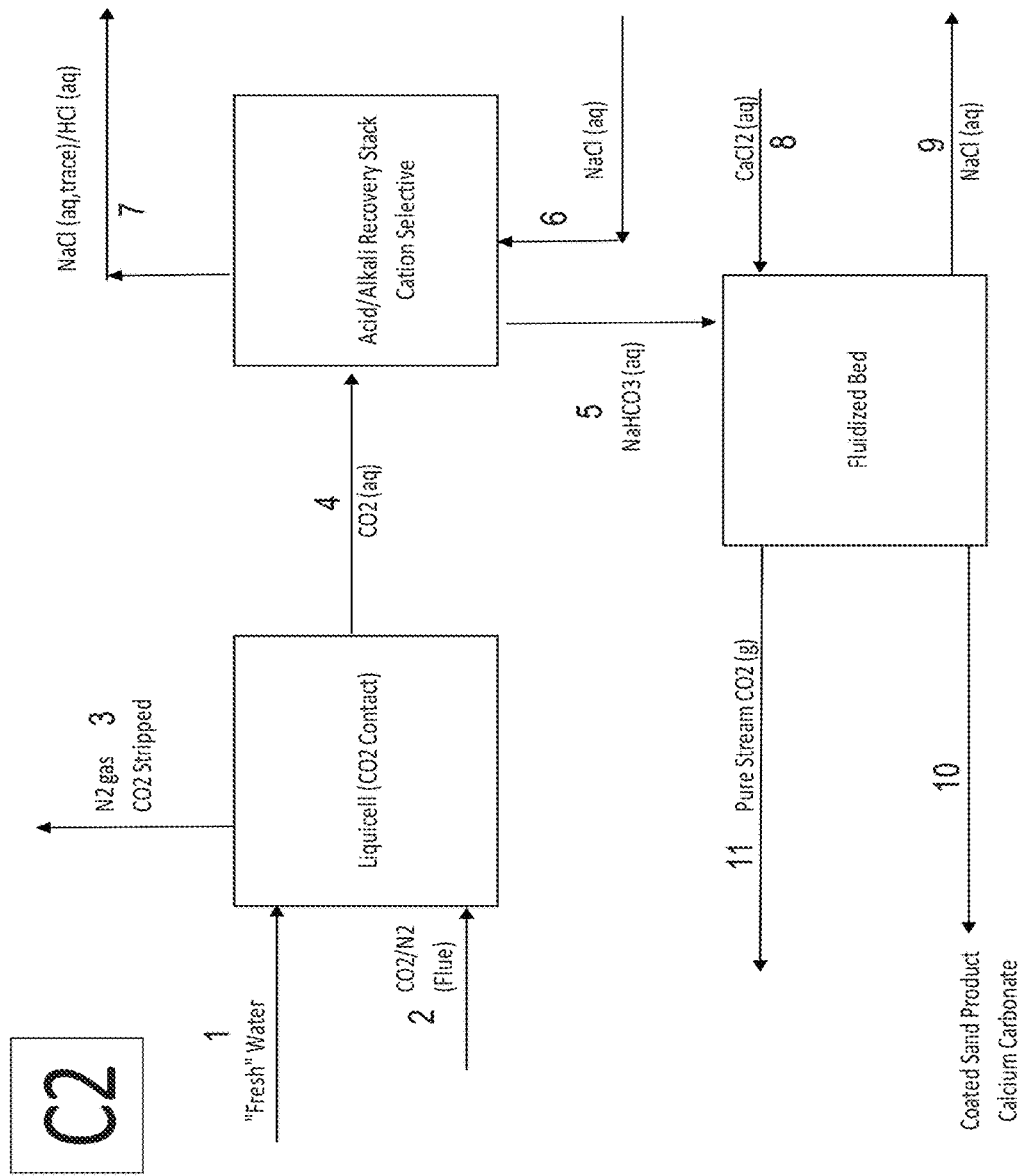

FIG. 19 provides a schematic of an embodiment of the methods that generates alkalinity for $CO_2$ sequestration by converting sequestered $CO_2$ (aq) to a bicarbonate-containing solution that can be used to coat calcium carbonate product onto sand seeds in the presence of $CaCl_2$. The process shown in FIG. 19 is an embodiment where alkali enrichment is performed after $CO_2$ capture. This process utilizes a cation-selective membrane in the AR stack and therefore has been designated C2 (second cation-selective method). In the embodiment shown in FIG. 19, the liquid stream (1) used to capture $CO_2$ is a low salinity, "Fresh" solution. The stream enters into Liqui-cel $CO_2$ Contactor which sequesters $CO_2$ from flue gas (2) in the form of $CO_2$ (aq). The waste (3) of stream (2) has been stripped of $CO_2$ but not $N_2$ gas, and therefore has been selectively stripped of $CO_2$ gas. The output of the Liqui-cel contactor is a stream (4) which is a low salinity, "Fresh" solution which now contains sequestered $CO_2$ from flue gas in the form of $CO_2$ (aq). The draw stream enters the AR stack where the $CO_2$ (aq) is converted to bicarbonate ion. The stream (4) enters the AR stack and is put into contact with a cation-selective membrane that is also in contact with saline solution (6). The bicarbonate-rich product stream (5) exiting the AR stack is a low salinity solution now containing bicarbonate resulting from the increase in alkalinity due to transfer of sodium ion into the solution. This bicarbonate-rich solution (5) enters into the fluidized bed to convert the newly capture $CO_2$ (g) (now in the form of bicarbonate) to a calcium carbonate product (10). As indicated above, stream (6) is a high salinity feed solution which supplies the sodium ions for alkalinity generation in the AR stack, resulting in the conversion of some $CO_2$ (g) to bicarbonate ion in the product stream (5). The waste stream (7) derived from the AR stack shows that sodium ions have left the solution, resulting in a conversion of some NaCl to HCl. Stream (8) is the divalent ion containing stream which induces $CaCO_3$ formation within the fluidized bed when mixed with the bicarbonate-rich solution of stream (5). As illustrated, the waste stream (9) leaving the fluidized bed contains NaCl. The $CaCO_3$ (10) formed in the Fluidized bed is of the form of a coating on seed sand particles. Also shown is a pure $CO_2$ product stream (11) which results from the reaction of $CaCl_2 + 2NaHCO_3 \rightarrow CaCO_3$ (s)$+CO_2$ (g)$+2NaCl$ (aq). The amount of $CO_2$ released as pure stream is half of the amount that was sequestered in stream (5).

Figure 20:
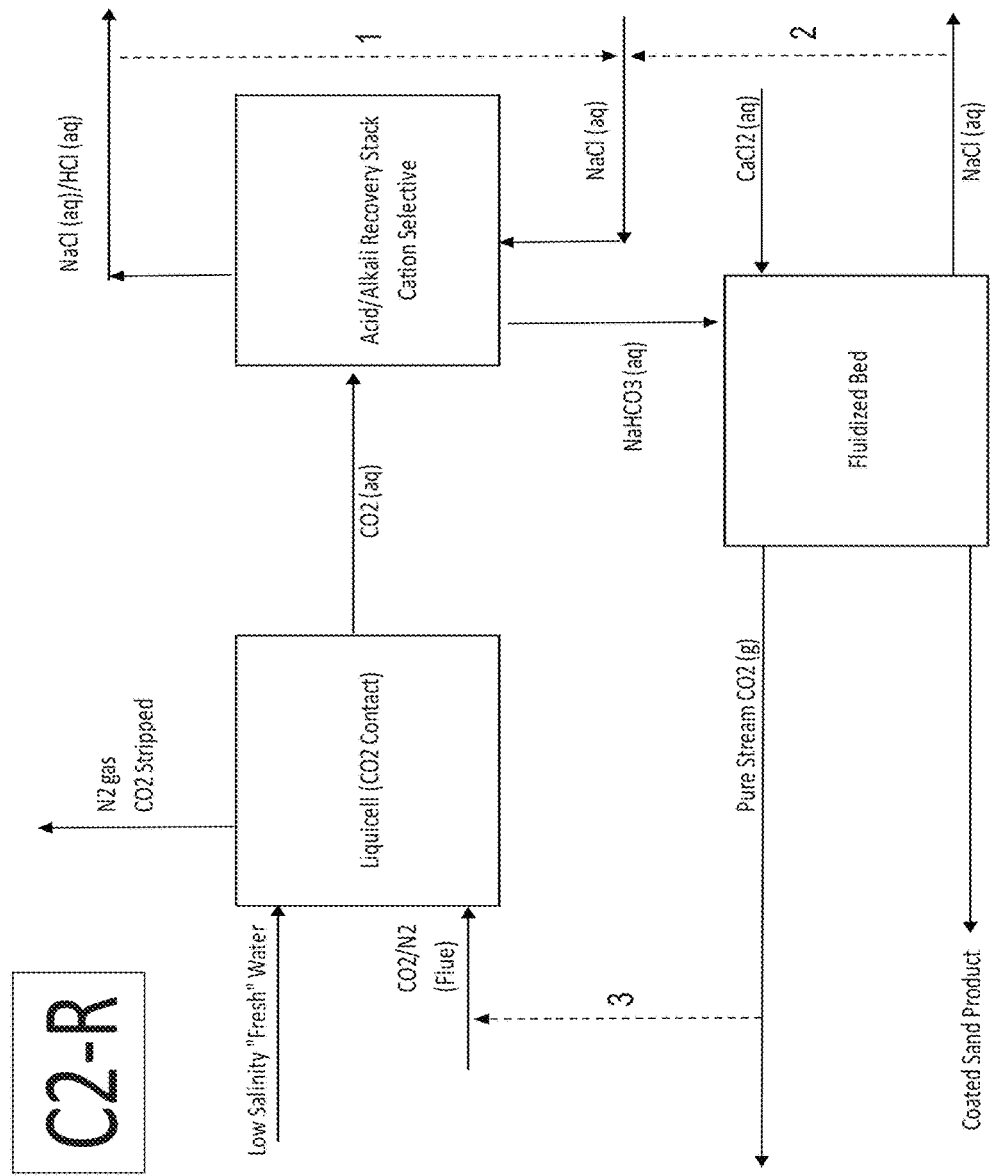

The process illustrated in FIG. 20 is analogous to that illustrated in FIG. 19 with the incorporation of stream recycling, and therefore has been designated C2-R (Recycling). The recycling of streams allows for the reduction of material demand and/or a reduction in capital equipment requirements. As shown by stream (1), a portion of the NaCl/HCl waste stream exiting the AR stack is recycled back into the Feed NaCl stream, reducing the necessary input of new NaCl Feed water and salts. The NaCl waste stream (2) exiting the Fluidized bed may be partially/totally recycled into the NaCl Feed stream, further reducing salt and water requirements. A portion of the pure $CO_2$ (g) product stream (3) exiting the Fluidized Bed may be recycled into the incoming flue gas prior to entering the Liqui-cel $CO_2$ contactor, resulting in a $CO_2$-enriched flue gas entering the Liqui-cel $CO_2$ Contactor, increasing $CO_2$ uptake efficiency in the contactor. This configuration increases efficiency of $CO_2$ sequestration until a steady-state configuration develops.

Figure 21:
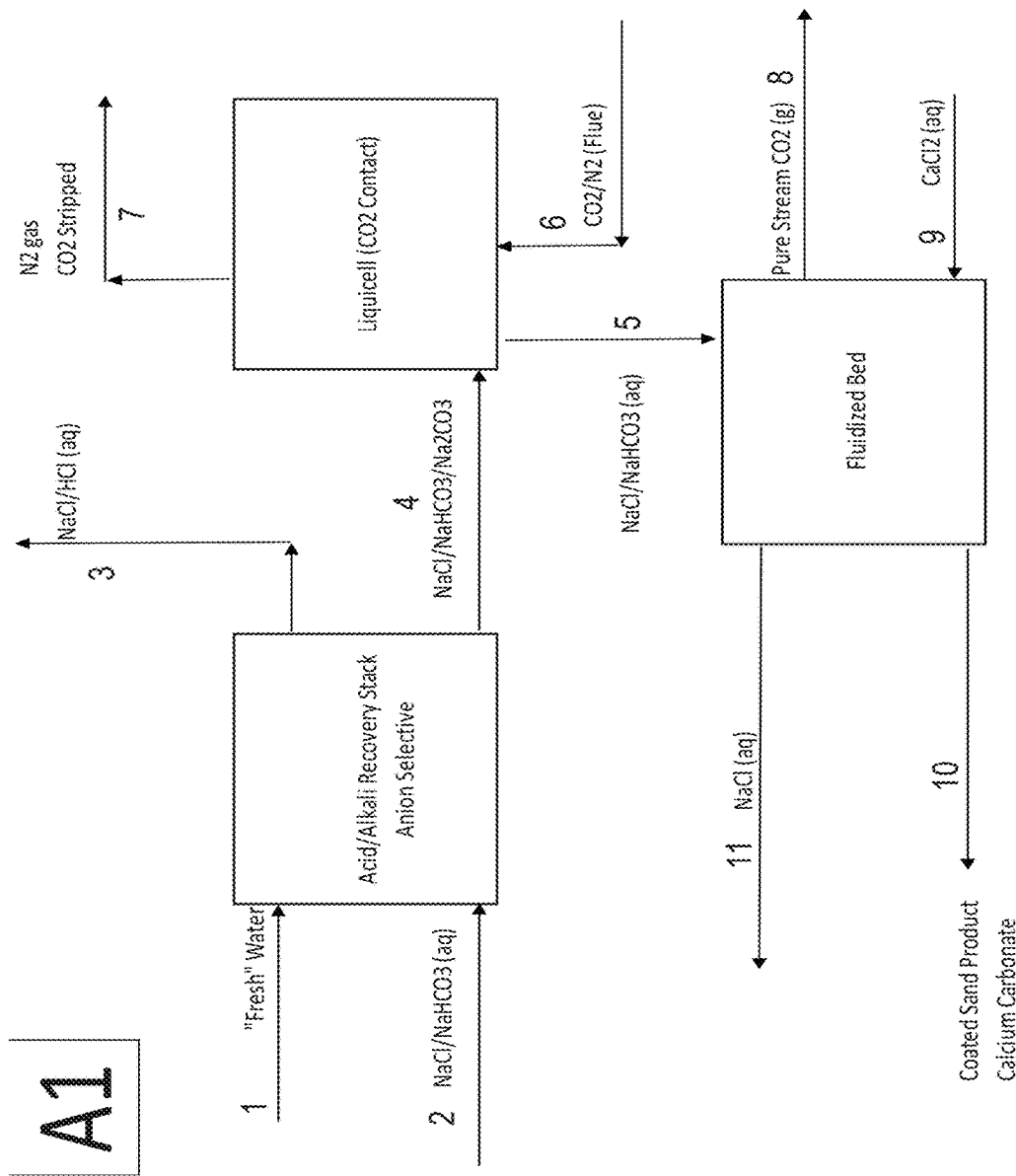

FIG. 21 provides a schematic of a method embodiment that generates alkalinity for $CO_2$ sequestration by converting a bicarbonate solution to a carbonate-containing capture solution which can be further used to capture $CO_2$ from flue gas. The resultant, captured $CO_2$ is then converted to a calcium carbonate product in the form of coated sand. This illustrated method employs an anion-selective membranes in the AR stack and therefore is designated A1 (first, anion-selective). As illustrated in FIG. 21, draw stream (1) is a low salinity solution. The stream (1) enters the AR stack and is put into contact with a anion-selective membrane which is also in contact with the feed solution (2). The feed stream (2) is a high salinity solution, containing NaCl and sodium bicarbonate, which provides the osmotic pressure to drive alkalinity formation. The stream (2) enters into an Acid/Alkali Recovery (AR) stack which loaded with anion selective membranes. Stream (3) is the waste stream that is derived from the draw solution. Chloride ions have left the feed solution to enter into the draw resulting in the formation of HCl (aq) in the waste stream (3). The product stream (4) derived from the feed solution is a enhanced alkalinity solution. The solution has transferred chloride ions to the draw, increasing the solution alkalinity, resulting in the conversion of some bicarbonate to carbonate ion. The generated alkalinity is used to capture $CO_2$ (g) when it is brought into contact with a flue stream (6) in a Liqui-cell $CO_2$ contactor. Stream (5) is the product stream of stream (4) after it has captured $CO_2$ (g) from the flue stream. The generated carbonate ions in stream (4) sequester a $CO_2$ (g) from the flue gas and convert to form 2 bicarbonate ions. This bicarbonate-rich solution enters into the fluidized bed to convert the newly capture $CO_2$ (g) (now in the form of bicarbonate) to a calcium carbonate product. Stream (6) is a $CO_2$-containing gas (flue) from which $CO_2$ must be captured and sequestered, while stream (7) is the waste of stream (6) which has now been stripped of $CO_2$ gas. Stream (8) is a pure $CO_2$ product stream which results from the reaction of $CaCl_2 + 2NaHCO_3 \rightarrow CaCO_3$ (s)$+CO_2$ (g)$+2NaCl$ (aq). The amount of $CO_2$ released as pure stream is half of the amount that was sequestered in stream (5). The divalent ion containing stream (9) induces $CaCO_3$ formation within the fluidized bed with the bicarbonate-rich solution of stream (5). The $CaCO_3$ (10) formed in the Fluidized bed is of the form of a coating on seed sand particles. Stream (11) is the waste stream leaving the fluidized bed contains NaCl.

Figure 22:
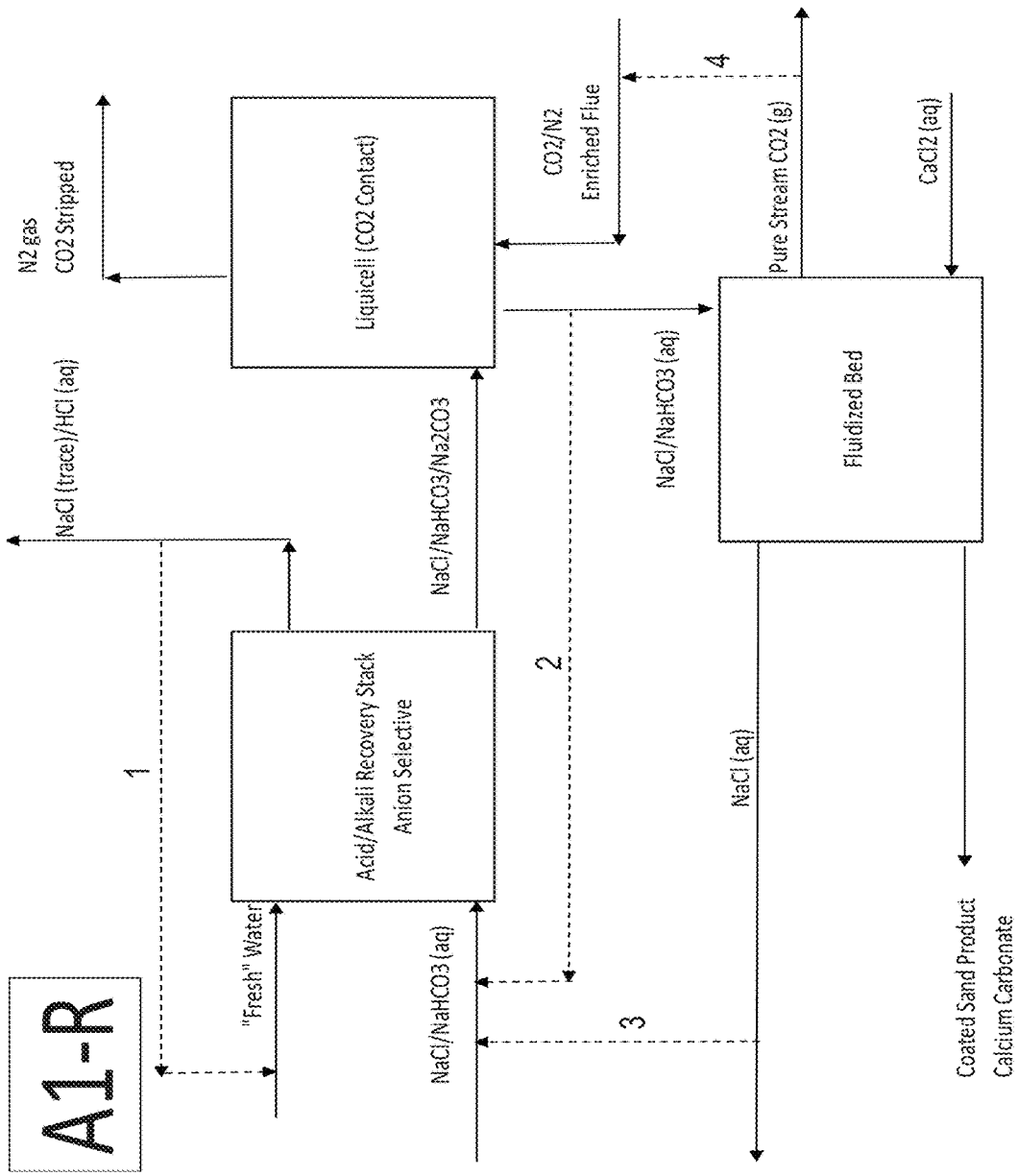

FIG. 22 provides a schematic of a process analogous to that shown in FIG. 21 with the incorporation of stream recycling, and therefore has been designated A1-R (Recycled). The recycling of streams allows for the reduction of material demand and/or a reduction in capital equipment requirements. As shown in FIG. 22, a portion of the HCl waste stream (1) exiting the AR stack is recycled back into the draw "Fresh" stream, such that the necessary input of new "Fresh" draw stream water is reduced. As illustrated by stream (2), a portion of the product $NaHCO_3$ stream exiting the Liqui-cel $CO_2$ contact is recycled back into the high salinity $NaHCO_3$ feed stream entering the AR stack, such that additional $NaHCO_3$ requirements for the draw stream is reduced. In some instances, if enough is recycled in this fashion, the need for any additional, new $NaHCO_3$ draw into the AR stack can be eliminated. In this steady state configuration, new $NaHCO_3$ draw may be required to initiate the process, but can be regenerated entirely in a sustainable fashion. As shown by stream (3), the NaCl waste stream exiting the Fluidized bed is partially/totally recycled into the NaCl Feed stream, further reducing salt and water requirements. As shown by stream (4), a portion of the product, pure $CO_2$ (g), stream exiting the Fluidized Bed is recycled into the incoming flue gas prior to entering the Liqui-cel $CO_2$ contactor. This configuration produces a $CO_2$-enriched flue gas entering the Liqui-cel $CO_2$ Contactor, increasing $CO_2$ uptake. This approach increases efficiency of $CO_2$ sequestration until a steady-state configuration develops.

Figure 23:
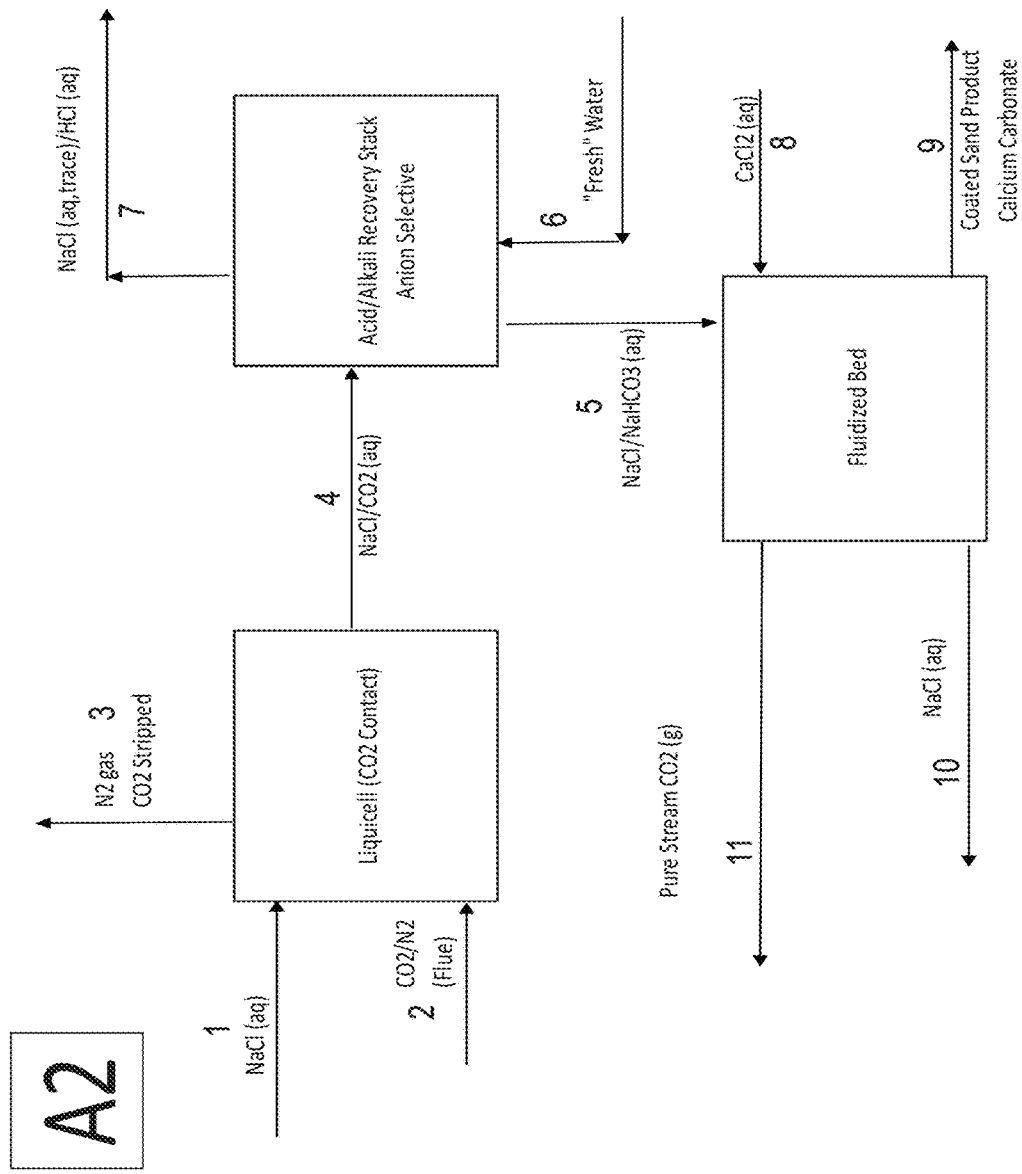

FIG. 23 provides a schematic illustration of method that generates alkalinity for $CO_2$ sequestration by converting sequestered $CO_2$ (aq) to a bicarbonate-containing solution that can be used to coat calcium carbonate product onto sand seeds in the presence of $CaCl_2$. This process utilizes an anion-selective membrane in the AR stack and therefore has been designated A2 (second anion-selective method). As shown in FIG. 23, the feed stream (1) is a high salinity solution containing sodium chloride. The stream enters into Liqui-cel $CO_2$ Contactor which sequesters $CO_2$ from flue gas (2) in the form of $CO_2$ (aq). The waste (3) of stream (2) has been stripped of $CO_2$ gas. The feed stream (4) is a high salinity, NaCl (aq) solution which now contains sequestered $CO_2$ from flue gas in the form of $CO_2$ (aq). The feed stream (4) enters the AR stack where the $CO_2$ (aq) will be converted to bicarbonate ion. The stream enters the AR stack and is put into contact with an anion-selective membrane which is also in contact with the draw solution (6). The bicarbonate-rich product stream (5) exiting the AR stack is a high salinity solution now containing bicarbonate resulting from the increase in alkalinity due to transfer of chloride ion into the solution. This bicarbonate-rich solution (5) enters into the fluidized bed to convert the newly capture $CO_2$ (g) (now in the form of bicarbonate) to a calcium carbonate product. The low salinity draw solution (6) which draws HCl ions for alkalinity generation in the AR stack results in the conversion of some $CO_2$ (g) to bicarbonate ion in the product stream (5) and the production of waste stream (7) that includes chloride ions which have left the feed solution to enter into the draw resulting in the generation of alkalinity in the feed. Stream (8) is the divalent ion containing stream which induces $CaCO_3$ formation within the fluidized bed when mixed with the bicarbonate-rich solution of stream (5), and stream (9) is the $CaCO_3$ formed in the Fluidized bed in of the form of a coating on seed sand particles. The waste stream (10) leaving the fluidized bed contains NaCl. Stream (11) is a pure $CO_2$ product stream which results from the reaction of $CaCl_2) + 2NaHCO_3 \rightarrow CaCO_3$ (s)$+CO_2$ (g)$+2NaCl$ (aq). The amount of $CO_2$ released as pure stream is half of the amount that was sequestered in stream (5).

Figure 24:
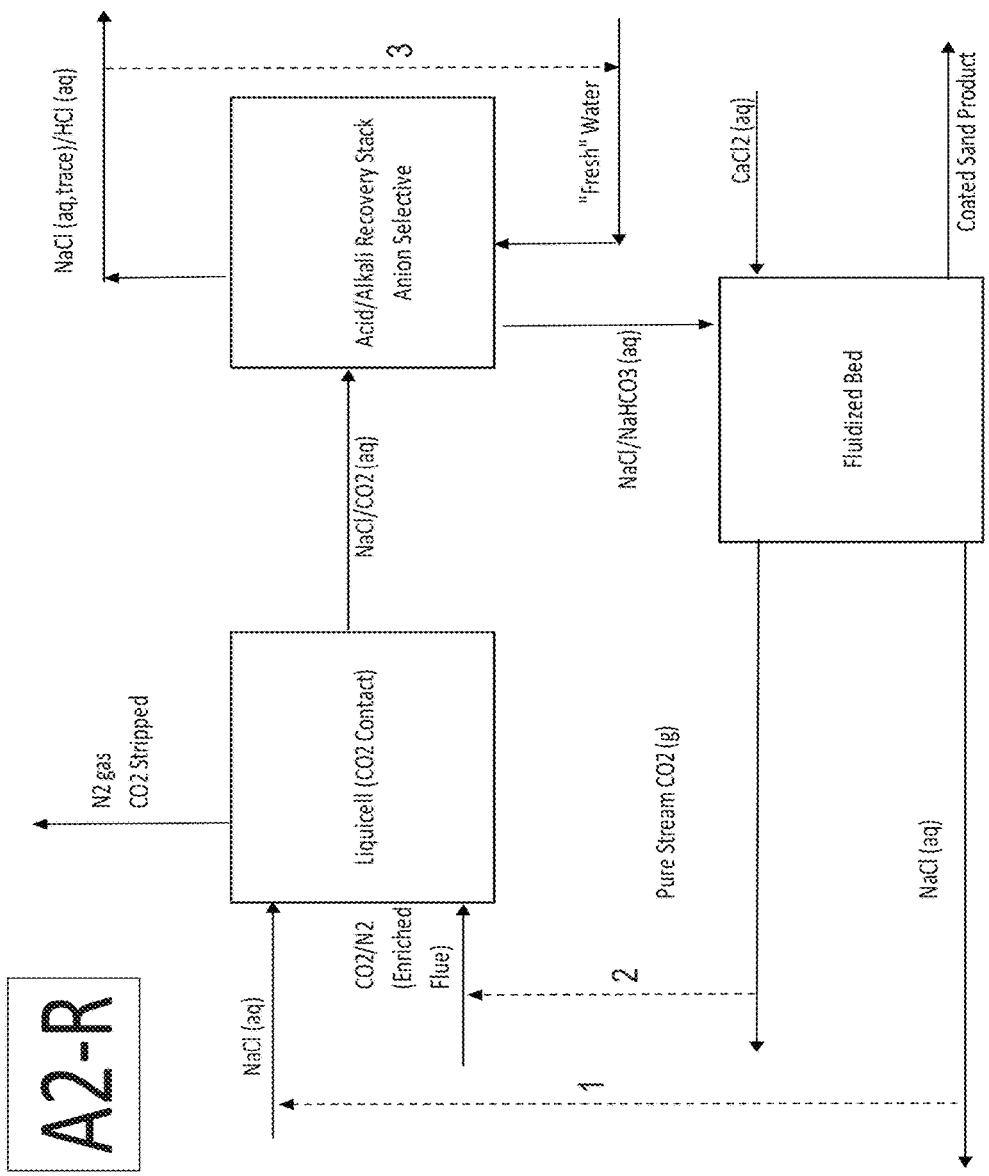

FIG. 24 provides a schematic of a process analogous to that shown in FIG. 23 with the incorporation of stream recycling, and therefore has been designated A2-R (Recycled). The recycling of streams allow for the reduction of material demand and/or a reduction in capital equipment requirements. As illustrated by stream (1), the NaCl waste stream exiting the Fluidized bed is partially/totally recycled into the NaCl Feed stream, reducing salt and water requirements. In stream (2), a portion of the pure $CO_2$ (g) product stream exiting the Fluidized Bed is recycled into the incoming flue gas prior to entering the Liqui-cel $CO_2$ contactor, which results in a $CO_2$-enriched flue gas entering the Liqui-cel $CO_2$ contactor, increasing $CO_2$ uptake efficiency in the contactor. This approach increases efficiency of $CO_2$ sequestration until a steady-state configuration develops. As shown in stream (3), a portion of the HCl waste stream exiting the AR stack is recycled back into the draw "Fresh" water stream entering the AR stack, such that the necessary input of new draw water is reduced.

Figure 25:
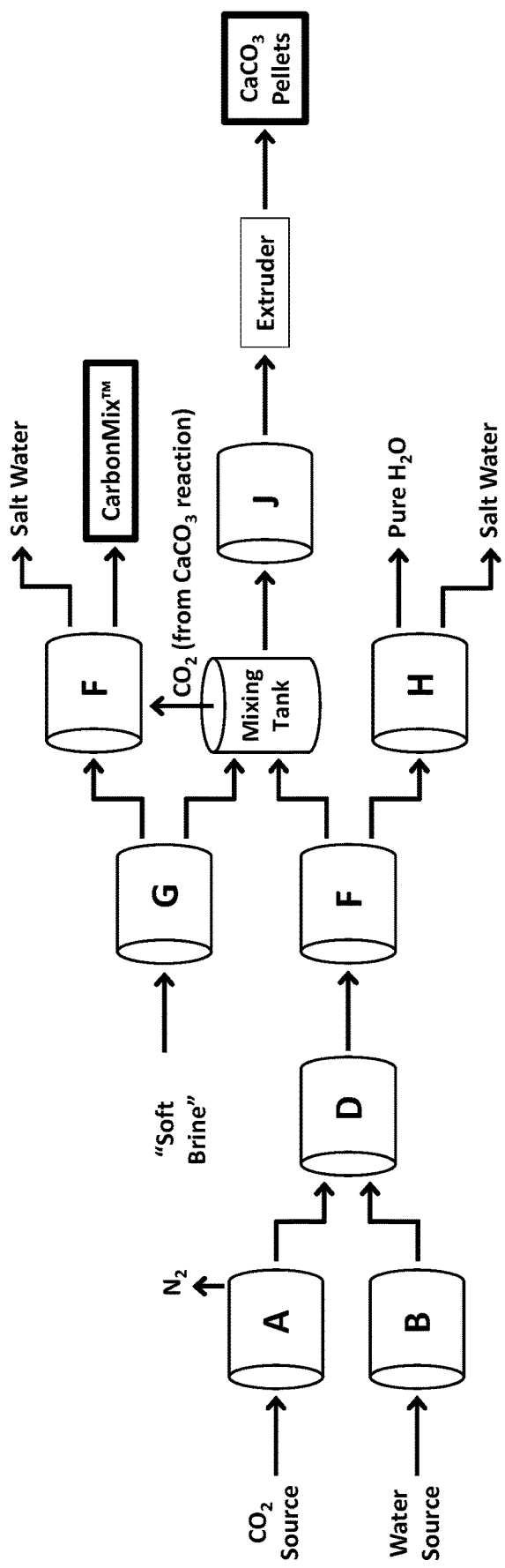
Figure 26:
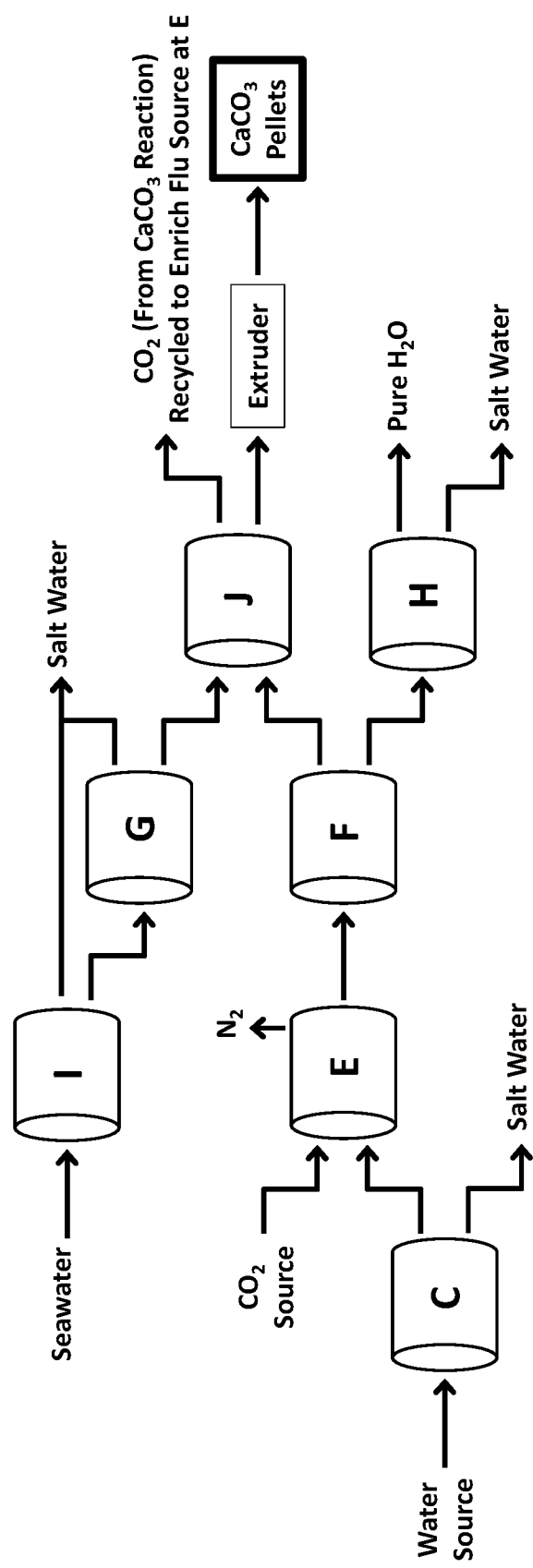
Figure 27:
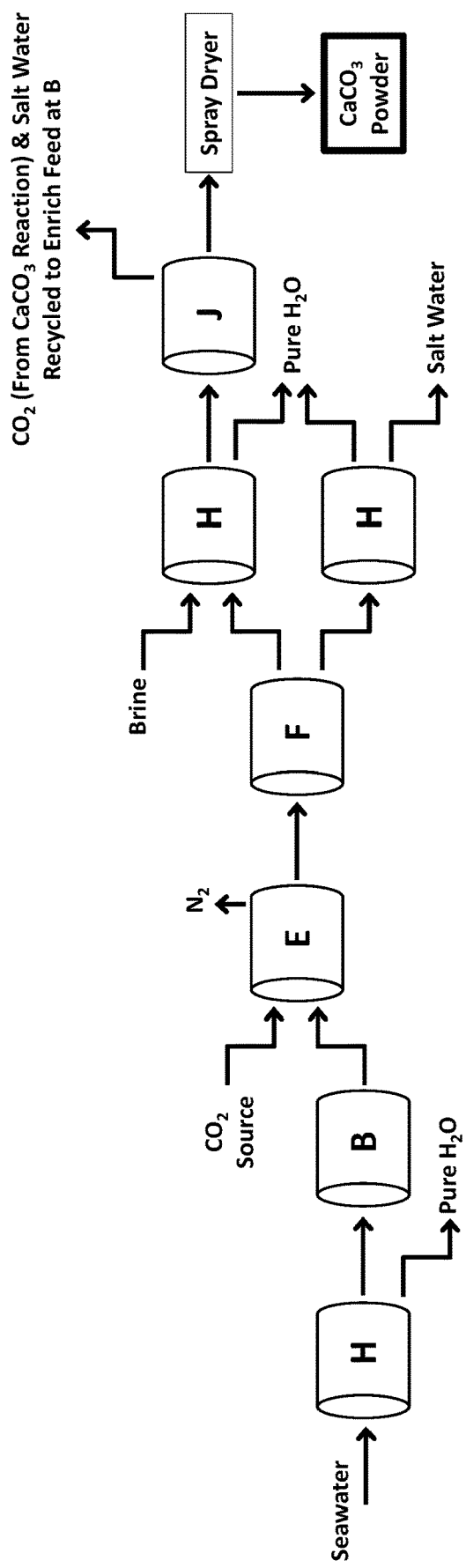

FIGS. 25 to 27 provides illustrations of different embodiments of membrane mediated processes in which an alkali enrichment protocol is employed to produce a $CO_2$ capture liquid, and the $CO_2$ sequestration process is one that produces a $CO_2$ sequestering carbonate precipitate, which precipitate may then be further manipulated, e.g., to produce a variety of products. As illustrated in these protocols there are multiple membrane modules in the processes, where each module may be accomplished by a single membrane device or a plurality of membrane devices, e.g., arranged in parallel or in series, as desired.

In FIG. 25, a water source is first subjected to an alkali enrichment protocol in membrane module B. In membrane module B, with, e.g., seawater, brine water, wastewater from a seawater desalination plant, produced water, etc., osmotic pressure is employed as the driving force to bring about a pH gradient between a feed solution and a draw solution. If, for example, the draw solution is NaCl and the feed solution is $H_2O$, the reverse salt flux permeates NaOH or HCl back to the feed solution. The product $CO_2$ absorbing solution is the one, either feed or draw, that has more NaOH and therefore a higher, more alkaline pH. This AE membrane module may vary as described above, and in some instances is a forward osmosis membrane module. In FIG. 25, an initial gaseous source of $CO_2$, e.g., flue gas, is first processed in membrane module A, which may include a gas separation membrane configured to separate gaseous components of a non-treated flue gas input stream containing, e.g., <1-20% (v/v) $CO_2$, so that the treated flue gas output stream contains, e.g., 30-90% (v/v) $CO_2$. As shown in FIG. 25, the treated flue gas and product $CO_2$ capture liquid are then combined in module D, which is a hollow fiber membrane device, e.g., as described above. The pressures in module D may vary, ranging from, e.g., 1-<1,000 psi, so as to combine $CO_2$ absorbing solution with treated flue gas having, e.g., 30-90% (v/v) $CO_2$. The liquid and gas are combined in a membrane contactor that maximizes the gas-liquid interface, allowing for efficient, rapid absorption and dissolution of gaseous $CO_2$, and thus providing an exit solution that contains LCP droplets. The LCP containing exit solution is then conveyed to module F, which contains a membrane configured to dewater the product solution and concentrate the LCP droplets. As reviewed above, the membrane of this module may vary, where specific types of membranes that may be employed in this module include reverse osmosis membranes, nanofiltration membranes ultrafiltration membranes. In module F, with a feed solution containing LCP droplets, hydraulic pressure may be employed in the range of, e.g., 1-<1,000 psi, as the driving force to physically separate and concentrate the LCP droplets from the bulk solution. If, for example, the feed solution is 15 ppm in carbon, it is dewatered to an extent that the solution is 750 ppm in carbon, a 50-fold increase in concentration. In the process of FIG. 25, the permeate of module F is then conveyed to module H, which is configured so that with a feed solution containing, e.g., dissolved mono-, di- and trivalent ions such as but not limited to $Na^+$, $K^+$, $Cl^-$, $HCO_3^-$, $Ca^{2+}$, $Mg^{2+}$, $Sr^{2+}$, $Hg^{2+}$, $SO_4^{2-}$, $CO_3^{2-}$, $Al^{3+}$, $PO_4^{3-}$, hydraulic pressures in the range of, e.g., 1-<1,000 psi, may be employed as the driving force to physically remove ions from solution, so as to pass pure $H_2O$ to the permeate. The specific type of membrane in this module may vary, wherein membranes of interest include reverse osmosis and nanofiltration membranes. Concentrated LCP containing liquid produced with module F is conveyed to a mixing tank where it is combined with a source of divalent cations under conditions sufficient to produce a calcium carbonate precipitate and pure $CO_2$ gas. While the divalent cation source that is combined with the concentrated LCP liquid in the mixing tank may vary, in the illustrated embodiment the devalent cation source is one that has been produced from an initial brine by a membrane mediated concentration membrane module G. In membrane module G, with an initial brine feed solution containing, e.g., alkaline earth metals (Group II on the Periodic Table), hydraulic pressures in the range of, e.g., 1-<1,000 psi are employed as the driving force to physically separate and concentrate the alkaline earth metal ions from the bulk solution. If, for example, e.g., a feed solution is 400 ppm in calcium, it is dewatered to an extent that the solution is 40,000 ppm in calcium, 100-fold increase in concentration. While the membranes employed in such modules may vary, membranes of interest include reverse osmosis membranes, nanofiltration membranes ultrafiltration membranes. The permeate of module G may be further processed in another membrane module (e.g., such as described above) to produce a salt water waste produce and a bicarbonate rich medium (identified as CarbonMix™). As shown in FIG. 25, the precipitated product produced in the mixing tank is conveyed to module J, which is employed to mechanically dewater the precipitated product. In module J, with a feed solution containing a suspension, slurry, sludge, paste, etc., of, e.g., alkaline earth metal carbonates (such as but not limited to $CaCO_3$, $MgCO_3$, $SrCO_3$, $BaCO_3$, $HgCO_3$) and other solid materials (such as but not limited to $SiO_2$, $Al_2O_3$, $Fe_2O_3$) formed from mixing, blending, combining, etc., solutions of concentrated LCP droplets and concentrated alkaline earth metals, hydraulic pressures in the range of, e.g., 1-<1,000 psi, are employed as the driving force to physically dewater the suspension, slurry, sludge, paste, etc., to the extent that the isolated suspension, slurry, sludge, paste, etc., contains between 10-50% water by mass. While the membranes employed in this module may vary, membranes of interest include ultrafiltration and microfiltration membranes. The resultant dewatered product may then be conveyed to an extruder, which is configured to produce solid carbonate pellets from the dewatered product, e.g., as described above.

FIG. 26 provides a view of a protocol in which hydraulic pressure is employed as a driving force to produce a $CO_2$ capture liquid with an alkali enrichment module. In FIG. 26, a water source is first subjected to an alkali enrichment protocol in membrane module C. In membrane module C, with, e.g., seawater, brine water, pond water at a power plant, wastewater from rinsing a ready-mix concrete truck, produced water, etc., use hydraulic pressure as the driving force to bring about a pH gradient between the permeate solution and the concentrate solution. If, for example, the feed solution contains NaCl and $H_2O$, the applied pressure will drive NaOH and HCl to separate across the membrane. The $CO_2$ absorbing solution is the one, either permeate or concentrate, that has more NaOH and therefore a higher, more alkaline pH. Another example might be a feed solution that contains $NaHCO_3$ whereby the applied pressure will drive the following reaction: $2\ NaHCO_3 = Na_2CO_3 + H_2CO_3$. The $CO_2$ absorbing solution is the one, either permeate or concentrate, that has more $Na_2CO_3$ and therefore a higher, more alkaline pH. As shown in FIG. 26, the resultant $CO_2$ absorbing solution (i.e., $CO_2$ capture liquid) is conveyed to membrane module E where it is combined with an untreated gaseous source of $CO_2$, e.g., flue gas. In membrane module E, at pressures ranging from, e.g., 1-<1,000 psi, $CO_2$ absorbing solution is combined with non-treated flue gas having, e.g., <1-20% (v/v) $CO_2$. The liquid and gas are combined in a membrane contactor, e.g., a hollow fiber membrane containing device such as described above, that maximizes the gas-liquid interface, allowing for efficient, rapid absorption and dissolution of gaseous $CO_2$, and thus providing an exit solution that contains LCP droplets. Other gases from the non-treated flue gas input stream, e.g., $N_2$, are not absorbed by the $CO_2$ absorbing solution, but are passed out of the contactor. The LCP containing exit solution is then conveyed to module F, which contains a membrane configured to dewater the product solution and concentrate the LCP droplets. As reviewed above, the membrane of this module may vary, where specific types of membranes that may be employed in this module include reverse osmosis membranes, nanofiltration membranes ultrafiltration membranes. In module F, with a feed solution containing LCP droplets, hydraulic pressure may be employed in the range of, e.g., 1-<1,000 psi, as the driving force to physically separate and concentrate the LCP droplets from the bulk solution. If, for example, the feed solution is 15 ppm in carbon, it is dewatered to an extent that the solution is 750 ppm in carbon, a 50-fold increase in concentration. In the process of FIG. 26, the permeate of module F is then conveyed to module H, which is configured so that with a feed solution containing, e.g., dissolved mono-, di- and trivalent ions such as but not limited to $Na^+$, $K^+$, $Cl^-$, $HCO_3^-$, $Ca^{2+}$, $Mg^{2+}$, $Sr^{2+}$, $Hg^{2+}$, $SO_4^{2-}$, $CO_3^{2-}$, $Al^{3+}$, $PO_4^{3-}$, hydraulic pressures in the range of, e.g., 1-<1,000 psi, may be employed as the driving force to physically remove ions from solution, so as to pass pure $H_2O$ to the permeate. The specific type of membrane in this module may vary, wherein membranes of interest include reverse osmosis and nanofiltration membranes. Concentrated LCP containing liquid produced with module F is conveyed to membrane module J, where it is combined with a source of divalent cations. While the divalent cation source that is combined with the concentrated LCP liquid in the mixing tank may vary, in the illustrated embodiment the devalent cation source is one that has been produced from a brine by a membrane mediated concentration membrane module G. In membrane module G, with an initial brine feed solution containing, e.g., alkaline earth metals (Group II on the Periodic Table), hydraulic pressures in the range of, e.g., 1-<1,000 psi are employed as the driving force to physically separate and concentrate the alkaline earth metal ions from the bulk solution. If, for example, e.g., a feed solution is 400 ppm in calcium, it is dewatered to an extent that the solution is 40,000 ppm in calcium, 100-fold increase in concentration. While the membranes employed in such modules may vary, membranes of interest include reverse osmosis membranes, nanofiltration membranes ultrafiltration membranes. The brine that is concentrated in module G in the protocol illustrated in FIG. 26 is one that has been initial produced from seawater using membrane module I. In membrane module I, with a feed solution containing, e.g., dissolved mono-, di- and trivalent ions such as but not limited to $Na^+$, $K^+$, $Cl^-$, $HCO_3^-$, $Ca^{2+}$, $Mg^{2+}$, $Sr^{2+}$, $Hg^{2+}$, $SO_4^{2-}$, $CO_3^{2-}$, $Al^{3+}$, $PO_4^{3-}$, hydraulic pressures in the range of, e.g., 1-<1,000 psi, are employed as the driving force to physically remove the di- and trivalent ions from solution, such as but not limited to $Ca^{2+}$, $Mg^{2+}$, $Sr^{2+}$, $Hg^{2+}$, $SO_4^{2-}$, $CO_3^{2+}$, $Al^{3+}$, $PO_4^{3-}$, so as to pass solutions with monovalent ions to the permeate, such as but not limited to $Na^+$, $K^+$, $Cl^-$, $HCO_3$, thus softening the water. While the membranes employed in such modules may vary, membranes of interest include reverse osmosis membranes, nanofiltration membranes ultrafiltration membranes. As shown in FIG. 26, combination of the divalent cation source and LCP containing liquid in module J produces a precipitated product, which is then mechanically dewatered. In module J, the resultant suspension, slurry, sludge, paste, etc., of, e.g., alkaline earth metal carbonates (such as but not limited to $CaCO_3$, $MgCO_3$, $SrCO_3$, $BaCO_3$, $HgCO_3$) and other solid materials (such as but not limited to $SiO_2$, $Al_2O_3$, $Fe_2O_3$) formed from mixing, blending, combining, etc., solutions of concentrated LCP droplets and concentrated alkaline earth metals, hydraulic pressures in the range of, e.g., 1-<1,000 psi, are employed as the driving force to physically dewater the suspension, slurry, sludge, paste, etc., to the extent that the isolated suspension, slurry, sludge, paste, etc., contains between 10-50% water by mass. While the membranes employed in this module may vary, membranes of interest include ultrafiltration and microfiltration membranes. The resultant dewatered product may then be conveyed to an extruder, which is configured to produce solid carbonate pellets from the dewatered product, e.g., as described above. In the process shown in FIG. 26, pure $CO_2$ produced by the precipitation reaction is recycled to enrich the gaseous source of $CO_2$ which enter membrane module G.

FIG. 27 illustrates a process in which seawater is employed as an initial source water and is processed with an alkali enrichment protocol to produce a $CO_2$ capture liquid. In FIG. 27, seawater is first processed at membrane module H, which is configured so that with a seawater feed solution containing, e.g., dissolved mono-, di- and trivalent ions such as but not limited to $Na^+$, $K^+$, $Cl^-$, $HCO_3^-$, $Ca^{2+}$, $Mg^{2+}$, $Sr^{2+}$, $Hg^{2+}$, $SO_4^{2-}$, $CO_3^{2-}$, $Al^{3+}$, $PO_4^{3-}$, hydraulic pressures in the range of, e.g., 1-<1,000 psi, may be employed as the driving force to physically remove ions from solution, so as to pass pure $H_2O$ to the permeate. The specific type of membrane in this module may vary, wherein membranes of interest include reverse osmosis and nanofiltration membranes. The retentate solution is then conveyed to membrane module B. In membrane module B, with, e.g., seawater, brine water, wastewater from a seawater desalination plant, produced water, etc., osmotic pressure is employed as the driving force to bring about a pH gradient between a feed solution and a draw solution. If, for example, the draw solution is NaCl and the feed solution is $H_2O$, the reverse salt flux permeates NaOH or HCl back to the feed solution. The product $CO_2$ absorbing solution is the one, either feed or draw, that has more NaOH and therefore a higher, more alkaline pH. This AR membrane module may vary as described above, and in some instances is a forward osmosis membrane module. As shown in FIG. 27, the resultant $CO_2$ absorbing solution (i.e., $CO_2$ capture liquid) is conveyed to membrane module E where it is combined with an untreated gaseous source of $CO_2$, e.g., flue gas. In membrane module E, at pressures ranging from, e.g., 1-<1,000 psi, $CO_2$ absorbing solution is combined with non-treated flue gas having, e.g., <1-20% (v/v) $CO_2$. The liquid and gas are combined in a membrane contactor, e.g., a hollow fiber membrane containing device such as described above, that maximizes the gas-liquid interface, allowing for efficient, rapid absorption and dissolution of gaseous $CO_2$, and thus providing an exit solution that contains LCP droplets. Other gases from the non-treated flue gas input stream, e.g., $N_2$, are not absorbed by the $CO_2$ absorbing solution, but are passed out of the contactor. The LCP containing exit solution is then conveyed to module F, which contains a membrane configured to dewater the product solution and concentrate the LCP droplets. As reviewed above, the membrane of this module may vary, where specific types of membranes that may be employed in this module include reverse osmosis membranes, nanofiltration membranes ultrafiltration membranes. In module F, with a feed solution containing LCP droplets, hydraulic pressure may be employed in the range of, e.g., 1-<1,000 psi, as the driving force to physically separate and concentrate the LCP droplets from the bulk solution. If, for example, the feed solution is 15 ppm in carbon, it is dewatered to an extent that the solution is 750 ppm in carbon, a 50-fold increase in concentration. In the process of FIG. 27, the permeate of module F is then conveyed to a first module H, which is configured so that with a feed solution containing, e.g., dissolved mono-, di- and trivalent ions such as but not limited to $Na^+$, $K^+$, $Cl^-$, $HCO_3$, $Ca^{2+}$, $Mg^{2+}$, $Sr^{2+}$, $Hg^{2+}$, $SO_4^{2-}$, $CO_3^{2-}$, $Al^{3+}$, $PO_4^{3-}$, hydraulic pressures in the range of, e.g., 1-<1,000 psi, may be employed as the driving force to physically remove ions from solution, so as to pass pure $H_2O$ to the permeate. The specific type of membrane in this module may vary, wherein membranes of interest include reverse osmosis and nanofiltration membranes. Concentrated LCP containing liquid produced with module F is conveyed to a second module H, where it is combined with a source of divalent cations to produce pure water and a precipitate containing liquid. The resultant precipitated product produced by module H is conveyed to module J, which is employed to mechanically dewater the precipitated product. In module J, with a feed solution containing a suspension, slurry, sludge, paste, etc., of, e.g., alkaline earth metal carbonates (such as but not limited to $CaCO_3$, $MgCO_3$, $SrCO_3$, $BaCO_3$, $HgCO_3$) and other solid materials (such as but not limited to $SiO_2$, $Al_2O_3$, $Fe_2O_3$) formed from mixing, blending, combining, etc., solutions of concentrated LCP droplets and concentrated alkaline earth metals, hydraulic pressures in the range of, e.g., 1-<1,000 psi, are employed as the driving force to physically dewater the suspension, slurry, sludge, paste, etc., to the extent that the isolated suspension, slurry, sludge, paste, etc., contains between 10-50% water by mass. While the membranes employed in this module may vary, membranes of interest include ultrafiltration and microfiltration membranes. The resultant dewatered product may then be conveyed to a spray dryer, which is configured to produce solid carbonate powder from the dewatered product, e.g., as described above.

Additional Aspects

Where desired, a given $CO_2$ sequestration process as described herein may include a number of additional characteristics, e.g., as described below.

Operating Pressure in Multiple Membrane Module Embodiments

As described above, in some instances the process employs multiple membrane modules, which modules may be employed in the process to achieve a variety of different results, e.g., alkali enrichment, $CO_2$ absorption, LCP dewatering/concentration, production of divalent cation sources, precipitate dewatering, byproduct processing, etc. In some instances where multiple membrane modules are employed, two or more of the modules, including three or more of the modules, such as four or more of the modules, e.g., five or more of the modules, up to and including all of the modules, may be operated a the substantially the same, if the same pressure. In such instances, among any two modules being operated at substantially the same pressure, the magnitude of any difference in pressure will be small, being in some instances 5 atm or less, such as 4 atm or less, e.g., 3 atm or less, including 2 atm or less, such as 1 atm or less, e.g., 0.5 atm or less. In some instances, such systems may further include an energy recovery module, e.g., an energy recovery piston.

Multiple Functional Modules

Figure 28:
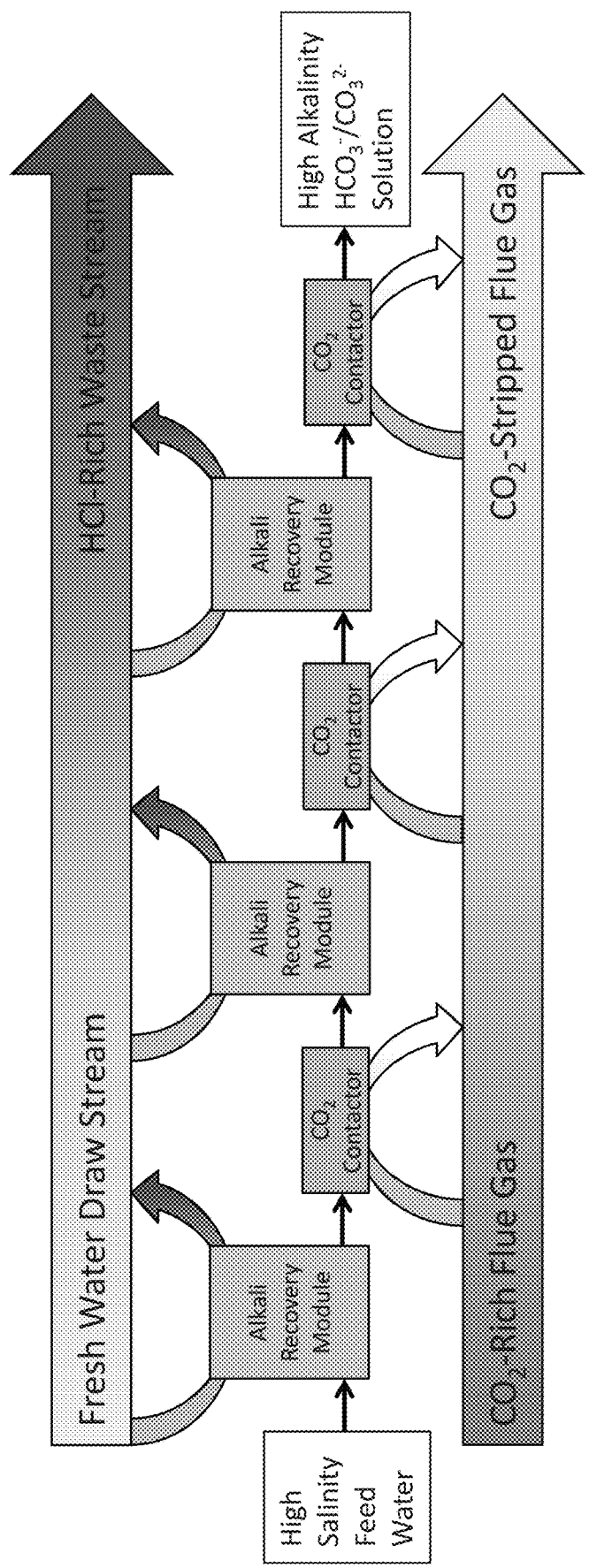
FIG. 28 Alkali enrichment may be used to capture and sequester carbon dioxide by using generated alkalinity to convert carbon dioxide to carbonate and bicarbonate ions. The schematic demonstrates a particular case where one might want to conduct this process in multiple small steps (3 shown above but more steps may be desirable). This may be advantageous if efficiency is a larger concern than capital costs.

A given $CO_2$ sequestration process may be characterized by having a single type of each functional module or multiple copies of one or more of a given functional module of the process. For example, a given process may include a single alkali enrichment module or two more alkali distinct alkali enrichment modules. Similarly, a given process may include a single $CO_2$ liquid charging module or two more $CO_2$ liquid charging modules. Where multiple copies of a given functional module are employed, the modules may be arranged in parallel or series, as desired. An example of a method having multiple copies of alkali enrichment and $CO_2$ liquid charging modules arranged in series is illustrated in FIG. 28.

Low Parasitic Load

Embodiments of the subject methods may be viewed as a low parasitic load processes. By low parasitic load processes is meant that, when the processes are employed to sequester $CO_2$ from a $CO_2$ generating power source, the parasitic load placed on the $CO_2$ generating power source to sequester $CO_2$ is minimal. As the methods of such embodiments are low parasitic load methods, any parasitic load placed on the power source is minimal, wherein in some instances, the parasitic load is 20% or less, such as 11% or less, including 7% or less.

Continuous Process

While the subject methods may be performed in a continuous or batch manner, in some instances aspects of the invention include continuous processes to produce solid $CO_2$ sequestering carbonate materials, e.g., as described above. As the processes of such embodiments are continuous, they are not batch processes. In practicing continuous processes of the invention, the process time (i.e., the time from input of water into the process to the time of production of a final $CO_2$ sequestering product may vary, and in some instances ranges from 5 minutes to 50 hours, such as 5 minutes to 25 hours, e.g., 5 minutes to 5 hours.

Utility

Methods as described herein find use in $CO_2$ sequestration applications. As reviewed above, by "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$, producing a storage stable carbon dioxide sequestering product from an amount of $CO_2$ such that the $CO_2$ from which the product is produced is then sequestered in that product. The storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Depending on the particular embodiment, the storage stable form may be a liquid or a solid. Sequestering of $CO_2$ according to methods of the invention results in prevention of $CO_2$ gas from entering the atmosphere and allows for long-term storage of $CO_2$ in a manner such that $CO_2$ does not become part of the atmosphere.

Systems

Aspects of the invention include systems which are configured for practicing the methods, e.g., as described above. A system is an apparatus that includes functional modules or reactors, e.g., as described above, that are operatively coupled in a manner sufficient to perform methods of the invention, e.g., as described above. In some embodiments, a system includes one or more alkali enrichment modules configured or adapted to produce one or more of the liquids described above, e.g., a product liquid of enhanced alkalinity. In some embodiments, a system includes one or more membrane mediated alkali enrichment modules, e.g., as described above. In some embodiments, a system includes a $CO_2$ gas/liquid contactor module, which is configured for contacting a $CO_2$ containing gas with a liquid, e.g., as described above. In some embodiments, the system includes one or more carbonate production modules, e.g., as described above. Additional details regarding systems and modules of interest may be found in U.S. patent application Ser. No. 14/112,495; the disclosure of which is herein incorporated by reference. In some instances, the systems and modules thereof are industrial scale systems, by which is meant that they are configured to process industrial scale amounts/volumes of input compositions (e.g., gases, liquids, etc.). For example, the systems and modules thereof, e.g., alkali enrichment modules, $CO_2$ contactor modules, etc., are configured to process industrial scale volumes of liquids, e.g., 1,000 gal/day or more, such as 10,000 gal/day or more, including 25,000 gal/day or more, where in some instances, the systems and modules thereof are configured to process 1,000,000,000 gal/day or less, such as 500,000,000 gal/day or less (Jake-please confirm these values make sense as potential upper limits). Similarly, the systems and modules thereof, e.g., $CO_2$ contactor modules, etc., are configured to process industrial scale volumes of gases, e.g., 25,000 cubic feet/hour or more, such as 100,000 cubic feet/hour or more, including 250,000 cubic feet/hour or more, where in some instances, the systems and modules thereof are configured to process 500,000,000 cubic feet/hour or less, such as 100,000,000 cubic feet/hour or less.

In some embodiments, a system is in fluidic communication with a source of aqueous media, such as a naturally occurring or man-made source of aqueous media, and may be co-located with a location where a $CO_2$ sequestration protocol is conducted. The systems may be present on land or sea. For example, a system may be a land based system that is in a coastal region, e.g., close to a source of sea water, or even an interior location, where water is piped into the system from a salt water source, e.g., an ocean. Alternatively, a system may be a water based system, i.e., a system that is present on or in water. Such a system may be present on a boat, ocean-based platform etc., as desired. In certain embodiments, a system may be co-located with an industrial plant, e.g., a power plant, at any convenient location.

The following examples are offered by way of illustration and not by way of limitation.

EXPERIMENTAL

Alkalinity was transferred from a draw liquid to feedwater as follows. A flatplate analyzer which tested the alkalinity generation in the Feed stream by means of a Nafion membrane (e.g., as described in Okada et al., Electrochimica Acta (1998) 43: 3741-3747), was employed. The setup used a 2M NaCl solution for the draw stream and a pure, deionized water for the feedwater stream. The pressure was 5 feet of pressure for each solution. The feed stream increased in pH from pH 5.4 to pH 7.8 due to the preferential migration of $Na^+$ ion across the membrane over the $Cl^-$ ion. This results in net NaOH in the feed stream that can be used to make a basic, $CO_2$ capture solution with high alkalinity. The experimental set up and results are further illustrated in FIG. 7.

Notwithstanding the appended clauses, the disclosure is also defined by the following clauses, which clauses are further described in U.S. Provisional Application Ser. No. 61/947,372 (012PRV), the disclosure of which is herein incorporated by reference:

1. A continuous process for producing a solid carbonate material from a gaseous source of $CO_2$, the continuous process comprising:

a) contacting a gaseous source of $CO_2$ with an aqueous medium under conditions sufficient to produce a liquid condensed phase(LCP) composition;
   b) introducing a cation source into the LCP composition under carbonate precipitation conditions sufficient to produce a precipitated carbonate composition; and
   c) dewatering the precipitated carbonate composition to produce a solid carbonate material.

2. The continuous process according to Clause 1, wherein step (a) further comprises removing hydrogen ions from the LCP composition to produce an alkaline LCP composition.

3. The continuous process according to Clause 2, wherein removing hydrogen ions comprises contacting the LCP composition with an $H^+$/bicarbonate selective membrane.

4. The continuous process according to Clauses 1, 2 or 3, wherein step (a) further comprises removing hydrogen ions from the aqueous medium to increase the alkalinity of the aqueous medium prior to contacting the aqueous medium with the gaseous source of $CO_2$.

5. The continuous process according to Clause 4, wherein removing hydrogen ions comprises contacting the aqueous medium with an $H^+$ selective membrane.

6. The continuous process according to any of the preceding clauses, wherein the method further comprises removing dissolved $CO_2$ from the alkaline liquid condensed phase composition to produce a concentrated LCP composition.

7. The continuous process according to Clause 6, wherein removing dissolved $CO_2$ comprises contacting the LCP composition with $CO_2$/bicarbonate selective membrane.

8. The continuous process according to any of the preceding clauses, wherein the gaseous source of $CO_2$ is a multicomponent gaseous stream that includes $N_2$.

9. The continuous process according to Clause 8, wherein the step (a) further comprises removing $N_2$ from the gaseous source of $CO_2$.

10. The continuous according to Clause 9, wherein the $N_2$ is removed from the gaseous source of $CO_2$ by contacting the gaseous source of $CO_2$ with an $N_2$ selective membrane.

11. The continuous process according to any of Clauses 1 to 10, wherein the gaseous source of $CO_2$ is a flue gas.

12. The continuous process according to Clause 11, wherein the flue gas is obtained from an industrial source.

13. The continuous process according to any of Clauses 1 to 12, wherein the cation source comprises an alkaline earth metal cation.

14. The continuous process according to Clause 13, wherein the cation source is a source of divalent cations.

15. The continuous process according to Clause 14, wherein the divalent cations are alkaline earth metal cations.

16. The continuous process according to Clause 15, wherein the divalent alkaline earth metal cations are selected from the group consisting of $Ca^{2+}$ and $Mg^{2+}$, and combinations thereof.

17. The continuous process according to any of Clauses 13 to 16, wherein the cation source is a concentrated cation source that is produced from a hard water source.

18. The continuous process according to Clause 17, wherein the concentrated cation source is produced from a hard water source by contacting the hard water source with a membrane under conditions sufficient to produce the concentrated cation source.

19. The continuous process according to any of the preceding clauses, wherein the carbonate precipitation conditions are transient amorphous calcium carbonate precipitation conditions.

20. The continuous process according to any of the preceding clauses, wherein the carbonate precipitation conditions produce a first precipitated carbonate composition and second precipitated carbonate composition.

21. The continuous process according to Clause 20, wherein the first precipitated carbonate composition is amorphous calcium carbonate (ACC) and the second precipitated carbonate composition is vaterite precursor ACC.

22. The continuous process according to Clauses 20 and 21, wherein the method further comprises separating the first and second precipitated carbonate compositions from each other.

23. The continuous process according to Clause 22, wherein the first and second precipitated carbonate compositions are separated from each other with a membrane.

24. The continuous process according to any of Clauses 22 or 23, wherein the method further comprises combining the separated first and second precipitated carbonate compositions.

25. The continuous process according to any of the preceding clauses, wherein the method further comprises recovering $CO_2$ produced from carbonate precipitation.

26. The continuous process according to Clause 25, wherein the method further comprises contacting the recovered $CO_2$ with an aqueous medium to produce an LCP composition.

27. The continuous process according to any of the preceding clauses, wherein the method further comprises introducing a setting fluid into the precipitated carbonate composition.

28. The continuous process according to any of the preceding clauses, wherein dewatering comprises contacting the precipitated carbonate composition with a membrane to produce the solid carbonate material.

29. The continuous process according to any of the preceding clauses, wherein the solid carbonate material is a paste.

30. The continuous process according to Clause 29, wherein the method further comprises producing unit sized objects from the paste.

31. The continuous process according to Clause 30, wherein the method further comprises curing the unit sized objects.

32. The continuous process according to Clause 31, wherein curing comprises immersing the unit sized objects in a setting solution.

33. The continuous process according to any of the Clauses 28 to 32, wherein the dewatering comprises extruding the precipitated carbonate composition.

34. The continuous process according to Clause 33, wherein the extruding comprises applying pressure to remove liquid from the paste.

35. The continuous process according to Clauses 33 or 34, wherein the extruding comprises applying negative pressure to remove air from the paste.

36. The continuous process according to any of the preceding clauses, wherein the method further comprises introducing one or more property modulators into the process so that the solid carbonate material comprises the property modulator.

37. The continuous process according to Clause 36, wherein the one or more property modulators comprises a reflectance modulator, a pigment and a biocide.

38. The continuous process according to Clause 37, wherein the reflectance modulator comprises a UV reflectance modulator.

39. The continuous process according to Clause 38, wherein the UV reflectance modulator comprises a UV absorbing pigment.

40. The continuous process according to any of the preceding clauses, wherein the continuous process has a process time ranging from 5 minutes to 5 hours.

41. A continuous reactor comprising:
a) an LCP production unit configured to contact a gaseous source of $CO_2$ with an aqueous medium under conditions sufficient to produce a LCP composition;
b) a carbonate precipitation unit configured to introduce a cation source into the LCP composition under carbonate precipitation conditions sufficient to produce a precipitated carbonate composition; and
c) a dewatering unit configured to remove water from the precipitated carbonate composition to produce a solid carbonate material.

42. The continuous reactor according to Clause 41, wherein the LCP production unit comprises an $H^+$ selective membrane.

43. The continuous reactor according to any of Clauses 41 and 42, wherein the LCP production unit comprises a $CO_2$/bicarbonate selective membrane.

44. The continuous reactor according to any of Clauses 41, 42 and 43, wherein the gaseous source of $CO_2$ is a multi-component gaseous stream that includes $N_2$ and the system further comprises an $N_2$/bicarbonate selective membrane.

45. The continuous reactor according to any of Clauses 41 to 44, wherein the gaseous source of $CO_2$ is a flue gas.

46. The continuous reactor according to Clause 45, wherein the flue gas is obtained from an industrial source.

47. The continuous reactor according to Clause 46, wherein the reactor is co-located with the industrial source.

48. The continuous reactor according to any of Clauses 41 to 47, wherein the system comprises a membrane configured to produce the cation source from a hard water source.

49. The continuous reactor according to any of Clauses 41 to 48, wherein the carbonate precipitation unit comprises a membrane configured to separate precipitated carbonates each other.

50. The continuous reactor according to any of Clauses 41 to 49, wherein the system further comprises a second LCP production unit configured to produce an LCP composition from $CO_2$ gas recovered from the carbonate precipitation unit.

51. The continuous reactor according to any of Clauses 41 to 50, wherein dewatering unit comprises a membrane configured to produce the solid carbonate material from the precipitated carbonate composition.

52. The continuous reactor according to any of Clauses 41 to 51, wherein the solid carbonate material is a paste and the system is configured to produce unit sized objects from the paste.

53. The continuous reactor according to any of Clauses 41 to 52, wherein the dewatering unit comprises an extruder.

54. The continuous reactor according to any of Clauses 41 to 53, wherein the continuous reactor is configured to produce the solid carbonate composition from the source of $CO_2$ gas in a process time ranging from 5 minutes to 5 hours.

Notwithstanding the appended clauses, the disclosure is also defined by the following clauses, which clauses are further described in U.S. Provisional Application Ser. No. 62/041,568 (014PRV), the disclosure of which is herein incorporated by reference:

1. A method of sequestering carbon dioxide ($CO_2$), the method comprising:
contacting an initial hard water with a divalent cation selective membrane to produce a concentrated hard water comprising an increased concentration of divalent cations as compared to the initial hard water; and
employing the concentrated hard water in a $CO_2$ sequestration protocol.

2. The method according to Clause 1, wherein the divalent cation selective membrane is a nanofiltration membrane.

3. The method according to Clause 2, wherein the concentrated hard water comprises divalent cation concentration that is 500 ppm or greater.

4. The method according to any one of the preceding clauses, wherein the concentrated hard water comprises one or more divalent alkaline earth metal cations.

5. The method according to Clause 4, wherein the one or more divalent alkaline earth metal cations comprise one or more of $Ca^{2+}$ and $Mg^{2+}$.

6. The method according to any one of the preceding clauses, wherein the initial hard water is obtained from a naturally occurring hard water source.

7. The method according to Clause 6, wherein the naturally occurring hard water source is co-located with a location where the $CO_2$ sequestration protocol is conducted.

8. The method according to any one of the preceding clauses, wherein the initial hard water comprises a water that is produced at an oil field.

9. The method according to any one of the preceding clauses, wherein the initial hard water comprises a water that is produced by a fracking operation.

10. The method according to any one of the preceding clauses, wherein the initial hard water comprises an industrial waste water.

11. The method according to any one of the preceding clauses, wherein the $CO_2$ sequestration protocol is a bicarbonate-mediated $CO_2$ sequestration protocol.

12. The system according to Clause 11, wherein the $CO_2$ sequestration protocol comprises contacting the concentrated hard water with a liquid condensed phase (LCP) composition.

13. The method according to any one of the preceding clauses, wherein the $CO_2$ sequestration protocol is a carbonate-mediated $CO_2$ sequestration protocol.

14. The method according to any one of the preceding clauses, wherein the method comprises combining a scaling retarding amount of an acidic solution with the concentrated hard water.

15. The method according to Clause 14, wherein the acidic solution is an acidic by-product of a forward osmosis and/or alkali recovery mediated process.

16. A system for sequestering $CO_2$, the system comprising:
   a hard water concentrator comprising a divalent cation selective membrane, wherein the hard water concentrator is configured to produce a concentrated hard water from an initial hard water; and
   a $CO_2$ sequestration unit configured to employ the concentrated hard water and a source of $CO_2$ gas in a $CO_2$ sequestration protocol.

17. The system according to Clause 16, wherein the divalent cation selective membrane is a nanofiltration membrane.

18. The system according to Clause 17, wherein the concentrated hard water has a divalent cation concentration of 500 ppm or greater.

19. The system according to any one of Clauses 16 to 18, wherein the concentrated hard water comprises one or more divalent alkaline earth metal cations.

20. The system according to Clause 19, wherein the one or more divalent alkaline earth metal cations comprise one or more of $Ca^{2+}$ and $Mg^{2+}$.

21. The system according to any one of Clauses 16 to 20, wherein the initial hard water is a naturally occurring hard water.

22. The system according to any one of Clauses 16 to 20, wherein the initial hard water is a hard water produced from an oil field.

23. The system according to any one of Clauses 16 to 20, wherein the initial hard water is a hard water produced by a fracking operation.

24. The system according to any one of Clauses 16 to 20, wherein the initial hard water is a waste water.

25. The system according to any one of Clauses 16 to 24, wherein the hard water concentrator is in fluidic communication with a hard water source.

26. The system according to any one of Clauses 15 to 25, wherein the $CO_2$ sequestration protocol is a bicarbonate-mediated $CO_2$ sequestration protocol.

27. The system according to Clause 26, wherein the $CO_2$ sequestration protocol comprises contacting the concentrated hard water with a liquid condensed phase (LCP) composition.

28. The system according to any one of Clauses 16 to 25, wherein the $CO_2$ sequestration protocol is a carbonate-mediated $CO_2$ sequestration protocol.

29. The system according to any one of Clauses 16 to 28, wherein the source of the $CO_2$ containing gas is an industrial plant.

30. The system according to Clause 29, wherein the source of the $CO_2$ containing gas is a flue gas.

31. The system according to Clause 29 or 30, wherein the industrial plant is a power plant, cement plant or modular, gas-fired engine.

32. The system according to any one of Clauses 16 to 31, wherein the system is co-located with an industrial plant.

Notwithstanding the appended clauses, the disclosure is also defined by the following clauses, which clauses are further described in U.S. Provisional Application Ser. No. 62/051,100 (015PRV), the disclosure of which is herein incorporated by reference:

1. A method of sequestering carbon dioxide ($CO_2$), the method comprising:
   (a) removing hydronium ions from an aqueous medium to produce an alkaline aqueous medium and an acidic by-product; and
   (b) employing the alkaline aqueous medium in a $CO_2$ sequestration protocol.

2. The method according to Clause 1, wherein the removing comprises positioning the aqueous medium as a feed liquid relative to a draw liquid under conditions sufficient such that hydronium ions move from the aqueous medium into the draw liquid.

3. The method according to Clause 2, wherein the draw liquid comprises a high ionic strength liquid medium.

4. The method according to Clause 2, wherein the draw liquid comprises a high alkalinity liquid medium.

5. The method according to any of Clauses 2 to 4, wherein the draw liquid comprises non-hydrogen monovalent cations to exchange with hydronium ions in the aqueous medium.

6. The method according to Clause 5, wherein the non-hydrogen monovalent cations comprise one or more of: Na+ and K+.

7. The method according to any of the preceding clauses, wherein the aqueous medium is selected from the group consisting of a fresh water, a waste water, a brackish water, and a seawater.

8. The method according to any of Clauses 2 to 7, wherein the draw liquid is selected from a geological brine and a brine discharge from a desalination plant.

9. The method according to any of Clauses 2 to 8, wherein a $CO_2$ barrier is positioned between the aqueous medium and the draw liquid.

10. The method according to any of Clauses 1 to 9, wherein the method comprises combining a $CO_2$-containing gas with the aqueous medium.

11. The method according to Clause 10, wherein the method comprises applying pressure to the aqueous medium.

12. The method according to any of Clauses 1 to 11, wherein the method comprises separating alkaline earth metal ions from a precursor aqueous medium to produce the aqueous medium.

13. The method according to Clause 12, wherein the alkaline earth metal ions are separated from the precursor aqueous medium by contacting the precursor aqueous medium with a divalent cation selective membrane.

14. The method according to 13, wherein the divalent cation selective membrane is a nanofiltration membrane.

15. The method according to Clause 14, wherein the alkaline earth metal ions separated from the precursor aqueous medium comprise one or more of Ca, Mg, Sr and Ba ions.

16. The method according to any of the preceding clauses, wherein removing hydronium ions comprises contacting the aqueous medium with an $H^+$ selective membrane.

17. The method according to Clause 16, wherein the alkaline earth metal ion depleted aqueous medium is contacted with the $H^+$ selective membrane at a contact pressure greater than 1 ATM.

18. The method according to Clause 17, wherein the contact pressure ranges from 4 to 50 ATM.

19. The method according to any of the preceding clauses, wherein the $CO_2$ sequestration protocol is a bicarbonate-mediated $CO_2$ sequestration protocol.

20. The method according to Clause 19, wherein the $CO_2$ sequestration protocol comprises contacting the alkaline aqueous medium with a source of $CO_2$ gas to produce a bicarbonate composition.

21. The method according to Clause 20, wherein the bicarbonate composition is a liquid condensed phase (LCP) composition.

22. The method according to Clauses 20 or 21, wherein the source of $CO_2$ gas is a flue gas.

23. The method according to Clause 22, wherein the source of $CO_2$ gas is an industrial plant.

24. The method according to any of Clauses 19 to 23, wherein the $CO_2$ sequestration protocol comprises contacting the bicarbonate composition with a source of alkaline earth metal ions to produce a precipitated carbonate composition and purified $CO_2$ gas.

25. The method according to Clause 24, wherein the source of alkaline earth metal ions comprises the alkaline earth metal ions separated from a carbonate buffered aqueous medium.

26. The method according to Clause 25, wherein the method further comprises contacting the purified $CO_2$ gas with an aqueous medium to produce an LCP composition.

27. The method according to any of the preceding clauses, wherein the method comprises returning at least a portion of the acidic by-product to its place of origin.

28. The method according to any of the preceding clauses, wherein the method comprises employing at least a portion of the acidic by-product as a feedwater for desalination.

29. The method according to any of Clauses 1 to 18, wherein the $CO_2$ sequestration protocol is a carbonate-mediated $CO_2$ sequestration protocol.

30. The method according to any of the preceding clauses, wherein the $CO_2$ sequestration protocol produces a building material.

31. A system for sequestering $CO_2$, the system comprising:
  (a) a hydronium ion remover configured to remove hydronium ions from an aqueous medium to produce an alkaline aqueous medium and an acidic by-product; and
  (b) a $CO_2$ sequestration unit configured to employ the alkaline aqueous medium and a source of $CO_2$ gas in a $CO_2$ sequestration protocol.

32. The system according to Clause 31, wherein the hydronium ion remover comprises a draw liquid.

33. The system according to Clause 32, wherein the draw liquid comprises a high ionic strength medium or a high alkalinity solution.

34. The system according to any of Clauses 31 to 33, wherein the hydronium ion remover comprises an $H^+$ selective membrane.

35. The system according to Clause 34, wherein the $H^+$ selective membrane is at a contact pressure greater than 1 ATM.

36. The system according to any of Clauses 31 to 35, wherein the system further comprises an alkaline earth metal ion separator configured to separate alkaline earth metal ions from a precursor aqueous medium to produce the aqueous medium.

37. The system according to Clause 36, wherein the alkaline earth metal ion separator comprises a divalent cation selective membrane.

38. The system according to Clause 37, wherein the divalent cation selective membrane is a nanofiltration membrane.

39. The system according to any of Clauses 31 to 38, wherein the source of $CO_2$ gas is an industrial plant.

40. The system according to Clause 39, wherein the $CO_2$ gas is a flue gas.

41. The system according to any of Clauses 39 or 40, wherein the industrial plant is a power plant, cement plant or modular, gas-fired engine.

42. The system according to any of Clauses 31 to 41, wherein the system is co-located with an industrial plant.

43. The system according to any of Clauses 31 to 42, wherein the $CO_2$ sequestration unit is configured to contact a bicarbonate composition with a source of alkaline earth metal ions to produce a precipitated carbonate composition and purified $CO_2$ gas.

44. The system according to Clause 43, wherein the source of alkaline earth metal ions comprises the alkaline earth metal ions separated from a precursor aqueous medium in the alkaline earth metal ion separator and the $CO_2$ sequestration unit is fluidically coupled to the alkaline earth metal ion separator.

45. The system according to any of Clauses 31 to 44, wherein the system is configured to employ the acidic by-product as a feedwater for desalination and the hydronium ion remover is fluidically coupled to a desalination plant.

46. The system according to any of Clauses 31 to 45, wherein the hydronium ion remover is fluidically coupled to a source of a fresh water, a brackish water, and a seawater.

47. The system according to any of Clauses 32 to 45, wherein the draw liquid is a geological brine or a brine discharge from a desalination plant.

48. The system according to any of Clauses 31 to 47, wherein the $CO_2$ sequestration unit is configured to produce a building material.

Notwithstanding the appended clauses, the disclosure is also defined by the following clauses, which clauses are further described in U.S. Provisional Application Ser. No. 61/990,486 (018PRV), the disclosure of which is herein incorporated by reference:

1. A method of producing a carbon dioxide ($CO_2$) capture liquid, the method comprising:
   introducing a draw liquid and a feedwater into a forward osmosis reactor, wherein the feedwater has a lower alkalinity than that of the draw liquid; and
   obtaining from the forward osmosis reactor a product draw liquid of reduced salinity and a $CO_2$ capture liquid having an alkalinity that is higher than that of the feedwater.
2. The method according to Clause 1, wherein the feedwater is a seawater, brackish water, hard water or freshwater.
3. The method according to Clauses 1 or 2, wherein the feedwater has a lower alkalinity as compared to the draw liquid.
4. The method according to any of Clauses 1, 2 or 3, wherein the draw liquid is a brine.
5. The method according to Clause 4, wherein the brine is a geological brine, oil field produced brine water, fracking operation produced water brine or desalination brine.
6. The method according to any of the preceding clauses, wherein the method further comprises contacting the $CO_2$ capture liquid with a carbon dioxide ($CO_2$) containing gas.
7. The method according to Clause 6, wherein the $CO_2$ containing gas is a multicomponent gaseous stream.
8. The method according to Clause 7, wherein the multicomponent gaseous stream is a flue gas.
9. The method according to Clause 8, wherein the flue gas is from an industrial plant.
10. The method according to any of the preceding clauses, wherein the feedwater comprises dissolved inorganic carbon (DIC).
11. The method according to Clause 10, wherein the method comprises charging the feedwater with $CO_2$ before the feedwater is introduced into the forward osmosis reactor.
12. The method according to any of the Clauses 6 to 11, wherein the $CO_2$ capture liquid is contacted with a carbon dioxide ($CO_2$) containing gas in a manner sufficient to produce a liquid condensed phase (LCP) composition.
13. The method according to Clause 12, wherein the method comprises contacting the LCP composition with a source of divalent cations under carbonate precipitation conditions sufficient to produce a carbonate precipitate.
14. The method according to Clause 13, wherein the source of divalent cations comprises one or more divalent alkaline earth metal cations.
15. The method according to Clause 14, wherein the divalent alkaline earth metal cations comprise one or more of $Ca^{2+}$ and $Mg^{2+}$.
16. The method according to any of Clauses 13 to 15, wherein the carbonate precipitation conditions comprise bicarbonate ion mediated carbonate precipitation conditions.
17. The method according to Clause 16, wherein the bicarbonate ion mediated carbonate precipitation conditions generate $CO_2$ gas.
18. The method according to any of Clauses 13 to 17, wherein the method comprises storing the LCP composition for a period of time prior to contacting the LCP composition with a source of divalent cations.
19. The method according to any of Clauses 13 to 18, wherein the method further comprises producing a solid carbonate material from the carbonate precipitate.
20. The method according to Clause 19, wherein the method comprises producing a building material from the solid carbonate material.
21. The method according to any of Clauses 1 to 20, wherein the method comprises disposing the product draw liquid in a deep water or subterranean location.
22. A system for producing a carbon dioxide ($CO_2$) capture liquid, the system comprising:
   a forward osmosis reactor comprising a draw liquid input and a feedwater input;
   a draw liquid source fluidically coupled to the draw liquid input of the forward osmosis reactor; and
   a feedwater source fluidically coupled to the feedwater input of the forward osmosis reactor, wherein the feedwater source comprises a feedwater having a lower salinity than that of the draw liquid;
   wherein the forward osmosis reactor is configured to produce a product draw liquid of reduced salinity and a $CO_2$ capture liquid from the feedwater, respectively.
23. The system according to Clause 22, wherein the feedwater comprises a seawater, brackish water, hard water or freshwater.
24. The system according to Clauses 22 or 23, wherein the system further comprises comprises a $CO_2$ charging reactor configured to contact the $CO_2$ capture liquid with a $CO_2$ containing gas.
25. The system according to Clause 24, wherein the $CO_2$ containing gas is a multicomponent gaseous stream.
26. The system according to Clause 25, wherein the multicomponent gaseous stream is a flue gas.
27. The system according to Clause 26, wherein the flue gas is from an industrial plant.
28. The system according to Clause 27, wherein the industrial plant is a power plant.
29. The system according to any of Clauses 24 to 28, wherein the system further comprises a carbonate precipitation reactor configured to receive a product liquid from the $CO_2$ charging reactor and a source of divalent cations and output a carbonate precipitate product.
30. The system according to any of Clauses 22 to 29, wherein the system further comprises a storage unit configured to store a $CO_2$ capture liquid output from the forward osmosis reactor.

Notwithstanding the appended clauses, the disclosure is also defined by the following clauses, which clauses are further described in U.S. Provisional Application Ser. No. 62/056,377 (020PRV), the disclosure of which is herein incorporated by reference:

1. A method of increasing the alkalinity of a first liquid, the method comprising:
   introducing the first liquid and a second liquid into a membrane system comprising a membrane that is more permissive of $Na^+$ transport as compared to $Cl^-$ transport and catalyzes the production of $H^+$ and $OH^-$ from $H_2O$ to produce a product liquid from the first liquid that has an increased alkalinity relative to the first liquid.
2. The method according to Clause 1, wherein the membrane system comprises a metal particle composite membrane system.
3. The method according to Clause 2, wherein the metal particle composite membrane system comprises metal particles stably associated with a membrane component, wherein the metal particles catalyze the production of $H^+$ and $OH^-$ from $H_2O$.
4. The method according to any of Clauses 1 to 3, wherein the pH difference between the product liquid and the first liquid ranges from 0.1 to 10.
5. The method according to Clause 4, wherein the product liquid has a pH ranging from 6 to 13.

6. The method according to any of the preceding clauses, wherein the first liquid is a carbon dioxide ($CO_2$) charged liquid.

7. The method according to Clause 6, wherein the $CO_2$ charged liquid is a $CO_2$ charged seawater, brackish water, hard water or freshwater.

8. The method according to any of the preceding clauses, wherein the second liquid is a brine.

9. The method according to Clause 8, wherein the brine draw liquid is a geological brine, oil field produced brine water, fracking operation produced water brine or desalination brine.

10. The method according to any of the preceding clauses, wherein the membrane mediates ion transport by dehydration/resolvation.

11. The method according to Clause 10, wherein the membrane is a cellulose acetate membrane.

12. The method according to Clause 10, wherein the membrane is a polyvinyl alcohol membrane.

13. The method according to any of Clauses 3 to 12, wherein the metal particles have a diameter ranging from 1 to 10,000 nm.

14. The method according to Clause 13, wherein the metal particles comprise a metal selected from the group consisting of nickel and zinc.

15. The method according to any of Clauses 6 to 14, wherein the method further comprises producing the $CO_2$ charged liquid by contacting an initial liquid or the product liquid with a carbon dioxide ($CO_2$) containing gas.

16. The method according to Clause 15, wherein the $CO_2$ containing gas is a multicomponent gaseous stream.

17. The method according to Clause 16, wherein the multicomponent gaseous stream is a flue gas.

18. The method according to Clause 17, wherein the flue gas is from an industrial plant.

19. The method according to any of the preceding clauses, wherein the product liquid is a bicarbonate containing liquid.

20. The method according to any of the preceding clauses, wherein the method comprises producing an LCP containing liquid from the product liquid.

21. The method according to Clause 20, wherein the method comprises contacting the LCP containing liquid with a source of divalent cations under carbonate precipitation conditions sufficient to produce a carbonate precipitate.

22. The method according to Clause 21, wherein the source of divalent cations comprises one or more divalent alkaline earth metal cations.

23. The method according to Clause 22, wherein the divalent alkaline earth metal cations comprise one or more of $Ca^{2+}$ and $Mg^{2+}$.

24. The method according to any of Clauses 21 to 23, wherein the carbonate precipitation conditions comprise bicarbonate ion mediated carbonate precipitation conditions.

25. The method according to Clause 24, wherein the bicarbonate ion mediated carbonate precipitation conditions generate $CO_2$ gas.

26. The method according to any of Clauses 21 to 25, wherein the method further comprises producing a solid carbonate material from the carbonate precipitate.

27. The method according to Clause 26, wherein the method comprises producing a building material from the solid carbonate material.

28. A system for increasing the alkalinity of a first liquid, the system comprising:
a membrane system having a first liquid input, second liquid input and product liquid output, wherein the membrane system is more permissive of $Na^+$ transport as compared to $Cl^-$ transport and catalyzes the production of $H^+$ and $OH^-$ from $H_2O$;
a first liquid fluidically coupled to the first liquid input; and
a second liquid fluidically coupled to the second liquid input.

29. The system according to Clause 28, wherein the membrane system comprises a metal particle composite membrane system.

30. The system according to Clause 29, wherein the metal particle composite membrane system comprises metal particles stably associated with a membrane component, wherein the metal particles catalyze the production of $H^+$ and $OH^-$ from $H_2O$.

31. The system according to any of Clauses 28 and 30, wherein the system further comprises a reactor configured to contact an a liquid with a $CO_2$ containing gas, wherein the liquid is at least one of the first liquid and product liquid.

32. The system according to Clause 31, wherein the $CO_2$ containing gas is a multicomponent gaseous stream.

33. The system according to Clause 32, wherein the multicomponent gaseous stream is a flue gas.

34. The system according to Clause 33, wherein the flue gas is from an industrial plant.

35. The system according to Clause 34, wherein the industrial plant is a power plant.

36. The system according to any of Clauses 28 to 35, wherein the second liquid is a brine.

37. The system according to Clause 36, wherein the brine is a geological brine, oil field produced brine water, fracking operation produced water brine or desalination brine.

38. The system according to any of Clauses 28 to 37, wherein the membrane system mediates ion transport by dehydration/resolvation.

39. The system according to Clause 38, wherein the membrane system comprises a cellulose acetate membrane.

40. The system according to Clause 38, wherein the membrane system comprises is a polyvinyl alcohol membrane.

41. The system according to any of Clauses 30 to 40, wherein the metal particles have a diameter ranging from 1 to 10,000 nm.

42. The system according to Clause 41, wherein the metal particles comprise a metal selected from the group consisting of nickel and zinc.

43. The system according to any of Clauses 28 to 42, wherein the system further comprises a carbonate precipitation reactor configured to receive a bicarbonate containing liquid and a source of divalent cations and output a carbonate precipitate product.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method for sequestering $CO_2$ from a gaseous source of $CO_2$, the method comprising:
   a) subjecting an initial liquid to a membrane mediated alkali enrichment protocol to produce an enhanced alkalinity liquid, wherein the membrane mediated alkali enrichment protocol comprises contacting the initial liquid with a first side of a membrane and contacting a second liquid with an opposite side of the membrane, wherein charges in the initial liquid and the second liquid are balanced by flow of $H^+$ ions or $OH^-$ ions through the membrane and the initial liquid becomes the enhanced alkalinity liquid; and
   b) employing the enhanced alkalinity liquid in a $CO_2$ sequestration protocol to sequester $CO_2$.

2. The method according to claim 1, wherein the membrane is a cationic membrane and charges in the initial liquid and the second liquid are balanced by flow of $H^+$ ions through the cationic membrane.

3. The method according to claim 1, wherein the membrane is an anionic membrane and charges in the initial liquid and the second liquid are balanced by flow of $OH^-$ ions through the anionic membrane.

4. The method according to claim 1, wherein alkali enrichment protocol comprises an osmotic pressure mediated protocol.

5. The method according to claim 1, wherein the initial liquid is selected from the group consisting of freshwater, seawater, brine water, produced water and waste water.

6. The method according to claim 1, wherein the method comprises contacting the enhanced alkalinity liquid with the gaseous source of $CO_2$ under conditions sufficient to produce an LCP containing liquid.

7. The method according to claim 1, wherein the method comprises producing the initial liquid by contacting a source liquid with the gaseous source of $CO_2$.

8. The method according to claim 1, wherein the gaseous source of $CO_2$ is a multi-component gaseous stream.

9. The method according to claim 8, wherein the gaseous source of $CO_2$ is a flue gas.

10. The method according to claim 7, wherein the gaseous source of $CO_2$ is contacted with a liquid under conditions such that $CO_2$ is selectively absorbed by the source liquid.

11. The method according to claim 7, wherein the gaseous source of $CO_2$ is contacted with the source liquid using a hollow fiber membrane contactor.

12. The method according to claim 1, wherein the $CO_2$ sequestration protocol comprises producing a carbonate from a LCP that comprises dissolved inorganic carbon (DIC) obtained from the gaseous source of $CO_2$.

13. The method according to claim 12, wherein the carbonate is produced by introducing a cation source into an LCP containing liquid under conditions sufficient to produce the carbonate.

14. The method according to claim 13, wherein the cation source is a source of divalent cations.

15. The method according to claim 14, wherein the divalent cations comprise alkaline earth metal cations.

16. The method according to claim 15, wherein the divalent alkaline earth metal cations are selected from the group consisting of $Ca^{2+}$ and $Mg^{2+}$, and combinations thereof.

17. The method according to claim 14, wherein the divalent cation source is introduced into a flowing LCP containing liquid under conditions sufficient such that a non-slurry solid phase $CO_2$ sequestering carbonate material is produced in the flowing LCP containing liquid.

18. The method according to claim 14, wherein the divalent cation source is introduced into an LCP containing liquid under conditions sufficient such that a slurry $CO_2$ sequestering carbonate material is produced from the LCP containing liquid.

19. The method according to claim 1, wherein the method is a continuous process.

* * * * *

UNITED STATES PATENT AND TRADEMARK OFFICE
CERTIFICATE OF CORRECTION

| | |
|---|---|
| PATENT NO. | : 11,577,198 B2 |
| APPLICATION NO. | : 17/127074 |
| DATED | : February 14, 2023 |
| INVENTOR(S) | : Brent R. Constantz et al. |

Page 1 of 3

It is certified that error appears in the above-identified patent and that said Letters Patent is hereby corrected as shown below:

On the Title Page

On the second page, under item (56), OTHER PUBLICATIONS, references cited:

Please replace "https://worldwide.espacenet.corn/publicationDetails/inpadocPatentFamily?Cc~Cn&NF 103663529A&Kc~a&Ft~D &Nd~3&dat e~20140326&Db~Epodoc&locale~enEP." with
-- https://worldwide.espacenet.com/publicationDetails/inpadocPatentFamily?CC=CN&NR =103663529A&KC=A&FT=D&ND=3&date=20140326&DB=EPODOC&locale=en_E. --.

Please replace "PVA/Si02" with -- PVA/SiO2 --.

Please replace ""C02" with -- "CO2 --.

Please replace "Press _releases/2007.Statkraft_to _build_ worl d_s _first" with
-- Press_releases/2007.Statkraft_to_build_world_s _first --.

Please replace "C02" with -- CO2 --.

In the Specification

Please replace "that that" with -- that -- (Column 10, Lines 19-20).

Please replace "($HCO^{3+}$)," with -- ($HCO_3^-$), -- (Column 14, Line 41).

Please replace "measureable" with -- measurable -- (Column 18, Line 34).

Please replace "[$CO_3^{2+}$]," with -- [$CO_3^{2-}$], -- (Column 21, Line 49).

Please replace "[$CO_3^{2+}$]," with -- [$CO_3^{2-}$], -- (Column 21, Line 51).
Please replace "multi-component" with -- multicomponent -- (Column 21, Line 65).

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,577,198 B2

Please replace "XII)" with -- XIII) -- (Column 22, Line 33).

Please replace "(CASA," with -- (CA5A, -- (Column 22, Line 35).

Please replace "$10^3$ S$^{-1}$" with -- $10^3$ s$^{-1}$ -- (Column 23, Line 38).

Please replace "where in" with -- wherein -- (Column 23, Line 54).

Please replace "HCO $_3^-$/" with -- HCO$_3^-$/ -- (Column 24, Line 23).

Please replace "phophazene" with -- phosphazene -- (Column 25, Line 34).

Please replace "barcarbonate" with -- bicarbonate -- (Column 25, Line 50).

Please replace "lanfordite" with -- lansfordite -- (Column 31, Line 60).

Please replace "hydromagnisite," with -- hydromagnesite, -- (Column 31, Lines 60-61).

Please replace "where" with -- where: -- (Column 37, Line 47).

Please replace "3v^/" with -- 3v^2/ -- (Column 37, Line 54).

Please replace "supersatruation." with -- supersaturation. -- (Column 37, Line 58).

Please replace "isone" with -- is one -- (Column 38, Line 8).

Please replace "phophazene" with -- phosphazene -- (Column 38, Line 41).

Please replace "alight" with -- a light -- (Column 40, Line 57).

Please replace "($H_2CO$)." with -- ($H_2CO_3$). -- (Column 44, Line 63).

Please replace "$CaCl_2$)" with -- $CaCl_2$ -- (Column 50, Line 44).

Please replace "devalent" with -- divalent -- (Column 52, Line 1).

Please replace "devalent" with -- divalent -- (Column 53, Line 34).

Please replace "$CO_3^{2+}$," with -- $CO_3^{2-}$, -- (Column 53, Line 56).

Please replace "$HCO_3$," with -- $HCO_3^-$, -- (Column 53, Line 58).

Please replace "a the" with -- a -- (Column 55, Line 54).

Please replace "continuous" with -- continuous process -- (Column 58, Line 36).

CERTIFICATE OF CORRECTION (continued)
U.S. Pat. No. 11,577,198 B2

Please replace "system" with -- method -- (Column 61, Line 31).

Please replace "to 13" with -- to Clause 13 -- (Column 63, Line 18).

Please replace "an a" with -- a -- (Column 68, Line 18).